United States Patent
Bellini, III et al.

(10) Patent No.: US 12,511,601 B2
(45) Date of Patent: Dec. 30, 2025

(54) SYSTEMS AND METHODS FOR PROVIDING A MARKETPLACE FOR ACCESSORIES OF A BUSINESS AUTOMATION SYSTEM

(71) Applicant: ConnectWise, LLC, Tampa, FL (US)

(72) Inventors: Arnold Bellini, III, Tampa, FL (US); Linda Brotherton, Tampa, FL (US); Gerwai Todd, Lutz, FL (US)

(73) Assignee: ConnectWise, LLC, Tampa, FL (US)

( * ) Notice: Subject to any disclaimer, the term of this patent is extended or adjusted under 35 U.S.C. 154(b) by 0 days.

(21) Appl. No.: 17/360,358

(22) Filed: Jun. 28, 2021

(65) Prior Publication Data
US 2022/0164735 A1 May 26, 2022

Related U.S. Application Data

(63) Continuation of application No. 14/068,638, filed on Oct. 31, 2013, now Pat. No. 11,049,057.

(51) Int. Cl.
G06Q 10/0637 (2023.01)
G06Q 10/067 (2023.01)

(52) U.S. Cl.
CPC ....... *G06Q 10/0637* (2013.01); *G06Q 10/067* (2013.01)

(58) Field of Classification Search
None
See application file for complete search history.

(56) References Cited

U.S. PATENT DOCUMENTS

| | | |
|---|---|---|
| 5,831,611 A | 11/1998 | Kennedy et al. |
| 6,678,714 B1 | 1/2004 | Olapurath et al. |
| 7,949,684 B2 | 5/2011 | Brooks et al. |
| 8,209,235 B2 | 6/2012 | Bickerstaff |
| 8,244,759 B2 | 8/2012 | Brooks et al. |
| 8,407,107 B2 | 3/2013 | Kennedy |

(Continued)

OTHER PUBLICATIONS

Outing, Steve. A widget to give your users multiple pay/donate choices. http://mediadisruptus.com/. http://mediadisruptus.com/2010/09/26/a-widget-to-give-your-users-multiple-paydonate-choices/. Sep. 26, 2010. p. 1-7 (Year: 2010).*
Atlassian, Atlassian Marketplace web site, Jul. 28, 2013, Sydney, Australia.
ConnectWise Inc., ConnectWise Documentation v2012.2, single frame from Instructional Video: How to Use the Marketplace, Feb. 7, 2013, v2012.2 (15034) Tampa, Florida.
Creative Technologies LLC, X-Cart web site, Jul. 28, 2013, Ulyanovsk, Russia.

(Continued)

*Primary Examiner* — Jamie H Austin
(74) *Attorney, Agent, or Firm* — Foley Hoag LLP; John D. Lanza; Joshua S. Matloff

(57) ABSTRACT

Systems and methods of the present disclosure can facilitate a marketplace for a business automation system comprising at least one processor executing on a computing device. In some embodiments, the system includes an upload module, an accessory creation module, and a download module. The upload module may be configured to receive, responsive to a first user, a configuration of the business automation system of the first user. The accessory creation module may be configured to create, based on the configuration, an accessory comprising at least one of a solution set, a service board, and a project board. The download module may be configured to verify, responsive to a second user, the suitability of the accessory for the business automation system of the second user. The download module may be further configured to transmit the accessory to the second user.

24 Claims, 68 Drawing Sheets

(56) References Cited

U.S. PATENT DOCUMENTS

| | | | |
|---|---|---|---|
| 9,055,120 B1 | 6/2015 | Firman | |
| 2002/0133392 A1 | 9/2002 | Angel et al. | |
| 2005/0038693 A1 | 2/2005 | Janus | |
| 2006/0085512 A1* | 4/2006 | Handel | G06Q 10/087 709/212 |
| 2006/0225032 A1* | 10/2006 | Klerk | G06F 8/10 717/105 |
| 2009/0037287 A1 | 2/2009 | Baitalmal et al. | |
| 2009/0125377 A1 | 5/2009 | Somji et al. | |
| 2009/0249296 A1 | 10/2009 | Haenel et al. | |
| 2010/0023918 A1* | 1/2010 | Bernardini | G06Q 30/0611 717/101 |
| 2010/0058170 A1* | 3/2010 | Demant | G06Q 10/10 715/765 |
| 2010/0267376 A1* | 10/2010 | Saari | G06F 8/38 455/418 |
| 2010/0299219 A1 | 11/2010 | Cortes et al. | |
| 2011/0258082 A1 | 10/2011 | Schmieder et al. | |
| 2012/0059807 A1* | 3/2012 | Brooks | H04L 67/34 707/E17.007 |
| 2012/0059862 A1 | 3/2012 | Brooks et al. | |
| 2012/0124211 A1* | 5/2012 | Kampas | H04L 47/80 709/226 |
| 2013/0117806 A1 | 5/2013 | Parthasarathy et al. | |
| 2013/0138524 A1 | 5/2013 | Sharma | |
| 2013/0138668 A1 | 5/2013 | Sharma | |
| 2013/0212129 A1* | 8/2013 | Lawson | G05B 11/01 707/779 |
| 2013/0304535 A1* | 11/2013 | Hu | G06Q 10/10 705/7.27 |
| 2013/0331996 A1 | 12/2013 | Brunschwiler et al. | |
| 2013/0332996 A1* | 12/2013 | Fiala | G06F 21/53 709/227 |
| 2014/0164081 A1* | 6/2014 | Thompson, Jr. | G06Q 30/02 705/14.16 |
| 2014/0258972 A1* | 9/2014 | Savage | G06F 9/451 717/106 |
| 2014/0279878 A1* | 9/2014 | Buerk | G06F 16/275 707/611 |
| 2015/0120395 A1 | 4/2015 | Bellini, III et al. | |

OTHER PUBLICATIONS

Dolibarr, Dolistore web site, Aug. 4, 2013, open source.

Google Inc., Google Apps Marketplace web site, Jul. 28, 2013, Mountain View, California.

Infusionsoft, Marketplace by Infusionsoft web site, Jul. 28, 2013, Chandler, Arizona.

Intuit Inc., QuickBooks Compatible Solutions web site, Jul. 28, 2013, Mountain View, California.

Microsoft Inc., Microsoft Dynamics Marketplace web site, Aug. 4, 2013, Redmond, Washington.

OrangeHRM Inc., Market Place web site, Jul. 28, 2013, Secaucus, New Jersey.

Salesforce.com Inc., The Salesforce AppExchange web site, Aug. 4, 2013, San Francisco, California.

Swiftpage, Act! Marketplace web site, Jul. 28, 2013, Denver, Colorado.

Swiftpage, Saleslogix Marketplace web site, Jul. 28, 2013, Denver, Colorado.

WHCMS Limited, WHCMS web site, Aug. 4, 2013, Milton Keynes, United Kingdom.

Advisory Action for U.S. Appl. No. 14/068,638 dated Mar. 28, 2019.

Final Office Action for U.S. Appl. No. 14/068,638 dated Jan. 18, 2019.

Final Office Action for U.S. Appl. No. 14/068,638 dated Jul. 2, 2020.

Final Office Action for U.S. Appl. No. 14/068,638 dated Jul. 5, 2017.

Non-Final Office Action for U.S. Appl. No. 14/068,638 dated Feb. 5, 2020.

Non-Final Office Action for U.S. Appl. No. 14/068,638 dated Jun. 7, 2018.

Non-Final Office Action for U.S. Appl. No. 14/068,638 dated Sep. 1, 2016.

Notice of Allowance for U.S. Appl. No. 14/068,638 dated Feb. 26, 2021.

* cited by examiner

Configuration Details

- 301a — Configuration Type:
- 301b — Name:
- 301c — Purchase Date:
- 301d — Warranty Expiration:
- 301e — Installation Date:
- 301f — Installed By:
- 301g — Location:
- 301h — Department:
- 301i — Status:
- 301j — Vendor:
- 301k — Manufacturer:
- 301l — Model Number:
- 301m — Serial Number:
- 301n — Tag Number:
- 301o — Bill Customer?:
- 301s — Vendor Notes:
- 301t — Notes:

Company/Contact Details

- 301p — Company:
- 301q — Contact:
- 301r — Address:
  - City:
  - State:
  - Zip:
  - Country:

301u — Configuration Questions
- * 1. Server Role:
- * 2. Operating System Version:

| | |
|---|---|
| 402a | Company: [                    ] |
| 402b | Survey: [                    ] |
| 402c | Survey Questions |
| | * 1. What is the budget? [          ] |
| | 2. Who is the competition? [          ] |
| | 3. What is the timeframe? [          ] |

Fig. 4B

| General Project | |
|---|---|
| Project Type | — 701a |
| Description | — 701b |
| Work Plan information | |
| Ticket Summary | — 702a |
| Part of Phase | — 702b |
| Budget Hours | — 702c |
| Notes | — 702d |
| Work Role | — 702e |
| Tasks | — 702f |

Fig. 7A

Template | Work Plan

Create new project template phase

- 703a → Phase Name:
- 703b → Part of Phase:
- 703c → ☐ Mark as milestone
- 703d → ☐ Add-on phase to be billed separately?
- 703e → Notes:

901a — Description: [      ]
901b — Inactive: ☐
901c — Action Type: [      ]
901d — Group: [      ]
901e — Perform action after [   ] days

Fig. 9

| Trigger | Description |
|---|---|
| SLA-MinutesTarget | Ticket request time has less than {value} minutes left from SLA target. Calculates the age of ticket and applies SLA response goal's hours. |
| SLA-PercentTarget | Ticket request time is {value} percent of SLA target. This calculates the age of ticket and applies SLA response goal's percent, meaning the trigger will notify you based on the percentage of time left until the SLA target is missed. |
| SR-Acknowledged | Service ticket has been acknowledged. Looks to see if there are any resources on the ticket which have acknowledged their resource entry. |
| SR-Age | Service ticket is more than "{value}" hours old. Calculates the age of the ticket based on date that it was entered as well as applying SLA hours setting (office hours or 24 hours). |
| SR-AgeAssigned | Service ticket was initially assigned more than "{value}" hours ago. Calculates the age since the first resource record was entered. Applies SLA settings in regard to office hours. |
| SR-AgeEntered | Service ticket was initially entered more than "{value}" hours ago. Calculates the age of the ticket based on date that it was entered. Applies SLA settings in regard to office hours. |
| SR-AgeNoTime | Finds tickets where there are time entries but they have not been updated in the last 'x' hours. If the ticket is open, the current date is used as the end date of the calculation. If the ticket is closed, then the close date of the ticket is used as the end date. |
| SR-AgeOnHold | Service ticket has been on hold for more than "{value}" hours. Calculates the age since the ticket was set to a status that is marked as "We are waiting" (do not escalate). Applies SLA settings in regard to office hours. |
| SR-AgeReqd | Service ticket had a required date more than "{value}" hours ago Checks for X amount of hours passed the required date on the ticket. |
| SR-AgeResPlan | Service ticket had a resolution plan more than "{value}" hours ago. Calculates the age since the ticket was marked as Resolution Plan. Applies SLA settings in regard to office hours. |
| SR-AgeResponded | Service ticket was responded to more than "{value}" hours ago. Calculates the age since the ticket was marked as Responded. Applies SLA settings in regard to office hours. |

Fig. 11C 1103 1104

| Trigger | Description |
|---|---|
| SR-Assigned | Service ticket has been assigned. Looks to see if any resources are associated with the ticket. |
| SR-AssignedMember | The {value} is assigned to the Service ticket. Looks to see if the specified member is assigned to the Service ticket. |
| SR-BudgetPercent | The actual hours spent are more or equal to the {value} percent of budget hours on service or project tickets. This trigger enables Service Managers and Project Managers to be notified when the budgeted hours on a Service Ticket or Project line item (Project Ticket) approaches or exceeds the amount the manager has budgeted. By using this trigger, project managers can automatically get notified when part of the project is getting off track, while Service Managers can set the budget percent in order to efficiently budget time. |
| SR-Closed | Service ticket is closed. Checks status of ticket to see if it is in a closed status. |
| SR-Company | Company on the service ticket. |
| SR-CompanyType | Company type is "{value}." Looks at the company type that is assigned to the company that is selected on this item. |
| SR-CoTerritory | Company is in "{value}" territory. Looks at the owner level that is assigned to the company that is selected on this item. |
| SR-Customer Updated | The Customer has updated the ticket. This will cause the ticket to appear as bold on the Service Board Multi-line screen. This is also available for use on projects. |
| | If the update to the ticket was done through email connector, it will modify the yellow update bar. If the update was done through the Customer Portal, the yellow flag will also be updated and the Customer Update flag will be selected (as well as register with the Workflow Rule). |
| SR-Item | Ticket Item = "{value}" Looks at the Service Item that is attached to the service ticket. |
| SR-LastUpdate-Days | Service Ticket Last Updated more than "{value}" days ago. Checks for the last date the service ticket was updated. |
| SR-LastUpdate-Minutes | Service Ticket Last Updated more than "{value}" minutes ago. Checks to see how long ago the ticket was updated. |
| SR-NeverAssigned | Service ticket has not been assigned. Looks to see if no resources are associated with the ticket. |
| SR-No-Config | This indicates that there are no attached configurations. |

Fig. 11D

| Trigger | Description |
|---|---|
| SR-NoResPlan | Service ticket does not have a resolution plan. Checks to see if this ticket has not been marked as Resolution Plan. |
| SR-NotAcknowledged | Service ticket has not been acknowledged. Looks to see if there are any resources on the ticket which have not acknowledged their resource entry. |
| SR-NoTime | Service ticket has no time entered. Looks to see if the Service ticket has no time records entered. |
| SR-NotResolved | Service ticket has not been resolved. Checks to see if this ticket has not been marked as Resolved. |
| SR-NotResponded | Service ticket has not been responded to. Checks to see if this ticket has not been marked as Responded. |
| SR-Open | Service ticket is open. Checks status of ticket to see if it is in an open status. |
| SR-Priority | Priority is "{value}." Selects based on a comparison of the priority that is assigned to the ticket. |
| SR-ProductReceived | Checks to see if the product(s) on a ticket have been marked as Received and is used to determine when all products are received on a ticket. For example, If a ticket has 5 products on it, when all 5 are marked 'Received' the trigger will fire. |
| | If the product starts from a Sales Order and is marked 'Received' and then converted to a ticket, the workflow trigger will fire. |
| SR-Resolved | Service ticket has been resolved. Checks to see if this ticket has been marked as Resolved. |
| SR-ResPlan | Service ticket has a resolution plan. Checks to see if this ticket has been marked as Resolution Plan. |
| SR-Responded | Service ticket has been responded to. Checks to see if this ticket has been marked as Responded. |
| SR-SchedAge | Latest open scheduled item older than "{value}" days. Looks at the last scheduled resource record that is open and compares the scheduled date to the current date. |
| SR-SchedPastDue | Latest open scheduled item is past due. Looks at the last open scheduled resource to see if it is past due. |
| SR-SLAType | Service ticket's Service Level Agreement is "{value}." Allows you to specify the SLA that should be included. |
| SR-Status | Service ticket status. |
| SR-StatusChange-Age | Ticket status last changed more than "{value}" hours ago. Applies SLA settings in regard to office hours. |

Fig. 11E

| Trigger | Description |
|---|---|
| SR-Status-Previous | This indicates that the ticket was previously in {value} status. |
| SR-SubType | Ticket SubType = "{value}"   Looks at the Service Sub Type that is attached to the service ticket. |
| SR-Summary | Summary LIKE "{value}." Compares text to summary on the Service ticket. |
|  | If searching the summary line for a word within brackets (ie. "[searchterm]"), please use the format "[[]searchterm]" when completing the value for the trigger. |
| SR-Type | Ticket Type = "{value}"   Looks at the Service Type that is attached to the service ticket. |

Fig. 11F

| Trigger | Description |
|---|---|
| PM-Budget | Actual hours are greater than or equal to {value}% of budget. The number of the percent can be greater than 100. |
| PM-Closed | Project is Closed. Checks for projects that have been closed in the General Tab of the Project. |
|  | The Project Status can be marked as 'Closed' on the General Tab, but the individual project tickets on the Work Plan tab that are in an 'Open' status will remain open. |
|  | The PM-Closed workflow trigger will look for closed projects, but return a list of the closed tickets on the project to run the workflow actions on. |
| PM-Company | The Company for the project. |
| PM-Downpayment-Paid | All project downpayment invoices are marked paid. |
| PM-Est-EndDate-Fut | There are less than "{Value}" days before the Project estimated end date. |
| PM-Est-EndDate-Past | There are more than "{value}" days after the Project estimated end date. |
| PM-Est-StartDate-Fut | There are less than "{value}" days before the Project estimated start date |
| PM-Est-StartDate-Past | There are more than "{value}" days after the Project estimated start date. |
| PM-First-SchedDate-Fut | There are less than "{value}" days before the first scheduled date. |
| PM-First-SchedDate-Past | There are more than "{value}" days after the first scheduled date. |
| PM-Last-SchedDate-Fut | There are less than "{value}" days before the last scheduled date. |
| PM-Last-SchedDate-Past | There are more than "{value}" days after the last scheduled date. |
| PM-Open | Project is Open. Checks for projects that are in an 'Open' status on the General Tab of the Project. |
|  | The PM-Open workflow trigger will look for open projects, but return a list of the open tickets on the project to run the workflow actions on. |
| PM-Product_Received | Project has all products received. |
| PM-Status | Project is in "{value}" status. |
| PM-Type | Project Type = "{value}" |

1105 — Trigger column
1106 — Description column

Fig. 11G

| Trigger | Description |
|---|---|
| SV-Company | Assigned Company. |
| SV-Ticket-ContactMe | Contact Me was selected on the survey. Contact me was selected on the service survey. |
| SV-Ticket-ScoreGreaterThan | Survey score is greater than {value} points. Total points on the survey was greater than the specified number. |
| SV-Ticket-ScoreLessThan | Survey score is less than {value} points. Total points on the survey was less than the specified number. |
| SV-Ticket-SurveyName | Survey name is "{value}". The survey name is the same as the value specified. |

Fig. 11H

| Trigger | Description |
|---|---|
| AGR-Anniversary | Agreement with no end date has an anniversary in the next {value} days. Finds agreements with no ending date specified and get the agreement start date. The month and day of the start date is used to compare to the current date. |
| AGR-Company | Assigned Company the agreement is for. |
| AGR-DateEnd | {value} days before agreement expires. Compares the ending date on the agreement to the current date and any number of days that fall below this value. |
| AGR-Remaining | {value}% or less agreement amount remaining. Calculates the amount remaining on the agreement and computes the percent remaining. |
| AGR-Type | Agreement is of type "{value}". Compares to the Agreement Type that was on the agreement |

Fig. 11I

| Trigger | Description |
| --- | --- |
| C-Company | The Company the Configuration is for. |
| C-ConfigExpire | {value} days before Configuration expiration date. Looks at the Warranty Expiration date on the Configuration. |
| C-ConfigStatus | Configuration is in "{value}" status. Looks at the status of the Configuration. |
| C-ConfigType | Configuration Type is "{value}". Compares to Configuration Types that were setup. |

Fig. 11J

| Trigger | Description |
| --- | --- |
| INV-Age | Invoice date is more than "{value}" days ago |
| INV-AgeCreated | Invoice was created more than "{value}" days ago |
| INV-Closed | Invoice is in a closed status |
| INV-Company | The company the invoice is for. |
| INV-DateClosed | Invoice was closed more than "{value}" days ago |
| INV-NotPaid | Invoice is not paid in full. Only includes invoices with an invoice amount greater than 0. If the invoice amount is 0 or less than zero, it will not be picked up by this trigger. |
| INV-Open | Invoice is in an open status |
| INV-Paid | Invoice is paid in full. Only includes invoices with an invoice amount greater than 0. If the invoice amount is 0 or less than zero, it will not be picked up by this trigger. |
| INV-Status | Invoice is in "{value}" status |
| INV-Type | Invoice type = "{value}" |

Fig. 11K

| Action Type | Availability | Required Fields | Optional Fields |
|---|---|---|---|
| Add to Group | All | Group - If you select this action, you must select a group. The contact for the item will be added to the group specified. | |
| Assign Resource | Service | Assign Who - Select the person to assign the ticket to.<br><br>Member From - Select the member from whom you would like to send the notification.<br><br>Subject - A subject line is required to save the Action. You can use any of the Available Fields in the subject line. | Notes - Notes are optional. You can use the Available Fields to enter notes or you can Import an HTML. |
| Change Board | Service | Set Board To - Select the board that you want to move the ticket to.<br><br>Set Status To - The default status will display here, if you want the ticket to be set to a different status, select it in the drop down. | Set Type - The default type will display here. If you want the ticket to be set to a different type, select it from the drop down. |
| Change Status | Service and Project | Set Status To - The default status will appear here, if you want the ticket to be set to a different status, select it in the drop down. | |
| Create a Service Ticket | All | Template - Select the Template that you want to use to create the ticket. | |

Fig. 11L

| Action Type | Availability | Required Fields | Optional Fields |
|---|---|---|---|
| Create Activity | All | Create For - Select the person whom you want to create the activity.<br><br>Member From - Select the person assigning the activity.<br><br>Subject - A subject line is required to save this action. You can use any of the Available Fields in the subject line.<br><br>Activity Type - Select an activity type.<br><br>Activity Status - Select a status for the activity. | Notes - Notes are optional. You can use the Available Fields to enter notes or you can Import an HTML template to fill in the notes field. |
| Send Email | All | Send To - Select the person you want to send the email to.<br><br>Member From - Select the person who the email is from.<br><br>Subject - A subject line is required to save this action. You can use any of the Available Fields in the subject line. | Attach - Use this option to attach the audit trail to the email that goes out.<br><br>CC - Use this option to carbon copy someone on the email.<br><br>Bcc - Use this option to blind carbon copy someone on the email.<br><br>Notes - Notes are optional. You can use the Available Fields to enter notes or you can Import an HTML template to fill in the notes |

Columns: 1115, 1116, 1117, 1118

Fig. 11M

Time Entry and Closed Loop / Automatic Email Options

1302a → Time Entry Options:
When a new Time Entry is added, add notes to:
☐ Ticket Detail Description
☐ Ticket Internal Analysis
☐ Ticket Resolution Automatic Email Options
1302b → Sent From:
1302c → Display Name:
1302d → Use Member as Display Name? ☐

Send To:   Using Template:
1302e → ☐ Contact
1302f → ☐ Resource

Closed Loop Options:
☐ Time Entry option cannot be changed ← 1302g
☐ Detail Description cannot be updated directly ← 1302h Turn on Closed Loop features for the following:
☐ Updates to Detail Description ← 1302i
☐ Updates to Internal Analysis ← 1302j
☐ Updates to Resolution ← 1302k

| Company Name | Project Name | Status Descrip |
|---|---|---|
| | | All Open ▼ |
| Beach Comber Interior Design | MS Dynamics Implementation | Open |
| Brown, Bufford and White A... | VoIP Implementation | In Progress |
| Brown, Bufford and White A... | Phase 2 / Sharepoint site | In Progress |
| Brown, Bufford and White A... | Web Development | In Progress |
| Chris Craft Boats | Platinum MSP/Outsourced IT solution | On-Hold |

1402 → (header row)
1401 → Brown, Bufford and White A... Phase 2 / Sharepoint site

Fig. 14A

| Name | Description |
|---|---|
| Company Name | Name of the company that the project is assigned to. |
| Project Name | Name of the project. |
| Status Description | Current status of the project. |
| Manager Name | Name of the project manager. |
| Type Description | Type of project. The types can be defined elsewhere in the business automation system. |
| Date Start | Start date of the project. |
| Date End | End date of the project. |
| Billing Method | How the project will be billed. |
| Revenue | Estimated revenue for the project. |
| Amount Billed | Sum of the invoice amounts so far minus any tax computed. |
| Amount WIP | Labor costs that have been completed and approved but not yet invoiced. |
| Amount Unapproved | Labor costs that have been completed but not yet approved or invoiced. |
| Amount Remaining | Revenue - (Amount Billed + Amount WIP) |
| Hours Budget | Sum of the budgeted hours for all tickets in the project. |
| Hours Billed | Sum of the hours invoiced on the project so far. |
| Hours WIP | Hours that have been completed and approved but not yet invoiced. |
| Hours Unapproved | Hours that have been completed but not yet approved or invoiced. |
| Hours Remaining | Hours Budget - (Hours Billed + Hours WIP) |
| Time Billable | Billable hours multiplied by rate. |
| Time Nonbillable | Do Not Bill hours multiplied by rate. |
| Expense Billable | Sum of billable expenses. |
| Expense Nonbillable | Sum of Do Not Bill expenses. |
| Location | Location of project. |
| Group | Group of the project. |

Fig. 14B

| Data | Description |
|---|---|
| Board Name | The name for the project board. |
| Location | The location for the project board. |
| Business Unit | The business unit assigned to the project board. |
| Board Icon | The icon displayed to represent the project board. |
| Signoff Template | The template containing the information and format to display in the client signature section of the project tickets from the project board. |
| Work Role | The default work role to assign on project tickets on this project board. This work role overrides the work role defined for the individual assigned to project ticket. |
| Work Type | The default work type to assign on project tickets on this project board. The work type overrides the work type defined for the individual assigned to the project ticket. |
| Bill Time | The default billing option for labor costs on project tickets on this project board. The options are:<br>Billable - The costs are billable to the customer.<br>Do Not Bill - The costs are not billable to the customer, and no invoice is generated for the customer.<br>No Charge - The costs are not billable to the customer, but a zero-dollar invoice is generated.<br>No Default - The default is determined elsewhere in the system. |
| Bill Expense | The default billing option for external costs on project tickets on this project board. The options are the same as those for Bill Time. |
| Bill Products | The default billing option for parts costs on project tickets on this project board. The options are the same as those for Bill Time. |
| Bill projects only after they have been closed | Whether to prevent open projects on this Project Board from being invoiced. The entire project needs to be set to a 'Closed' status in order for it to be billed, not just the individual project tickets. |
| Bill unapproved time and expense records | Whether to invoice project ticket related time and expense records that have not been approved. |
| Where notes are added for a new time entry | Specify where the notes from the time records will be added by default. Independently enable the Detail Description, Internal Analysis, and Resolution |
| Sent From | Default email address to be used on all project ticket emails. |
| Display Name | Name to display on project ticket emails. |
| Use Member as Display Name | Whether to use the name of the individual using the project board as the name that displays when sending an email via the Closed Loop. |

Fig. 14C

| Data | Description |
|---|---|
| Send to Contact | Whether the contact on the project ticket will receive an email by default when the ticket is updated. |
| Contact Template | The email template to use for sending to the contact. |
| Send to Resource | Whether assigned resources on the project ticket will receive an email by default when the ticket is updated. |
| Resource Template | The email template to use for sending to assigned resources. |
| Closed Loop Options | The following settings are available: |
| Time Entry option cannot be changed | Whether a time record will always be created with Closed Loop. |
| Detail Description cannot be updated directly | Whether the Detail Description field must be updated using the Closed Loop Entry screen. |
| Updates to Detail Description | Whether Closed Loop notes are populated in the detail description. |
| Updates to Internal Analysis | Whether Closed Loop notes are populated in the Internal Analysis |
| Updates to Resolution | Whether Closed Loop notes are populated in the Resolution field. |
| Detail Description Sort Order | Whether new additions (notes) appear in ascending or descending order by ticket number in the Detail Description. |
| Internal Analysis Sort Order | Whether new additions (notes) appear in ascending or descending order by ticket number in the Internal Analysis. |
| Resolution Sort Order | Whether new additions (notes) appear in ascending or descending order by ticket number in the Resolution. |
| Service Dispatcher | The Individual who is designated as the Service Dispatcher. This person is notified by email based on the workflow setup in the project board. |
| Service Manager | The individual who is designated as the Service Manager. This person is notified by email based on the workflow setup in the project board. |
| Reopen closed tickets | Whether the Email Connector should reopen a project ticket if a client responds through the Closed Loop to a closed project ticket. |
| Set them to status | The project ticket status for reopened tickets. |
| Re-open assigned resources | Whether to re-assign the resources to the project ticket after it has been reopened. |
| Create new ticket when sender's company doesn't match | Whether to create a new ticket when a ticket comes in and the contact's company domain URL does not match the originating ticket company domain URL. |

Fig. 14D

| Data | Description |
|---|---|
| Never re-open a ticket more than | Whether to prevent the Email Connector from reopening a ticket that is older than the specified number of days. |
| AutoClose Status | The status to apply to project tickets when every individual associated with the ticket uses a mobile device interface to mark their time record as "done". |

Fig. 14E

| Sort | Service Status | Service Box |
|---|---|---|
| 0 | New | HR-JOBS |
| 1 | Job App Submittal* | HR-JOBS |
| 2 | >01 Sent* | HR-JOBS |
| 3 | >02 Sent* | HR-JOBS |
| 4 | >Job-Request Resume* | HR-JOBS |
| 5 | Internal Review | HR-JOBS |
| 6 | Promising App - Pre-Screening | HR-JOBS |
| 7 | >Schedule Phone Interview* | HR-JOBS |
| 8 | Phone Interview | HR-JOBS |
| 9 | >Schedule In-Person Interview* | HR-JOBS |
| 20 | In-Person Interview 1 | HR-JOBS |
| 21 | In-Person Interview 2 | HR-JOBS |
| 22 | Team Interview | HR-JOBS |
| 40 | >Thank you - A List* | HR-JOBS |
| 41 | >Thank You - A List - No Opening* | HR-JOBS |
| 42 | >Thank You - Did not make cut* | HR-JOBS |
| 43 | >Thank You NTY* | HR-JOBS |
| 79 | Extend Offer | HR-JOBS |
| 80 | >Offer Accepted* | HR-JOBS |
| 81 | >Offer Declined* | HR-JOBS |
| 95 | Reopened by Applicant Reply | HR-JOBS |
| 96 | NoReply* | HR-JOBS |
| 97 | Closed | HR-JOBS |
| 98 | Closed - Updated HR System | HR-JOBS |
| 99 | Request Canceled | HR-JOBS |

Columns: 1531a (Sort), 1531b (Service Status), 1531c (Service Box). Row marker 1531d points to row 1.

| Scheduled Resources Remaining | | | |
|---|---|---|---|
| Done Resource | | Start | Finish |
| ☐ Don Bentz | 👤 📧 | | |
| ☐ Jason Horne | 👤 📧 | | |
| 1535 → ☐ Jason Horne | 👤 📧 | 2/7/2011 | 2/7/2011 |

Fig. 15G 1537a 1537b

| Question | Answer |
|---|---|
| Can you provide legal proof of eligibility to work in the United States? | YES (10 points) |
| Do you consent to a credit check and background check as part of pre-employment screening? | YES (10 points) |
| Do you consent to a drug test as part of pre-employment screening? | YES (10 points) |
| Have you ever been convicted of fraud, theft or a felony? (If yes please explain at the bottom of this questionare) | NO (10 points) |
| Our company policies forbid the use of controlled substances including any form of tobacco, illegal drugs and alcohol while on the job. Would you abide by these policies? | YES (10 points) |
| Our company image policy requires a business or business-casual appearance while on the job. Would you abide by this policy? | YES (10 points) |
| Some tasks require ability to lift 50 pounds as high as 4 feet or higher from the floor. Are you able to perform these tasks? | YES (10 points) |
| Some tasks require mobility including crawling under desks and working in confined spaces. Are you able to perform these tasks? | YES (10 points) |
| Some of our positions require scheduling to be on-call 24/7 including weekends and holidays. Are you available to work after-hours, weekends and holidays? | YES (10 points) |
| Do you have any conditions that might hamper your ability of availability to perform the job for which you are applying? | NO (10 points) |
| Do you have a valid Driver's License? | YES (10 points) |
| Some tasks require local travel during the work day. Do you have reliable and insured car, pickup truck or van? | YES (10 points) |

Total Points: 120

Fig. 15I 1537a 1537b

| Question | Answer |
|---|---|
| What is your highest level of formal education? | Bachelor's Degree (15 points) |
| How many years of employment experience do you have working in the job for which you are applying? | 5-10 (5 points) |
| How many technical certifications have you earned? (Microsoft, Novell, Cisco, CompTIA, Apple, SonicWALL, etc) | Less than 1 (1 points) |
| Rate your ability to deal with a fast-paced work environment. | Very Good (8 points) |
| Rate your ability to adapt to rapid change. | Very Good (8 points) |
| Rate your ability to work independently. | Very Good (8 points) |
| Rate your ability to work as part of a team. | Very Good (8 points) |
| How many separate employers have you had in the past 3 years? | 1 (10 points) |
| How long were you employed at your last job? | 4-6 years (6 points) |
| How long were you employed at your second-to-last job? | 2-4 years (4 points) |

Total Points: 73

SYSTEMS AND METHODS FOR PROVIDING A MARKETPLACE FOR ACCESSORIES OF A BUSINESS AUTOMATION SYSTEM

CROSS-REFERENCE OF RELATED APPLICATIONS

This application is a continuation of and claims priority to U.S. application Ser. No. 14/068,638 filed on Oct. 31, 2013, titled "SYSTEMS AND METHODS FOR PROVIDING A MARKETPLACE FOR ACCESSORIES OF A BUSINESS AUTOMATION SYSTEM," the contents of which is hereby incorporated herein by reference in its entirety.

FIELD OF THE DISCLOSURE

The present disclosure generally relates to business automation systems. More specifically, the present disclosure relates to providing a marketplace system to allow transactions of accessories for a business automation system.

BACKGROUND OF THE INVENTION

Business automation systems can facilitate the business processes of an organization by reducing the opportunity for human errors. As businesses vary their processes or seek new processes, it may be challenging for a business automation system to extend its functionality.

SUMMARY OF THE INVENTION

Business automation systems can facilitate the smooth operation of a business by automating and tracking many of the processes, and providing notifications, communications, and follow-up on the processes that necessarily involve human interaction. These business automation systems interact with many functions in the organization, including purchasing, billing, finance, support, service, engineering, shipping, receiving, and so on. As such, business automation systems may function essentially as business process management systems and can help to smooth the operation of many of the business processes of an organization.

Business automation systems may include a general framework that can be customized with many sorts of configurations and addon components. This customization can allow the business automation systems to be modified to fit the processes of an existing business. In this way, business automation systems can help to improve the function of an existing organization without requiring any changes to the way the organization works. Then, over time, the organization can identify process bottlenecks using the auditing tools in the business automation system, and correct the bottlenecks incrementally.

However, it may be desirable to use a business automation system at or about the inception of a relatively new organization with few or no established business processes. In this case, the customization and configuration of a business automation system can be challenging because of the relatively large amount of work required to configure the basic tools and processes needed by the business. For this and other similar situations, what is desired is a "one-stop shopping" marketplace for acquiring the configurations and addons needed to set up and run the business automation system for the desired type of business with relatively little initial effort.

If the business automation system is relatively flexible, the marketplace can be organized in a way to provide convenient packages (e.g., "starter packages") for different types of businesses. For example, one set of configurations and addons could be appropriate for a Managed Service Provider (MSP) business, another set could be appropriate for a software development business, another set could be appropriate for a professional services contracting organization, and so on.

The marketplace can also be useful for established businesses, including both business that are already using a business automation system and those that are not. For example, the business may want to offer new services and may be interested in acquiring tools for managing those services. Or, the business may be interested in improving some processes that are not working well, and may want to acquire the knowledge and best practices of others rather than discovering better processes anew.

At least one aspect of the present disclosure is directed to a system for providing a marketplace for a business automation system comprising at least one processor executing on a computing device. In some embodiments, the system includes an upload module executing on the computing device which can receive, responsive to a first user, a configuration of the business automation system of the first user. The system can include an accessory creation module executing on the computing device which can create, based on the configuration, an accessory comprising at least one of a solution set, a service board, and a project board. The system can include a download module executing on the computing device which can verify, responsive to a second user, the suitability of the accessory for the business automation system of the second user, and transmit the accessory to the second user.

At least one aspect is directed to a method of providing a marketplace for a business automation system. In some embodiments, the method includes receiving a configuration of the business automation system of a first user. For example, an upload module executing on a computing device can receive the configuration of the business automation system responsive to receiving a request from a first user. The method can include creating an accessory that includes at least one of a solution set, a service board and a project board. For example, an accessory creation module can create the accessory based on the configuration. The method can include verifying the suitability of the accessory for the business automation system of a second user. For example, a download module executing on the computing device can verify the suitability of the accessory for the second user responsive to receiving a request from the second user. The method can include transmitting the accessory to the second user. For example, the download module may transmit the accessory to the second user. The accessory can include a solution set that includes at least one of the service board, the project board, an instruction video and a checklist.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 2A-C are illustrative examples of an embodiment of a user interface for managing an agreement.

FIG. 3 is an illustrative example of an embodiment of a user interface for managing a product configuration.

FIG. 4A is an illustrative example of an embodiment of a user interface for managing a CRM survey.

FIG. 4B is an illustrative example of an embodiment of a user interface for using a CRM survey that is associated with a company.

FIG. 7A is an illustrative table of an embodiment of the information in a project template.

FIG. 7B is an illustrative example of an embodiment of a user interface for managing a phase in a project template.

FIG. 8A is an illustrative example of an embodiment of a user interface for managing a service template.

FIG. 8E is an illustrative example of an embodiment of a user interface for managing finance aspects of a service template.

FIG. 9 is an illustrative example of an embodiment of a user interface for managing a track.

FIGS. 11C-K are illustrative tables of an embodiment of the values for workflow rule triggers in an event.

FIGS. 11L-M are illustrative tables of an embodiment of the values for workflow rule actions in an event.

FIGS. 13A-C are illustrative examples of an embodiment of a user interface for managing a service board.

FIG. 13D is an illustrative example of an embodiment of a user interface for using a service board.

FIG. 13E is an illustrative example of an embodiment of a user interface for using a dispatch portal in a service board.

FIG. 14A is an illustrative example of an embodiment of a user interface for managing a project board.

FIG. 14B is an illustrative table of an embodiment of the fields in the user interface for managing a project board.

FIGS. 14C-E are illustrative tables of an embodiment of the information pertaining to a project board.

FIGS. 15C-H are illustrative examples of an embodiment of a user interface for managing a human resources solution set.

FIGS. 15I-J are illustrative tables of an embodiment of CRM surveys in a human resources solution set.

FIGS. 15K-L are illustrative examples of an embodiment of a user interface for using CRM surveys in a human resources solution set.

Like reference numbers and designations in the various drawings indicate like elements.

DETAILED DESCRIPTION

Figure 1:
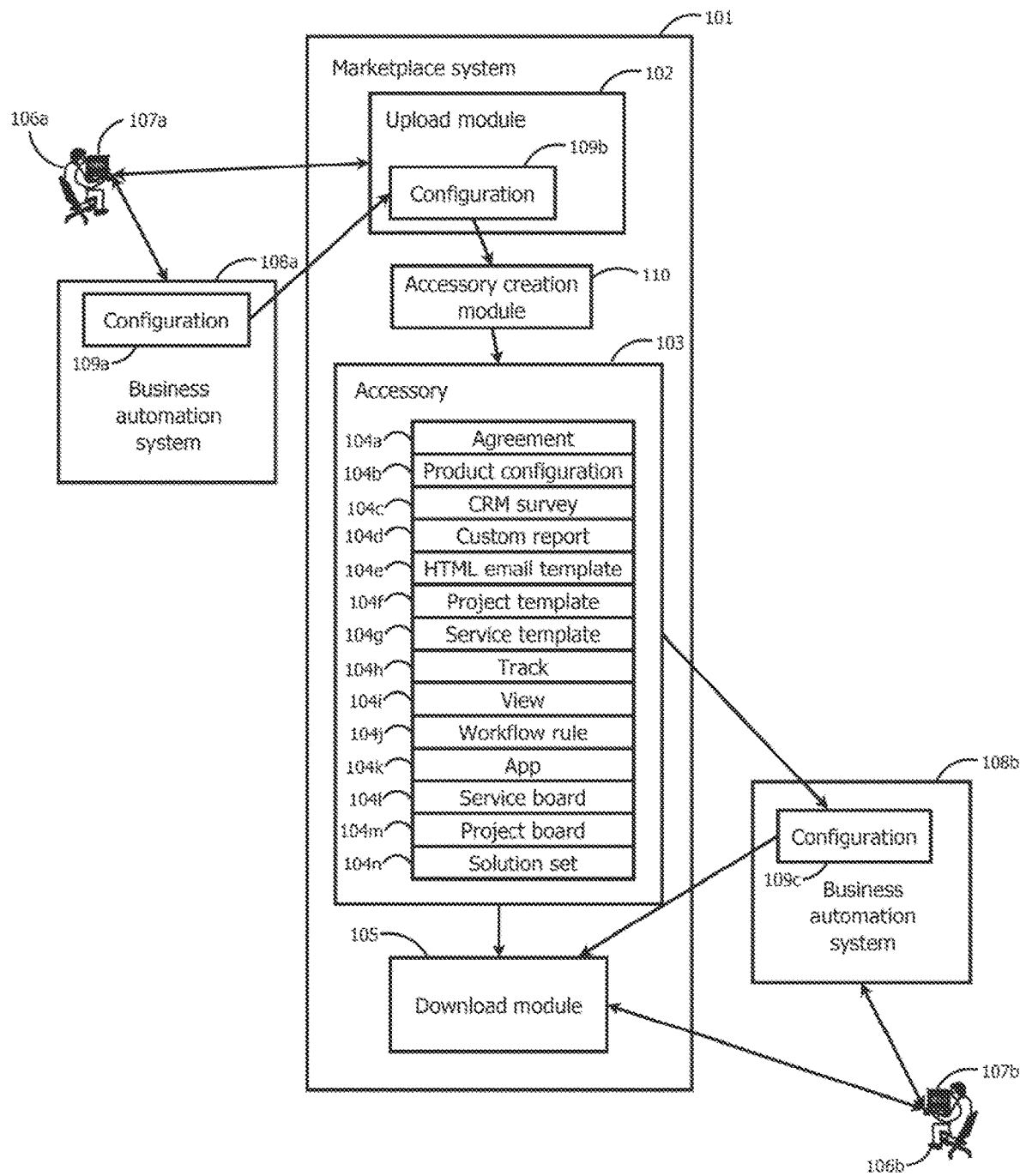
FIG. 1 is an illustrative block diagram of an embodiment of a marketplace system for a business automation system.

Systems and methods of the present disclosure can facilitate a marketplace for a business automation system comprising at least one processor executing on a computing device.

A first user of the business automation system can develop a set of configurations and applications on the business automation system that can provide a useful set of business processes. These configurations and applications can be tested and refined on the business automation system, and then identified and uploaded to the marketplace system along with information about their parameters and usage. The marketplace system can package the uploaded information into accessories and store the accessories.

A second user of the business automation software can browse the marketplace, looking for tools to help solve a business process issue, or even a solution to provide a complete set of business processes. The user may find a set of configurations and applications that the first user uploaded, and may want to know more about the configurations and applications. The second user can read reviews and ratings contributed by other users who have used the configurations and applications. If the second user is convinced that these might be useful, the second user can download the configurations and applications and then install the configurations and applications on the business automation system. in order to make the configurations and applications available for use. After working with the configurations and applications for a while, the second user can submit ratings and reviews with opinions formed from actual experience.

The first user may decide to offer the configurations and applications free of charge, or may decide to set a price (or other valuable consideration) for the configurations and applications. The price can be transacted in actual money, or may use internal points that can be earned in various ways from the provider of the business automation system. The marketplace system manages the transaction from buyer to seller.

In an illustrative example, a dentist may like the features of the business automation system, but may find that the business automation system needs certain customizations to work smoothly in a dental office. For example, the business automation system may need an interface to a third party system for interfacing to a dental X-ray machine and managing the images. The business automation system may also need questionnaires for new patients that are specific to dental and medical issues. The business automation system may need some customization to the scheduling and time management to make it convenient for dental technicians to schedule patient appointments at the end of visits. The dentist can make these customizations, and can realize that other dental offices could also use these customizations to advantage. The dentist can upload the set of customizations and applications to the marketplace, labeling the customizations as a package for setting up a dental office. Other dentists can download and install the package, and may immediately benefit from the automation and process control in their offices.

FIG. 1 is an illustrative block diagram of an embodiment of a marketplace system for a business automation system. In some embodiments, a marketplace system 101 can include one or more of the following: an upload module 102, a download module 105, and one or more accessories 103. Each accessory 103 can be one of an agreement 104a, a product configuration 104b, a CRM survey 104c, a custom report 104d, an HTML email template 104e, a project template 104f, a service template 104g, a track 104h, a view 104i, a workflow rule 104j, an app 104k, a service board 104l, a project board 104m, and a solution set 104n. A user 106a can use a device 107a to interact with the upload module 102 and to interact with a business automation system 108a. The upload module 102 may retrieve the configuration 109a of the business automation system 108a. An accessory creation module 110 can use the retrieved configuration 109b to create an accessory 103. Another user 106b can use a device 107b to interact with the download module 105 to select an accessory 103, and to interact with a business automation system 108b. The download module 105 may retrieve the configuration 109c of the business automation system 108b, and verify that the selected accessory 103 is compatible and appropriate with the business automation system 108b. For example, the accessory 103 may require a specific minimum version of the business automation system 108b, or the accessory 103 might require that another accessory already be present on the business automation system 108b, or the accessory 103 might require a configuration setting that would be incompatible with an existing configuration setting 109c in the business automation system 108b, or the accessory 103 might be known to be incompatible with another accessory that is already present on the business automation system 108b, and so on. Based on the verification, the download module 105 may initiate the transfer of the selected accessory 103 to the business automation system 108b, where the selected accessory can be used to update the configuration 109c of the business automation system 108b.

The devices 107a and 107b, business automation systems 108a and 108b, and marketplace system 101 may be connected by a network. The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The one or more servers associated with the marketplace system 101 and business automation systems 108a and 108b do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

The system and its components, such as a marketplace system 101, business automation systems 108a and 108b, and modules 102, 103, 105, and 110, may include hardware elements, such as one or more processors, logic devices, or circuits. For example, the system and its components may include a bus or other communication component for communicating information and a processor or processing circuit coupled to the bus for processing information.

The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as a marketplace system 101, devices 107a and 107b, business automation systems 108a and 108b, and modules 102, 103, 105, and 110, may include, e.g., computing devices, desktop computers, laptop computers, notebook computers, mobile or portable computing devices, tablet computers, smartphones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 2A:
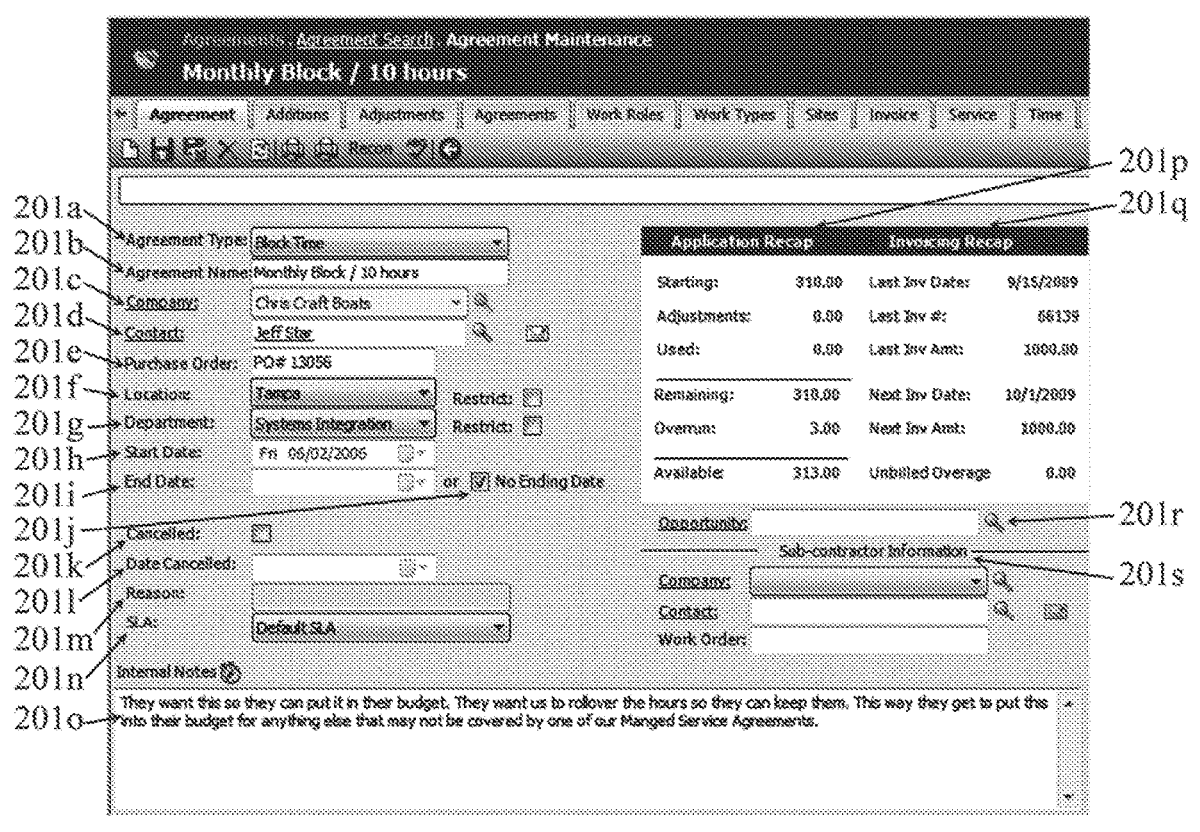

FIG. 2A is an illustrative example of an embodiment of a user interface for managing an agreement. As seen with respect to FIG. 1, an agreement 104a can be an accessory 103. Agreements can automate the billing process and can provide a better view into profitability. Using agreements may enable tracking the hours that clients use on their contracts accurately, which can provide a clearer picture of the profitability of monthly contracts. Agreements may also enable setting specific Service Level Agreements (SLAs) on a per agreement basis. In one embodiment, and agreement may be a Managed Services agreement, which may include agreements for managed networks, managed servers, managed workstations, managed backups, or managed help desks. In one embodiment, an agreement may be a Maintenance agreement, which may include hardware maintenance or software maintenance. In one embodiment, an agreement may be an Equipment Rental agreement. In one embodiment, an agreement may be a Software Assurance agreement, which may include software testing and updates. In one embodiment, an agreement may be a Professional Services agreement, which may allow assignment of special rates to clients. In one embodiment, an agreement may be a Hosting agreement, which may include email hosting, web hosting, server hosting or application hosting. In one embodiment, an agreement may be a Block Time agreement, which may permit a fixed number of hours of service per month.

Turning to FIG. 2A, the agreement type 201a can be selected from a list that can be defined within the business automation system. The agreement type 201a can be applied to this particular agreement, and may be overridden. The agreement name 201b may be the unique name for this agreement for the company, and may also print on invoices associated with the agreement. The company 201c can be used to select the company with which this agreement is used. The contact 201d can be the primary contact for the company 201c, and may be overridden to use a different contact. The purchase order 201e can be a purchase order number from the customer, and may print on invoices associated with the agreement. The purchase order number 201e may not print on time summary invoices. The location 201f may be changed using the drop-down selection, and may be used to restrict the agreement to apply to only a single location within the company 201c. The department 201g may be changed using the drop-down selection, and may be used to restrict the agreement to apply to only a single department within the company 201c. The start date 201h may be the first date that time can be applied to the agreement. The start date 201h may be different from the Billing Start Date, which can specify when invoices for the agreement will start. If a workflow rule is based on the anniversary date of the agreement, the start date 201h may be used to calculate the anniversary date. The end date 201i can define the date after which no additional time can be entered against the agreement. If a workflow rule is based on the expiration date of the agreement, the end date 201i may be used as the expiration date. The option for no ending date 201j may indicate that the agreement continues until the agreement is cancelled. The cancelled option 201k can indicate that the agreement is cancelled and no longer active. If the cancelled option 201k is selected, the date cancelled 201l can be the last day that time entries can be entered against the agreement. The date cancelled 201l may also impact the billing; for example, if the date cancelled 201l is the second day of the month and the billing cycle is monthly, then the customer may be billed for that entire month. If the cancelled option 201k is selected, the reason 201m may be the reason why the agreement was cancelled, for internal documentation. The reason for cancellation may also appear in the internal notes 201o. The SLA 201n can indicate the service level agreement (SLA) that applies to this agreement. If no selection is made for the SLA 201n, the default SLA may apply to the agreement. The internal notes 201o can be any notes that are specific to the agreement, and may not appear on invoices associated with the agreement. The opportunity 201r may allow associating a sales opportunity with the agreement. If a sales rep is being paid a commission based on the opportunity, the opportunity 201r may need to be set up in order for the sales rep to receive the commission on the agreement. The sub-contractor information 201s may be for informational purposes only.

The application recap section 201p can display the number of hours, dollar amount, or number of incidents used in the agreement, and can display the remaining overrun or available resources for the agreement. The information in the application recap section 201p may be updated automatically as other updates are made elsewhere in the business automation system. The Starting amount may describe the limit set in the agreement, specified in the units set for the agreement, and may show zero if the agreement is set up to be unlimited. The Adjustments amount may show the total of any adjustments that are made to this agreement. The Used amount may show the total amount of resources that have been used against this agreement so far. If the agreement is measured in hours or currency, the Used amount may be updated when a time entry that is charged to the agreement is saved. If the agreement is measured in incidents, the Used amount may be updated when the agreement is added to a ticket. The Used amount can display as a negative number. The Remaining amount may show the sum of the Starting, Adjustments, and Used amounts, which can be the amount of resources that have not yet been used. The Remaining amount can be negative if the agreement allows overruns and there is an overrun. The Overrun amount can be the amount of overrun on the agreement, and may be charged to the agreement. If overruns are not allowed on the agreement, the Overrun amount may always display as zero. The Available amount can show the amount of resources still left for the agreement in the current billing cycle.

The invoicing recap section 201q can give updated information on the invoices created against the agreement. The invoicing recap section 201q may be updated at a regular interval, for example, every night. After an invoice is created for the agreement, the Next Inv Date value may not be updated for some period of time. The Last Inv Date value may be the date of the last invoice that was created for this agreement. The Last Inv # value may be the invoice number of the last invoice that was created for this agreement. The Last Inv Amt amount may be the amount of the last invoice that was created for this agreement. The Next Inv Date value may be the next invoice date, which may be the first day of the next period that is due for invoicing. The Next Inv Amt amount may be the next invoice amount, which may be the pre-tax amount of billing on the next invoice. The tax may not be calculated until the invoice is actually created. The Next Inv Amt amount may not be updated for some period of time. The Unbilled Overage amount may be the amount of unbilled overage for this agreement, which may not include the Overrun amount.

Figure 2B:
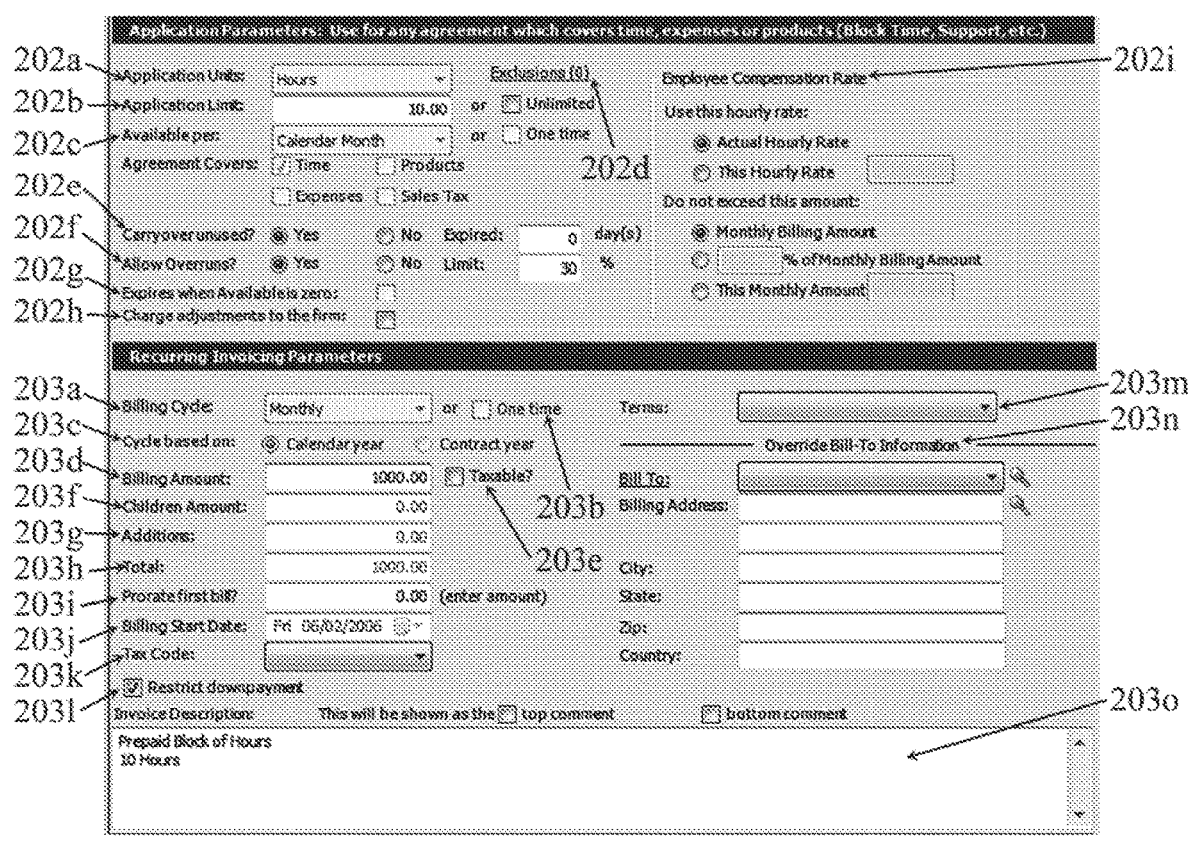

FIG. 2B is an illustrative example of an embodiment of a user interface for managing an agreement.

The application units 202a can select how the agreement will be billed. In one embodiment, the application units 202a can be set to Amount, which may allow the dollar amount that will be allotted to the agreement to be entered in the application limit 202b, and may allow applying time, expense, product, and sales tax against the agreement. In one embodiment, the application units 202a can be set to Hours, which may allow the number of hours that will be allotted to the agreement to be entered in the application limit 202b, and may allow only time to be covered by the agreement, by charging each hour of time entered against the agreement. In one embodiment, the application units 202a can be set to Incidents, which may allow the number of incidents that will be allotted to the agreement to be entered in the application limit 202b, and may allow each service ticket entered against the agreement to be counted as one incident. In one embodiment, the application units 202a can be left blank, which may allow the agreement to cover nothing, and never have any billing.

The application limit 202b can specify the resources that are covered by the agreement. In one embodiment, the application limit 202b can be entered as a dollar amount that is covered. In one embodiment, the application limit 202b can be entered as a number of hours that are covered. In one embodiment, the application limit 202b can be entered as a number of incidents that are covered.

The available per 202c can specify how frequently the allocation of resources described by the application units 202a and application limit 202b will be available. In one embodiment, the available per 202c can be set to One Time, which may cause the resources to be allocated a single time when the agreement is first created. In one embodiment, the available per 202c can be set to Calendar Week, which may cause the resources to be allocated every Sunday, starting on the Sunday prior to the start date 201h of the agreement. In one embodiment, the available per 202c can be set to Calendar Month, which may cause the resources to be allocated on the first day of every month, starting on the first day of the month containing the start date 201h of the agreement. In one embodiment, the available per 202c can be set to Calendar Quarter, which may cause the resources to be allocated on January 1, April 1, July 1, and October 1, starting on the last of those dates that precedes the start date 201h of the agreement. In one embodiment, the available per 202c can be set to Calendar Year, which may cause the resources to be allocated on January 1, starting on January 1 preceding the start date 201h of the agreement. In one embodiment, the available per 202c can be set to Contract Quarter, which may cause the resources to be allocated every three months on the first of the month, starting on the first of the month containing the start date 201h of the agreement. In one embodiment, the available per 202c can be set to Contract Year, which may cause the resources to be allocated every year on the first of the month containing the start date 201h of the agreement, starting in the year containing the start date 201h of the agreement. In one embodiment, the available per 202c can be set to Contract 4 Weeks, which may cause the resources to be allocated every four weeks on Sunday, starting on the Sunday prior to the start date 201h of the agreement. In one embodiment, the available per 202c can be set to Contract 2 weeks, which may cause the resources to be allocated every two weeks on Sunday, starting on the Sunday prior to the start date 201h of the agreement.

The exclusions 202d can be selected to provide access to a separate user interface that may allow excluding specific work roles or work types from being covered by the agreement. Any work role or work type included in the exclusions may be considered billable. By way of example, if an agreement provides unlimited remote support, but charges for everything else, then the exclusions 202d can be used to exclude all work types except the Remote Support work type, which may allow unlimited remote support to be charged against the agreement, but no other type of work.

The carryover unused setting and expiration period 202e can specify how unused resources will carry over into the next allocation period defined by the available per 202c. Setting the carryover unused to Yes may indicate that any unused amount will carry over into the next allocation period defined by the available per 202c, but only for the time specified by the expiration period. Setting the carryover unused to No may indicate that unused amounts will not carry over.

Selecting the allow overruns and specifying a limit 202f can allow the application limit 202b to go negative. This may allow the customer to use resources from a future month, not to exceed the specified percentage. By way of example, an agreement that allocates 10 hours each month and allows overruns at 20% may allow a customer to use up to two hours from the allocation of the following month. The overrun can be deducted from the new monthly allocation as soon as it is allocated. Continuing the example, in the next month, the customer may only have eight hours available for use because two hours have already been used. If an overrun is allowed for an agreement with the available per 202c set to One Time, then the system may allow the agreement application limit 202b to go negative, and may deduct the negative amount whenever more resources are added to the agreement. If no resources are added, the overrun may stay on the agreement and not be invoiced. An overrun can be an overage on the agreement that is not billed to the customer. This may be done with an expectation of renewing the agreement or billing the customer at a later time. Setting the allow overruns 202f to No may allow the overrun to be included in the invoice for the agreement.

Selecting the expires when available is zero 202g can indicate that the agreement expires when the remaining balance reaches zero. After the agreement expires, adjustments to the agreement may not be allowed to extend the agreement, and the agreement may be marked with an expired status. The agreement may not show up in other areas of the business automation system unless the agreement is re-activated.

Selecting the charge adjustments to the firm 202h can indicate that any adjustment should be charged to the firm. Unselecting the charge adjustments to the firm 202h can indicate that any adjustment should be charged to the employee associated with the agreement, which may be displayed in an employee compensation report.

The employee compensation rate 202i can be used for time records that are applied against the agreement. The employee compensation rate 202i may be used for reporting purposes only, and may not be the billing rate for the customer, but instead may be the rate or amount of credit the employee receives for working on the agreement. If Use this hourly rate is set to Actual hourly rate, the hourly rate may default to the hourly rate associated with the work role on the time record. Setting Use this hourly rate to This hourly rate may override the hourly rate associated with the work role with a different hourly rate for the time records covered by the agreement. Setting Do not exceed this amount to Monthly Billing Amount may cause the employee compensation rate to decrease after the monthly billing amount has been reached, which may be displayed in an employee compensation report. Setting Do not exceed this amount to % of Monthly Billing Amount may cause the employee compensation rate to decrease after the designated percentage of the billing amount has been reached, which may be displayed in an employee compensation report. Setting Do not exceed this amount to This Monthly Amount may cause the employee compensation rate to decrease after the specified billing amount has been reached, which may be displayed in an employee compensation report. By way of example, the employee compensation rate 202i can be used to track a managed service agreement that provides unlimited remote support for $1200 per month to facilitate the selection of correct pricing. Continuing the example, setting Do not exceed this amount to Monthly Billing Amount with the Monthly Billing Amount set to $1200 can allow the employee compensation report can show the actual rate that was used by the technicians. This may indicate whether the pricing for the agreement is sufficient to pay for the technician time, and if not, the amount by which the pricing needs to change.

The billing cycle 203a can select how frequently a customer with a recurring agreement is to be billed. The billing cycle 203a may be set to Annual, Bi-Monthly, Bi-Weekly, Monthly, Not Billed, Quarterly, Semi-Annual, Weekly, or None.

Selecting the one time 203b can indicate that the agreement is not recurring and will only be billed once.

The cycle based on 203c can select the method for calculating the timing of the billing cycle. Setting the cycle based on 203c to Calendar year can base the timing on the actual calendar year, beginning on January 1 and ending on December 31. Setting the cycle based on 203c to Contract year can base the timing on a year beginning with the billing start date 203j of the agreement and ending 365 days later.

The billing amount 203d can be the amount to be invoiced for this agreement each billing cycle.

Selecting the taxable 203e can indicate that sales tax may be charged for this agreement, and can charge tax to the agreement at the time of invoicing.

The children amount 203f can display the total amount of the child agreements.

The additions 203g can display the totals of any additional amounts in the agreement.

The total 203h can display the sum of the billing amount 203d and the additions 203g.

Entering a nonzero amount for prorate first bill 203i can allow charging a different amount for the first invoice. The amount can override the billing amount 203d for the first invoice. The amount may not include the additions 203g.

The billing start date 203j can indicate the date of the first invoice for this agreement.

The tax code 203k can select a tax code for the agreement that is different from the default tax code. The tax codes may be set up elsewhere in the business automation system.

Selecting restrict downpayment 203l can indicate that only down payments created with the agreement can be applied to the agreement. Deselecting restrict downpayment 203l may indicate that any down payment can be applied to the agreement.

The terms 203m can specify terms for the agreement that are different from the default terms. The terms may be set up elsewhere in the business automation system.

The override bill-to information 203n can enable charging a different company for the agreement than the one specified by the company 201c.

The invoice description 203o can add comments that may appear at the top or bottom of the invoice at each billing cycle.

Figure 2C:
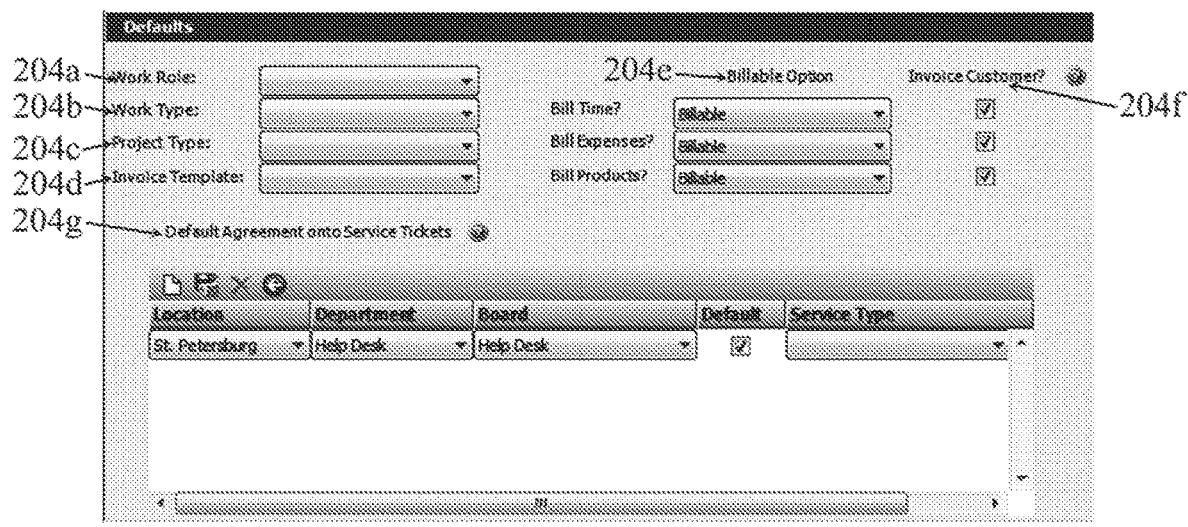

FIG. 2C is an illustrative example of an embodiment of a user interface for managing an agreement.

The work role 204a can specify the default work role that will be used for a ticket that is created with this agreement. This may override the work role specified as the default for the individual creating the ticket. Work roles may be set up elsewhere in the business automation system.

The work type 204b can specify the default work type that will be used for a ticket that is created with this agreement. The work type 204b may override the work type specified as the default for the individual creating the ticket. Work types may be set up elsewhere in the business automation system.

The project type 204c can specify the default project type that will be used for a project that is created with this agreement. The project type 204c may override the project type specified as the default for the system. Project types may be set up elsewhere in the business automation system.

The invoice template 204d can specify the default invoice template to use when generating invoices for this agreement. The specified template may only be used for recurring invoices created from the agreement.

The billable option 204e can specify the billing options for Bill Time, which can control how labor costs are billed, Bill Expenses, which can control how external costs are billed, and Bill Product, which can control how parts costs are billed. The billing options can include Billable, which may indicate that all items generated by the agreement are billable, Do Not Bill, which may indicate that all items generated by the agreement are not billable and will not appear on invoices, No Charge, which may indicate that all items generated by the agreement are not billable but will appear on invoices, and No Default, which may indicate that the billing option is determined by other settings elsewhere in the business automation system.

Selecting invoice customer 204f can indicate that the associated Bill Time, Bill Expenses, or Bill Products may be included on invoices, but also included in adjustments to make the total billed amount zero. This may be helpful in creating a detailed work summary that is provided without additional billing to the customer.

The default agreement onto service tickets 204g can control the defaults for service tickets and projects that are created by this agreement. The defaults can be set for Location, Department, Board, which can set the service board, Default, which may create a new service ticket, and Service Type.

FIG. 3 is an illustrative example of an embodiment of a user interface for managing a product configuration. As seen with respect to FIG. 1, a product configuration 104b can be an accessory 103. Product configurations can be based on form templates that may be customized to store important information about hardware, software, vendors, license renewals, users and so on. Remote Monitoring and Management (RMM) applications can automatically populate product configurations to provide device information that can be used for tickets and agreement billing. Product configurations can be attached to tickets, agreements, companies, contacts and other product configurations. Workflow rules can be executed based on product configuration values. In one embodiment, a product configuration can include information about managed servers and devices that can be automatically populated and update by a Remote Monitoring and Management (RMM) application. In one embodiment, a product configuration can include information about the configurations for printers. In one embodiment, a product configuration can include information about license information, such as expiration dates, vendor names and item serial numbers to facilitate renewals. Workflow rules can be used to generate notifications when a license will expire in a defined number of days. In one embodiment, a product configuration can include information about management information for switches, routers and wireless access points. This information may include the passwords and IP addresses for the devices, and may also include attachments that are backups of the information in the devices. In one embodiment, a product configuration can include information about phone system conferencing and handsets, including tracking information for versioning on the phone console to ensure that the system is up to date. In one embodiment, a product configuration can include information about Internet access, including vendor information and account numbers for quick access when there is an outage. In one embodiment, a product configuration can include information about warranty information for service contracts, software, hardware and other items with an expiration date. The expiration date can then be used as part of a workflow rule to create a notification when the expiration approaches.

Turning to FIG. 3, the configuration type 301a can select a configuration type, which may be a standard type that is supplied with the business automation system, or may be a custom type that can be defined by an end user. The name 301b can specify a name for the product configuration. The purchase date 301c can specify the date that the item described by the product configuration was purchased. The warranty expiration 301d can specify the date when the warranty on the item described by the product configuration expires. This date may be used to trigger a workflow rule. The installation date 301e can specify the date when the item described by the product configuration was installed. The installed by 301f can specify the individual who installed the item described by the product configuration. The location 301g can specify the physical location of the item described by the product configuration. The department 301h can specify the department that owns the item described by the product configuration. The status 301i can specify the status of the item described by the product configuration. The values for item status 301i may be defined elsewhere in the business automation system. The vendor 301j can specify the vendor that sells the item described by the product configuration. The values for vendor 301j may be defined elsewhere in the business automation system. The manufacturer 301k can specify the manufacturer of the item described by the product configuration. The values for manufacturer 301k may be defined elsewhere in the business automation system. The model number 301l can specify the model number of the item described by the product configuration. The serial number 301m can specify the serial number of the item described by the product configuration. The tag number 301n can specify the tag number of the item described by the product configuration. The bill customer 301o can be used to control integration with Remote Monitoring and Management (RMM) systems. If an RMM system creates and populates the product configuration, the RMM system may also update an agreement to cover the maintenance of the product. Selecting the bill customer 301o may then indicate that maintenance of the product will be billed to the customer under the agreement. Deselecting the bill customer 301o may instead indicate that the product configuration will keep the product information in the business automation system, but the customer will not be billed for maintenance of the product. The company 301p can specify the company that owns the item described by the product configuration. The contact 301q can specify the primary contact at the company 301p who is responsible for the item described by the product configuration. The contact information 301r, which may include Address, City, State, Zip, and Country, can be information for contacting the contact 301q. The vendor notes 301s can contain information that is provided by a vendor and may automatically be updated by a Remote Monitoring and Management (RMM) system. The notes 301t can be arbitrary notes about the product configuration, which may be entered by an end user. The configuration questions 301u can be a list of customized configuration questions that guide the collection of additional information about the item described by the product configuration.

Figure 4A:
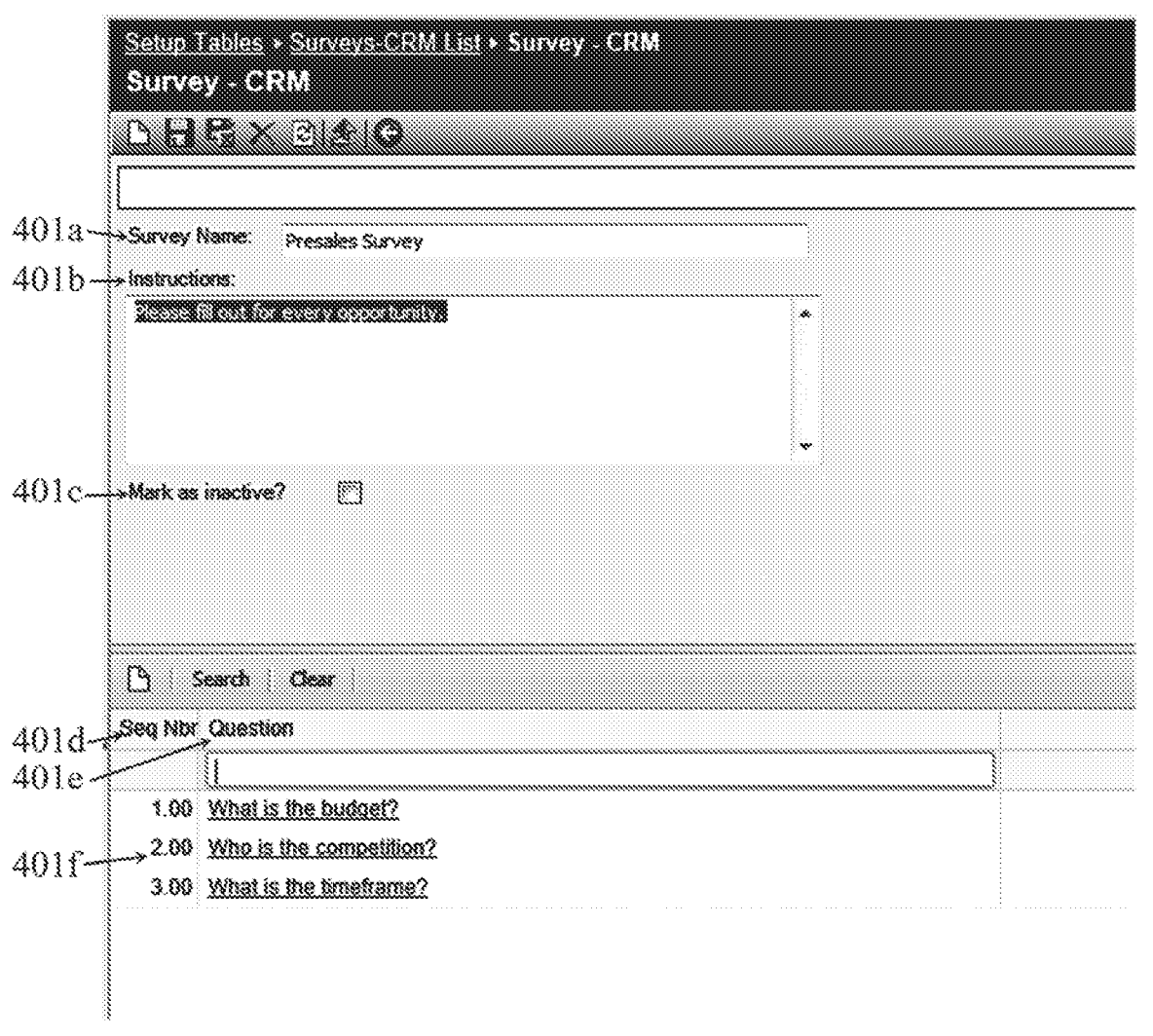

FIG. 4A is an illustrative example of an embodiment of a user interface for managing a CRM survey. As seen with respect to FIG. 1, a CRM survey 104c can be an accessory 103. CRM surveys can be customized for specific business uses, and can be used to put a process in place for gathering important information about prospects and clients. A CRM survey can be a list of questions to be answered. In one embodiment, a CRM survey may be used by a salesperson as a guide to direct conversations with prospects or customers as part of the sales process. In another embodiment, a CRM survey can be used by a technician to gather information about onsite visits as part of the service process. CRM surveys can be attached to a company, sales opportunity, service ticket, project ticket, and so on. In this way, CRM surveys can help to build accountability and document interactions with customers.

Turning to FIG. 4A, the survey name 401a can indicate the name of the survey. The instructions 401b can be instructions that are displayed to the participant who fills out the survey. Selecting mark as inactive 401c can indicate that the survey is not available for use. Deselecting mark as inactive 401c can make the survey available for use. The lower section of the user interface in FIG. 4A can show a list of the questions 401f in the CRM survey. For each question in the list 401f, the seq nbr column 401d can indicate the order of the questions presented to the participant, and may be entered either as an integer or a decimal number. For each question in the list 401f, the question column 401e can show the text of the question.

FIG. 4B is an illustrative example of an embodiment of a user interface for using a CRM survey that is associated with a company. The company 402a can be selected for association with the survey. The survey 402b can be selected, completing the association. Then, the survey 402c can be completed and the responses to the survey may be associated with the company 402a.

By way of example, a CRM survey could be used to increase the effectiveness of the sales team, by providing more information on how effective the members of the sales team have been. The CRM survey may help to ensure that some key information about prospects is captured, and may help the sales staff be more effective in calls by giving the sales staff a list of questions to work from. Since the results of the CRM survey can be recorded, the sales management will have a better idea of how the prospecting calls are going. Continuing the example, the CRM survey could have a section Tell me about your business with the questions "What is your business?", "Who are your customers?", "How many locations?", and "How many employees?". The CRM survey could have a section What are your business objectives? with prompts to ask for "Business Objective 1" and "Business Objective 2". The CRM survey could have a section What are your IT challenges? with the questions "Unplanned outages?", "Poor performance?", "Lost data?", "Compromised or stolen data?", and "Other problems?". The CRM survey could have a section What are your priorities for IT? with prompts to ask for "Priority 1" and "Priority 2".

Figure 5:
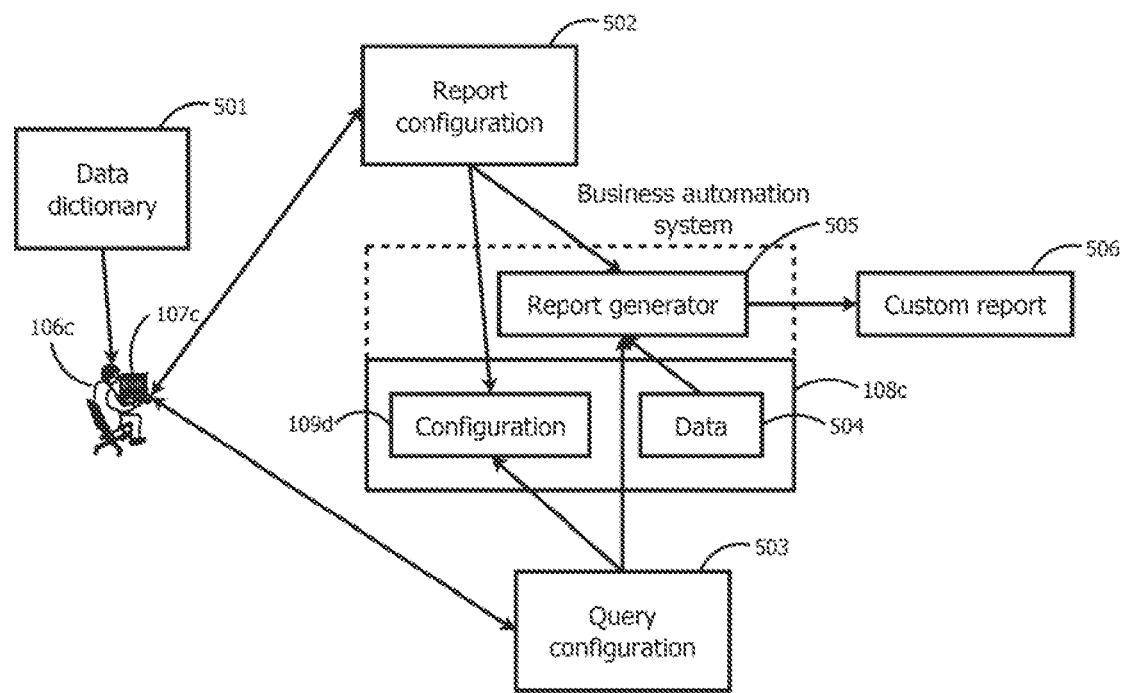
FIG. 5 is an illustrative block diagram of an embodiment of a custom report.

FIG. 5 is an illustrative block diagram of an embodiment of a custom report. As seen with respect to FIG. 1, a custom report 104d can be an accessory 103. A data dictionary 501 can contain a description for data 504 stored in a business automation system 108c and the relationships between the data items. This data dictionary 501 can serve as a reference for a developer 106c who can use a device 107c to create or modify a report configuration 502 and a query configuration 503. The query configuration 503 can provide instructions for accessing data 504 and presenting the results to a report generator 505. The report generator 505 may or may not be a part of the business automation system 108c. The report configuration 502 can provide instructions to the report generator 505 for formatting and presenting the data 504 in a custom report 506. The report configuration 502 and query configuration 503 can be stored in the configuration 109d of the business automation system 108c in order that other users of the business automation system 108c can produce the custom report 506.

Figure 6A:
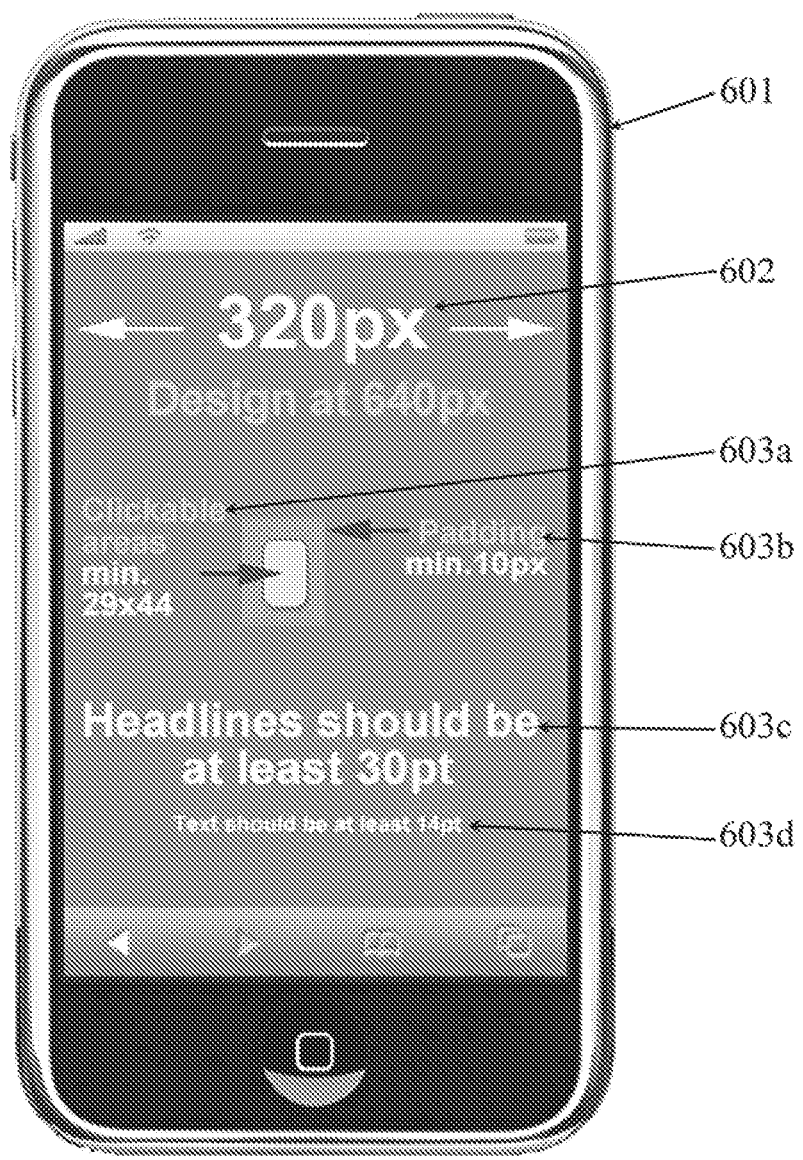
FIG. 6A is an illustrative example of an embodiment of a display of an HTML email template on a mobile device.

FIG. 6A is an illustrative example of an embodiment of a display of an HTML email template on a mobile device. As seen with respect to FIG. 1, an HTML email template 104e can be an accessory 103. An HTML email template may help to brand outgoing email and make the email appear more professional and personal. By way of example, an HTML email template may be used for marketing contacts, service status updates, project status updates, sales order status updates, workflow rule notifications, invoices, and so on.

Since the email may be viewed on a mobile device, the email can be very difficult to read without proper formatting. For example, graphics in the email may prevent the ability to resize text, and the graphics display of a mobile device can be small and constraining. By way of example, a mobile device may only allow for a graphic that is 320 pixels wide. Turning to FIG. 6A, an HTML email template can help to incorporate design rules to make email attractive and readable on a mobile device 601. The graphics can be limited to a maximum of 320 pixels in width 602. Any area intended for selection can be forced to a minimum of 29 pixels by 44 pixels 603a, and the padding around the selection areas can be forced to a minimum of 10 pixels 603b. Headlines can be displayed with a font at a minimum of 30 points 603c, and email text can be displayed with a font at a minimum of 14 points 603d.

Figure 6B:
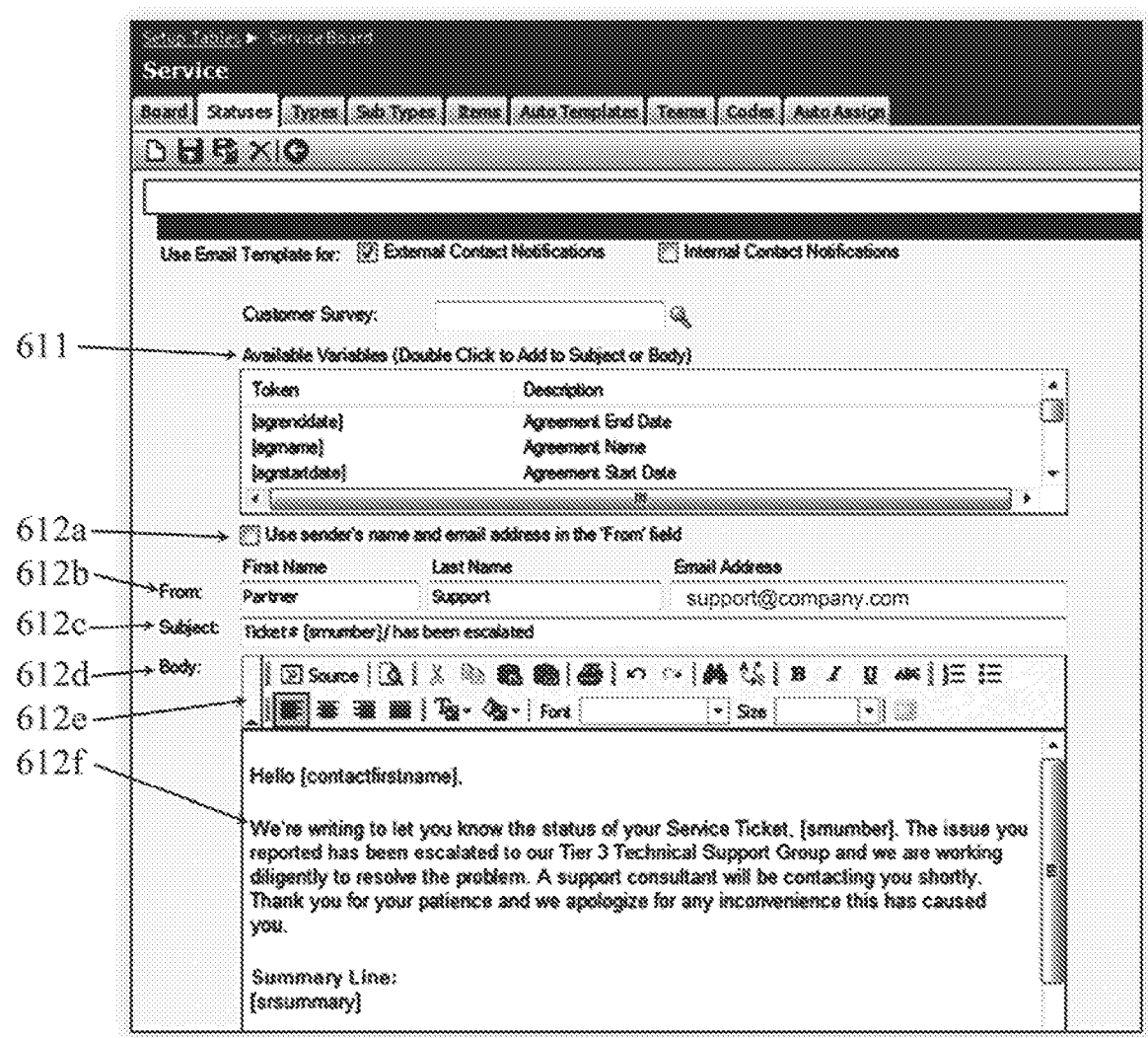
FIG. 6B is an illustrative example of an embodiment of a user interface for managing an HTML email template.

FIG. 6B is an illustrative example of an embodiment of a user interface for managing an HTML email template. The editing area 612f can allow the creation and modification of the body 612d of the email with a collection of tools 612e that may make it convenient to edit in a natural way. The subject 612c of the email can be edited directly. The sender of the email can either be indicated 612a as the person taking the action to generate the email, or the sender can be set 612b to a fixed sender last name, first name, and email address. When editing the body 612d of the email, text can be specified as a variable 611, which will get substituted with the actual value of the variable when creating the email. By way of example, the text "[contactfirstname]" in the body 612d of FIG. 6B indicates a variable with the value of the contact's first name, so if the contact is "John Doe", then the text "Hello [contactfirstname]" can appear as "Hello John" in the actual email that is sent.

Figure 6C:
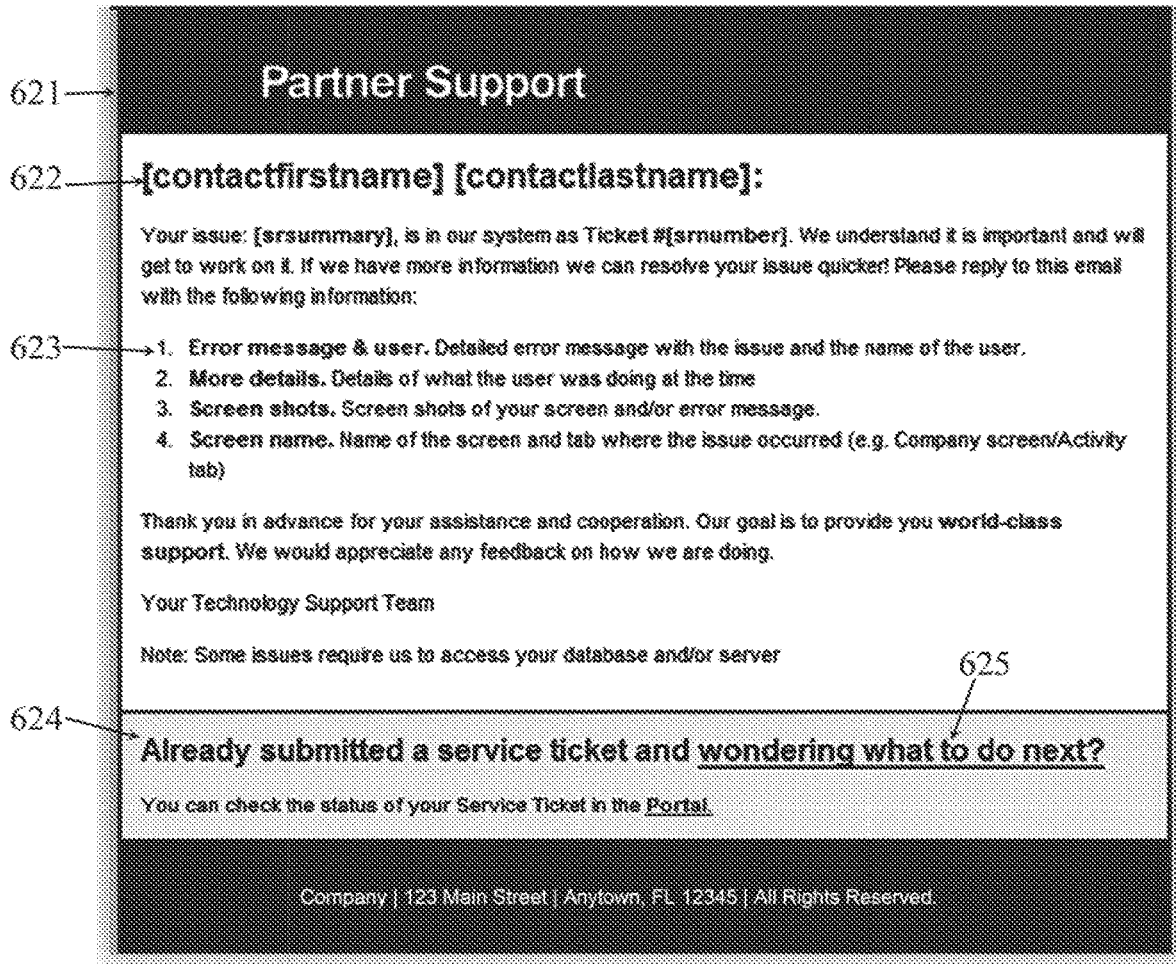
FIG. 6C is an illustrative example of an embodiment of a display of an HTML email template.

FIG. 6C is an illustrative example of an embodiment of a display of an HTML email template. This display can show the way the email will look to an end user that receives the email, but without any variable substitutions. In the example of FIG. 6C, the email has a header 621, some variables 622 that are displayed without substitutions, a list 623, a shaded area 624, and a hyperlink 625 that can direct a browser to a web page. It should be understood that many other formatting features are available in HTML email templates, and FIG. 6C is intended to show only some examples of these formatting features.

FIG. 7A is an illustrative table of an embodiment of the information in a project template. As seen with respect to FIG. 1, a project template 104f can be an accessory 103. Project managers may create several projects each week, and some of these projects can be the same or very similar to other projects. Project templates may help to significantly reduce the amount of time required to set up a project by quickly filling in a new project with all of the information from the project template. A project template can contain general project information including the project type 701*a* and a description 701*b*. A project template can also contain work plan information for multiple tickets, including, for each ticket, the summary 702*a*, the part of the phase containing the ticket 702*b*, the budgeted hours 702*c*, any notes 702*d*, the work role 702*e*, and the tasks 702*f* making up the ticket.

FIG. 7B is an illustrative example of an embodiment of a user interface for managing a phase in a project template. Projects can be divided into conceptual sections called phases. By way of example, a software development project might be divided into the phases of "design", "coding", "testing", and "release". Phases can also be sub-divided further into additional phases, in a hierarchical fashion. The phase name 703*a* can specify the name of the phase. The part of phase 703*b* can allow creating a hierarchical organization by making this phase a sub-phase of another. Selecting mark as milestone 703*c* can mark this phase as a milestone, which may cause the phase to appear in a project summary report, and may indicate that the customer can be billed when this phase is complete. Selecting add-on phase to be billed separately 703*d* can indicate that this phase may be billed separately from the rest of the project, and may show up in a different section of the finance report. The notes 703*e* can contain any general arbitrary notes about the phase.

Figure 7C:
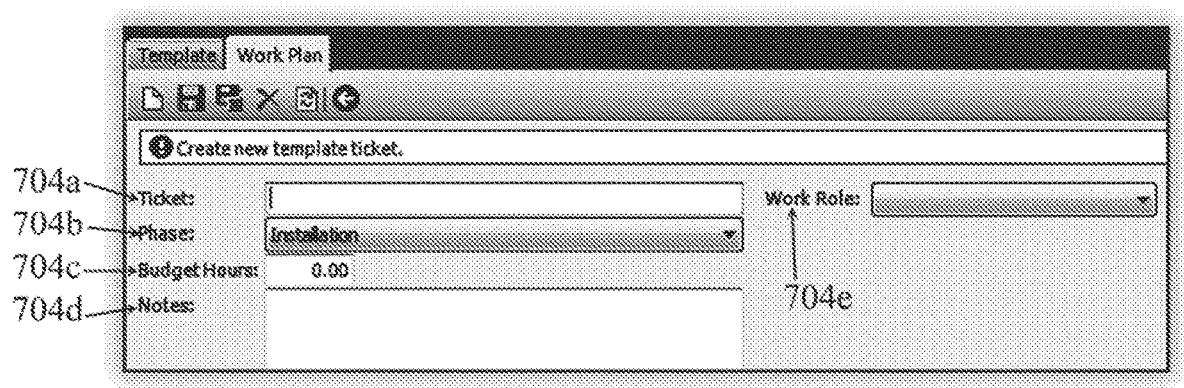
FIG. 7C is an illustrative example of an embodiment of a user interface for managing a task in a project template.

FIG. 7C is an illustrative example of an embodiment of a user interface for managing a ticket in a project template. The ticket 704*a* can indicate a summary of the ticket. The phase 704*b* can select which phase includes the ticket. The budget hours 704*c* can specify the amount of time budgeted for working on the ticket. The notes 704*d* can contain any general arbitrary notes about the ticket. The work role 704*e* can specify the work role for the resources assigned to work on the ticket.

Figure 8A:
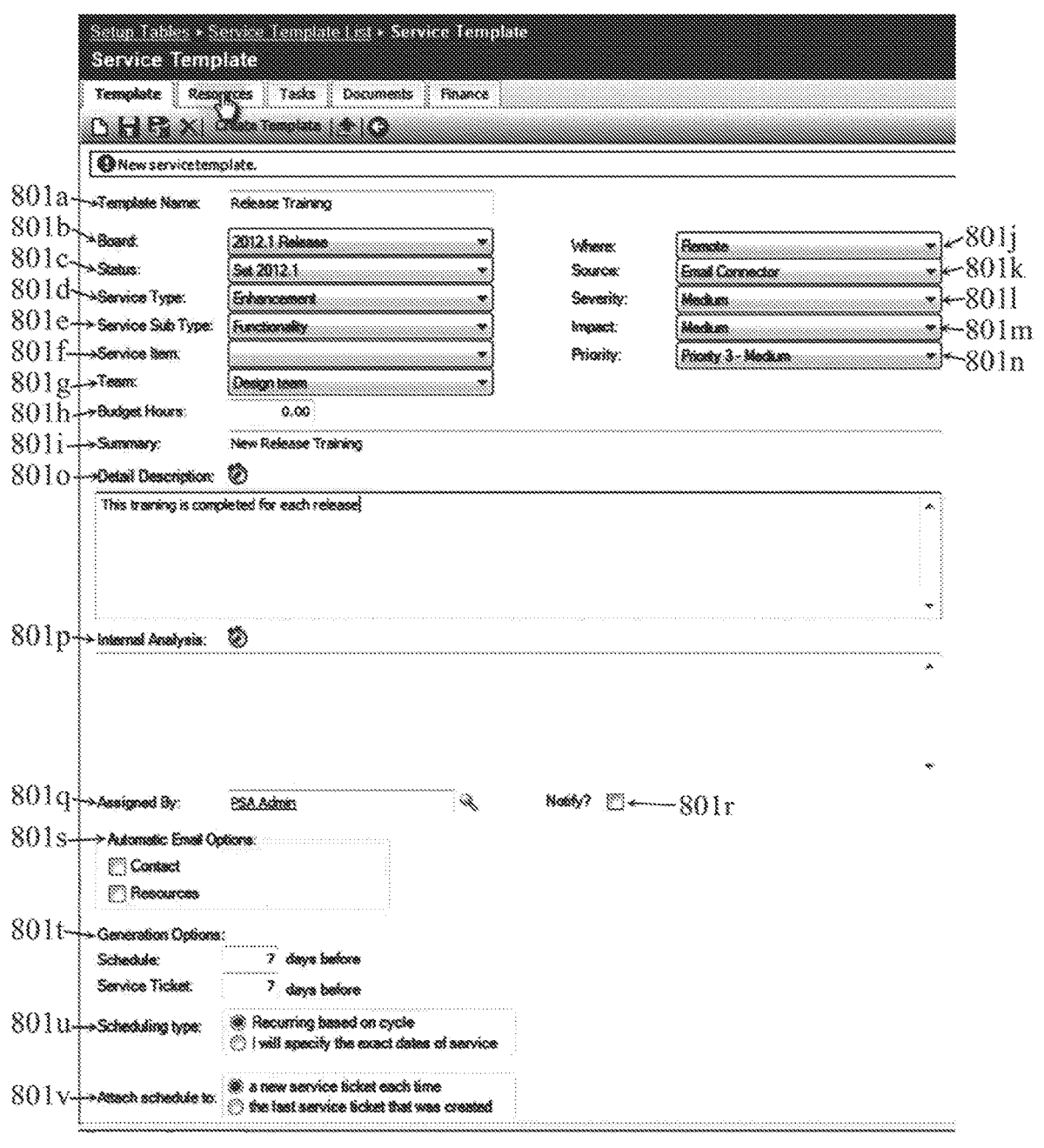

FIG. 8A is an illustrative example of an embodiment of a user interface for managing a service template. As seen with respect to FIG. 1, a service template 104*g* can be an accessory 103. A service template may be used to modify an existing service ticket, or to create recurring service tickets for a specific company or agreement. In one embodiment, a service template can be used to create service tickets with specific tasks for services that are repeated multiple times, helping to reduce errors of the sort where some tasks are omitted. By way of example, a service template for workstation installation can be created with the tasks required and added to a single service ticket. Whenever a workstation installation is required, a service manager can use the service template to easily create and update a service ticket, and the ticket will contain the correct settings and tasks. Using service templates in this way can also facilitate the update of the information about the tasks required for workstation installation in one place. Another advantage of using service templates in this way can be to provide consistent and high quality service to customers.

Turning to FIG. 8A, the template name 801*a* can specify a name for the service template. The board 801*b* can select the service board where the service template may create service tickets. The status 801*c* can select the status that service tickets generated based on this service template may be set to once the service tickets are created. The service type 801*d*, service sub type 801*e*, and service item 801*f* can specify the appropriate service type, service sub type, and service item for service tickets generated based on this service template. The team 801*g* can select the service team responsible for service tickets generated based on this service template. The budget hours 801*h* can specify the number of hours budgeted for service tickets generated based on this service template. The summary 801*i* can specify a one line summary for service tickets generated based on this service template. The where 801*j* can select where the service for service tickets generated based on this service template will take place. The source 801*k* can select the source for service tickets generated based on this service template. The severity 801*l* can select the severity of service tickets generated based on this service template. The impact 801*m* can select the impact of service tickets generated based on this service template. The priority 801*n* can select the priority for service tickets generated based on this service template. The detail description 801*o* can provide a detailed description that clearly defines the issues for service tickets generated based on this service template, which may be visible to customers. The internal analysis 801*p* can provide information that clearly states the internal analysis for service tickets generated based on this service template, which may not be visible to customers. The assigned by 801*q* can indicate the individual who created the service template. The assigned by 801*q* may default to the user who used the user interface in order to create the service template. Setting the notify 801*r* can cause an email to be sent to the individual who created this service template when a service ticket that is generated based on this service template is closed. The automatic email options 801*s* can control how email is sent based on service tickets generated based on this service template. Selecting Contact can indicate that the contact on the service ticket may receive an email when the service ticket is updated. Selecting Resources can indicate that the assigned resources on the service ticket may receive an email when the service ticket is updated. The generation options 801*t* can control how service tickets are generated based on this service template. The Schedule entry can specify the number of days in advance for generating schedule records. For example, if the Schedule entry is set to 31, a schedule record can be created from this service template up to 31 days in advance, incrementing one schedule record at a time every day. The Service Ticket entry can specify the number of days in advance for generating a service ticket. Setting the Service Ticket entry to less than the schedule record can ensure that the resources needed are reserved in advance without creating service tickets that clutter the service board too far in advance. For example, if Service Ticket is set to 1, a service ticket can be generated based on this service template one day before the service ticket is actually needed. The scheduling type 801*u* can control how service tickets generated based on this service template are scheduled. Selecting Recurring based on cycle can allow choosing a cycle for scheduling the service ticket. Selecting I will specify the exact dates of service can allow choosing a specific date for the scheduled service. The attach schedule to 801*v* can determine how the information in the service template is treated for recurring service tickets. The information can be used to create a new service ticket each time, or the information may be used to add more information to the last service ticket that was created.

Figure 8B:
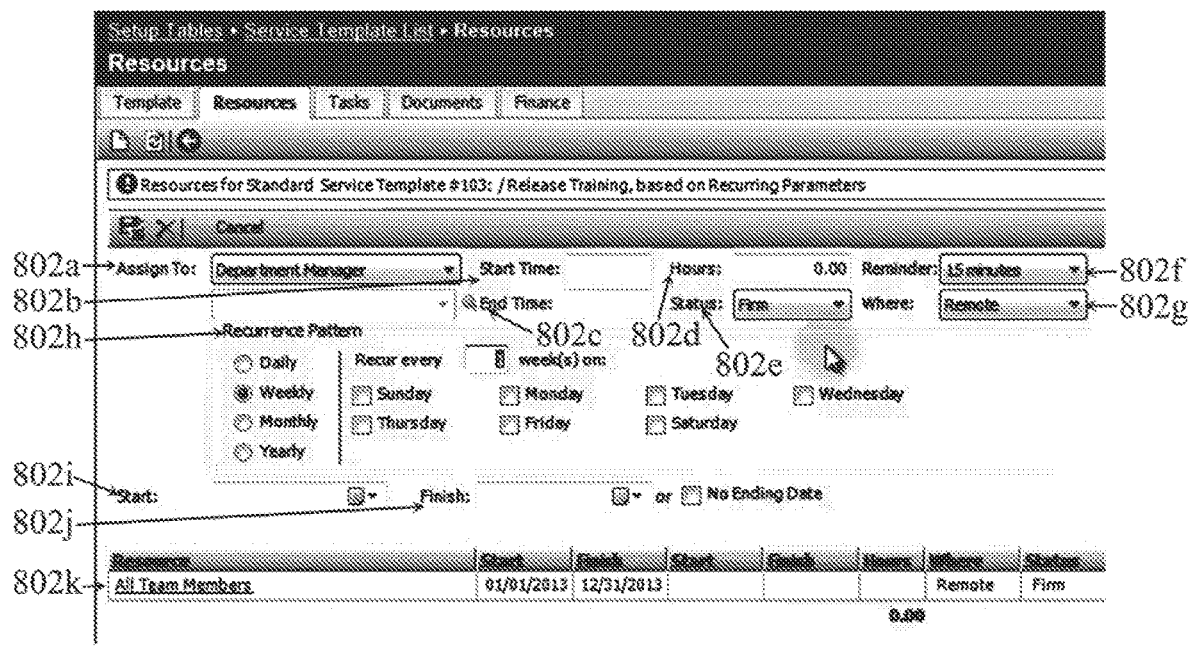
FIG. 8B is an illustrative example of an embodiment of a user interface for managing resources in a service template.

FIG. 8B is an illustrative example of an embodiment of a user interface for managing resources in a service template. The assign to 802*a* can specify the individual to which service tickets generated based on this service template are assigned. The assign to 802*a* can indicate a specific individual, but it may be more useful to indicate a context-based value, which can include Account Manager, Account Tech, All Team Members, Business Unit Manager, Controller, COO, Dispatch, Duty Manager, Location Manager, President, Sales Rep, Service Manager, Team Leader, Territory Manager, and so on. The start time 802*b* can specify the time that the service event is scheduled to begin. The end time 802*c* can specify the time that the service event is scheduled to end. The hours 802*d* can be automatically calculated based on start and finish times and dates. The status 802*e* can indicate whether the scheduling is firm or tentative. The reminder 802*f* can specify the amount of time before the service event that a reminder should be generated. The where 802*g* can indicate where the service may take place. The recurrence pattern 802*h* can indicate how the service should repeat, and may be Daily, Weekly with a selection of weekdays, Monthly with a selection of a specific day or a weekday with a first through fourth designation, or Yearly with a selection of a specific day or a month with a weekday and a first through fourth designation. The start 802*i* can select the start date for scheduling the resource for service tickets generated based on this service template. The finish 802*j* can select the end date for scheduling for resource for service tickets generated based on this service template. Selecting No Ending Date may indicate that there is no end date. The lower section of the user interface can be a resource summary, in which each line 802*k* can summarize the resources that have already been scheduled, and can allow the resources to be selected for modification.

Figure 8C:
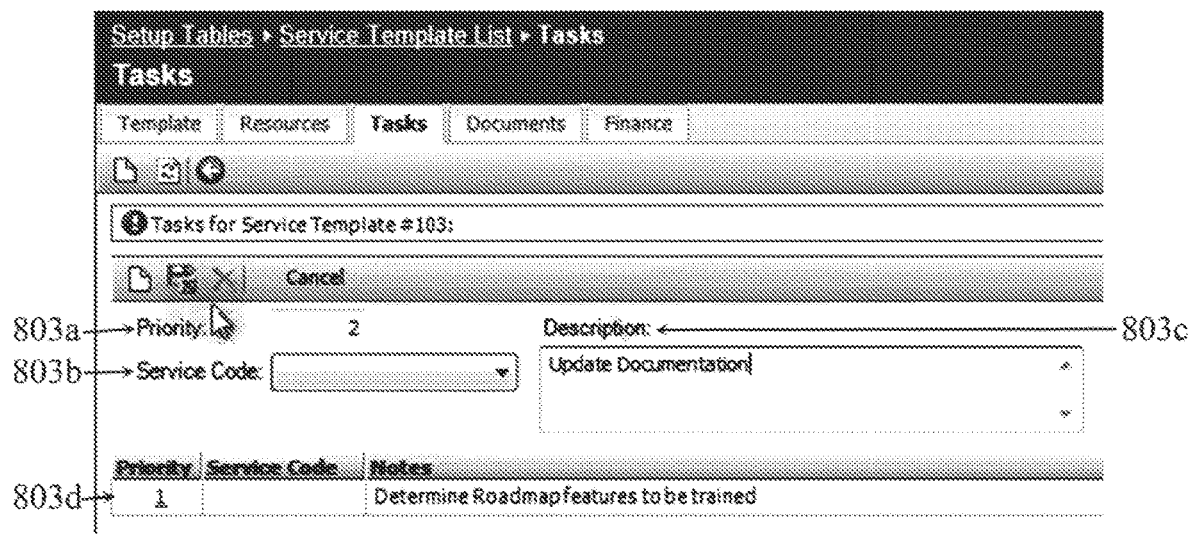
FIG. 8C is an illustrative example of an embodiment of a user interface for managing tasks in a service template.

FIG. 8C is an illustrative example of an embodiment of a user interface for managing tasks in a service template. The priority 803*a* can indicate a priority number for this task. The service code 803*b* can allow selecting a service code that may be associated with the service board. The description 803*c* can be filled in automatically from the service code 803*b*, and can also be used to add more information about the task. The lower section of the user interface can be a task summary, in which each line 803*d* can summarize the existing tasks, and can allow the tasks to be selected for modification.

Figure 8D:
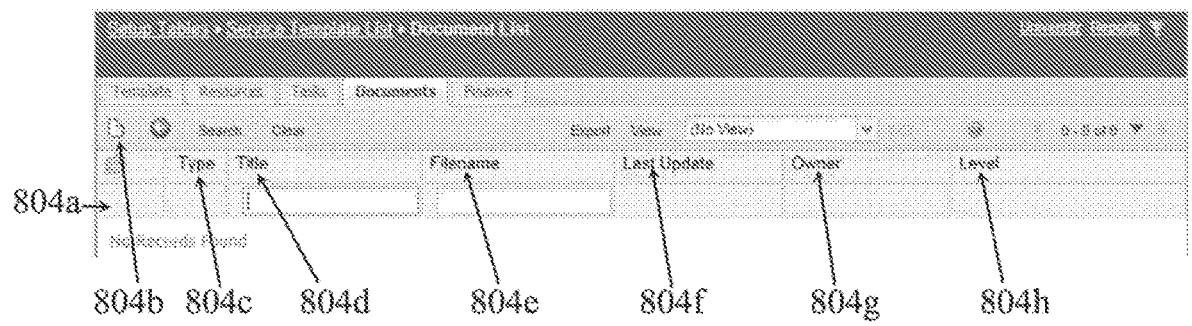
FIG. 8D is an illustrative example of an embodiment of a user interface for managing documents in a service template.

FIG. 8D is an illustrative example of an embodiment of a user interface for managing documents in a service template. Each line 804*a* can summarize the existing documents, and can allow the documents to be selected for retrieval, update, removal, and so on. The control 804*b* can allow adding a new document. In the list of documents, the type column 804*c* can indicate whether the document is a spreadsheet, presentation, word processing document or so on, the title column 804*d* can indicate a meaningful title for the document, the filename column 804*e* can indicate the actual underlying filename for the document, the last update column 804*f* can indicate when the document was last created or updated, the owner 804*g* can identify the individual who created or last updated the document, and the level 804*h* can indicate the security restrictions on the document.

Figure 8E:
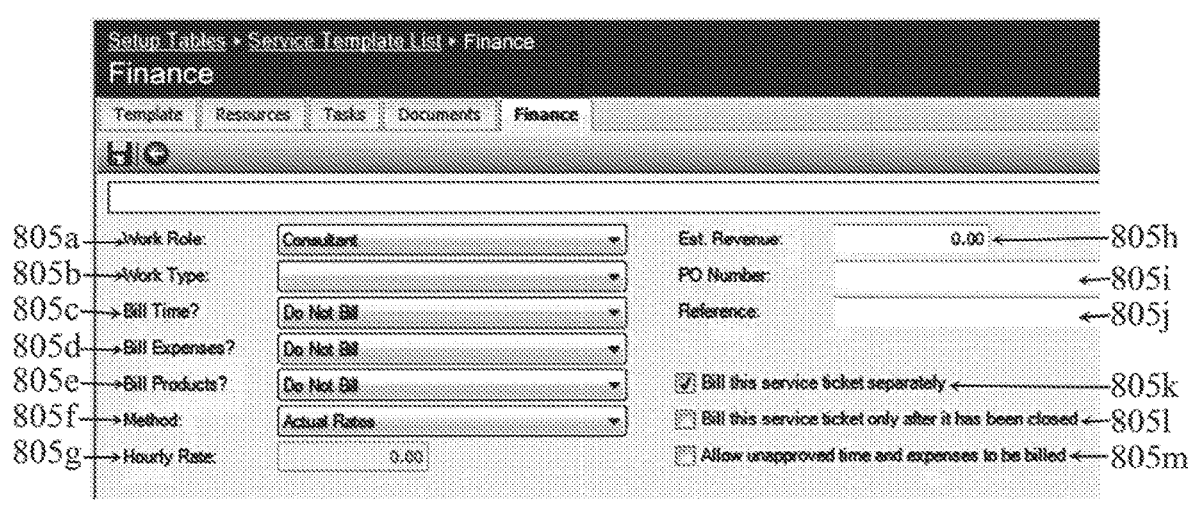

FIG. 8E is an illustrative example of an embodiment of a user interface for managing finance aspects of a service template. The work role 805*a* can select the default work role for resources used by service tickets generated based on this service template. The work type 805*b* can select the default work type for resources used by service tickets generated based on this service template. The bill time 805*c* can control how labor costs are billed, the bill expenses 805*d* can control how external costs are billed, and the bill products 805*e* can control how parts costs are billed for service tickets generated based on this service template. For bill time 805*c*, bill expenses 805*d*, and bill products 805*e*, the options can include Billable, which may indicate that all items generated by the service ticket are billable, Do Not Bill, which may indicate that all items generated by the service ticket are not billable and will not appear on invoices, No Charge, which may indicate that all items generated by the service ticket are not billable but will appear on invoices, and No Default, which may indicate that the billing option is determined by other settings elsewhere in the business automation system. The method 805*f* can indicate the billing method for service tickets generated based on this service template. The options can include Actual Rates, Fixed Fee, Not To Exceed, and Override Rate. The hourly rate 805*g* can indicate the hourly billing rate when the method 805*f* is set to Actual Rates. The hourly rate 805*g* can indicate the fixed fee amount when the method 805*f* is set to Fixed Fee. The hourly rate 805*g* can indicate the override hourly billing rate when the method 805*f* is set to Override Rate. The estimated revenue 805*h* can indicate the estimated revenue that service tickets generated based on this service template are expected to generate. The PO number 805*i* can indicate the purchase order number that the client has assigned to service tickets generated based on this service template. The reference 805*j* can indicate an internal reference description for service tickets generated based on this service template. Selecting bill this service ticket separately 805*k* can indicate that service tickets generated based on this service template should be billed separately from other services provided to the customer. Selecting bill this service ticket only after it has been closed 805*l* can indicate that service tickets generated based on this service template should only be invoiced after the service tickets are closed. Selecting allow unapproved time and expenses to be billed 805*m* can indicate that service tickets generated based on this service template should be invoiced even if the time and expense reports for resources assigned to the service tickets are not approved.

Figure 8F:
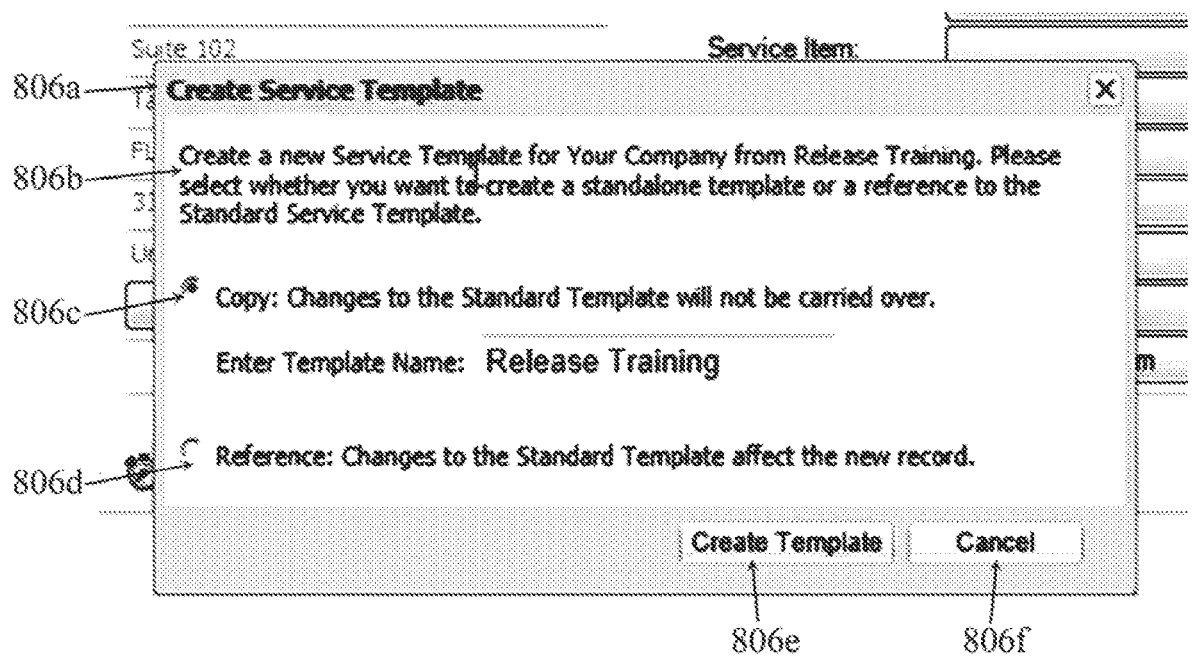
FIG. 8F is an illustrative example of an embodiment of a user interface for applying a service template to a company.

FIG. 8F is an illustrative example of an embodiment of a user interface for applying a service template to a company. The user interface 806*a* can pop up over an existing interface, and can contain descriptive text 806*b*, an option 806*c* to create a copy, an option 806*d* to create a reference, a control 806*e* to confirm, and a control 806*f* to cancel. If the option 806*c* to create a copy is selected, then the information in the service template can be copied into a completely new service ticket. In this case, the new service ticket can be modified, but any changes to the service template will not appear in the new service ticket. If the option 806*d* to create a reference is selected, then a new service ticket can be created, but the new service ticket is still tied to the service template. In this case, the new service ticket may not be modified, but any changes to the service template can also appear in the new service ticket.

Figure 8G:
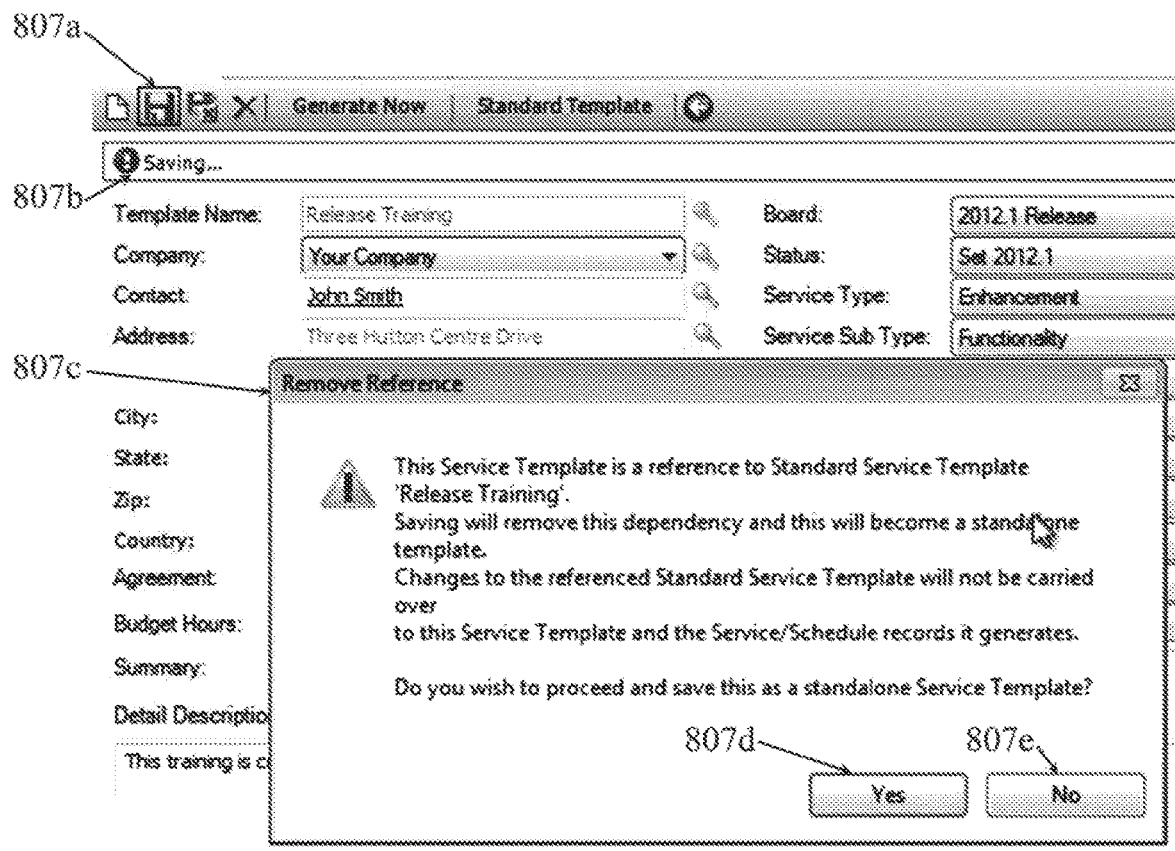
FIG. 8G is an illustrative example of an embodiment of a user interface for responding to a change in a service ticket that is a reference.

FIG. 8G is an illustrative example of an embodiment of a user interface for responding to a change in a service ticket that is a reference. As described with respect to FIG. 8F, if a service ticket is created as a reference to a service template, then the new service ticket may not be modified. As a convenience to the users of the business automation system, when a user uses a control 807*a* to save 807*b* a service ticket that was created as a reference to a service template, a user interface 807*c* may pop up offering to convert the service ticket from a reference to a copy so that the service ticket can be modified. If the user activates a control 807*d* to accept this change, then the service ticket can be converted to a copy, and the modifications can be saved to the service ticket. If the user activates a control 807*e* to reject this change, then the service ticket may be left as a reference, and the modifications to the service ticket may be discarded.

FIG. 9 is an illustrative example of an embodiment of a user interface for managing a track. As seen with respect to FIG. 1, a track 104h can be an accessory 103. Tracks can be used to streamline operations by creating and tracking repeatable processes in an organization. Tracks can be used for any process that is repeated and completed in the same way. By way of example, some processes that may be represented as tracks can include client onboarding, new employee onboarding, sales prospecting, managing accounts receivables, managing credit holds, providing virtual CIO follow-up meetings and calls, project quoting, handing off customers from sales to service and back to sales, and so on. Using tracks may be indicated by bottlenecks in an organization, where a process is delayed or stops with negative results. The process can be defined as a series of steps and then converted into a track. Tracks can help to facilitate accountability in processes, and the activities and tickets that are part of a track can be reviewed to make sure all team members are complying with the process defined by the track.

By way of example, a business owner may be the primary sales person for the company, and may have a process for onboarding a new customer that includes several calls to the customer as well as sending thank you cards and information about additional products that the company offers. The business owner may hire a new sales person and may want to make sure that the customer onboarding process is performed consistently by the new sales person. The business owner can create a track to facilitate the customer onboarding process and help to ensure that none of the steps are missed. The business owner may write down the steps in the process, noting whether the steps may involve creating an email, creating a ticket, completing an activity, or adding the customer to a group. The business owner may then add the track to the business automation system. The business owner can test the track when a new customer signs a contract with his company. If any steps are missing in the track, the missing steps can be added. Once the track has been finished and tested, the business owner can have the new sales person use the track for new customers, which may help to ensure that all new customers receive the same attention and treatment from the new sales person as the customers would have received from the business owner.

Tracks can facilitate the automation of activity creation, email notifications, service ticket creation, marketing manager group updates, company status changes, and so on. Tracks can be chronological, and can trigger the creation of activities or tickets a fixed amount of time after associating the track with a customer. Track activities and emails can be sent or assigned to a company, contact or an internal individual. The actions taken by a track can include, for example, Add to Group, Create a Service Ticket, Create Activity, Send Email, and so on.

Turning to FIG. 9, the description 901a can specify a name for the track. Selecting inactive 901b can indicate that this track can no longer be assigned to companies or contacts. The action type 901c can indicate what type of action the track should take. The group 901d can provide a parameter to the action if the parameter is needed. The perform action after 901e can specify when the action 901c should occur.

Figure 10A:
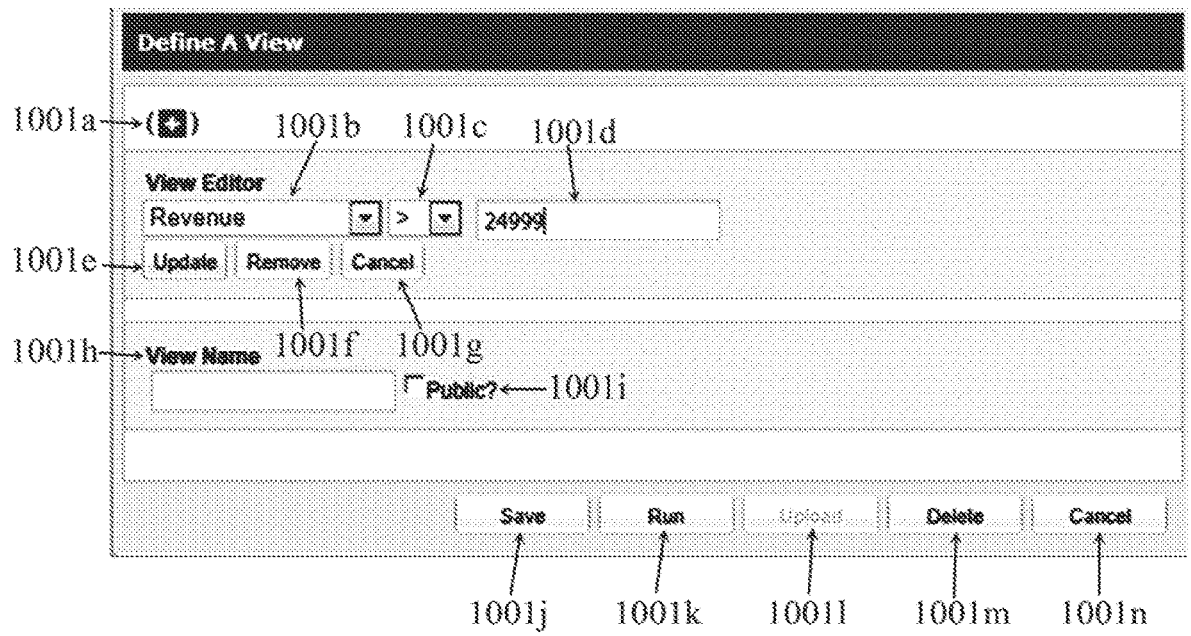
FIG. 10A is an illustrative example of an embodiment of a user interface for managing a view.

FIG. 10A is an illustrative example of an embodiment of a user interface for managing a view. As seen with respect to FIG. 1, a view 104i can be an accessory 103. Views can facilitate creating and sharing predefined filter criteria, and can allow the creation of more complex searches than those available with regular filtering criteria. These more complex searches can utilize AND and OR boolean search operators as well as parentheses for nesting. The resulting search expressions can be saved for future use. By way of example, a sales manager may want to quickly see all opportunities with revenue of $25,000 or more that have a rating of Hot, in order to make every effort to ensure that these opportunities are won. The sales manager can create a view that selects these two parameters, save that view, and then use that view in the user interface for displaying sales opportunities to show the opportunities that meet those criteria. Views can be used in any interface that presents a list of items, such as the user interfaces for service boards, opportunities, configurations, companies, contacts, time search results, and so on.

Turning to FIG. 10A, the view name 1001h can specify a name for the view, and selecting the public 1001i control can make the view available to other users of the business automation system. The control 1001a can add a new term to the search expression for the view, and the three controls 1001b, 1001c, and 1001d can specify the new term, with 1001b specifying the variable, 1001c specifying the comparison operator, and 1001d specifying the constant. The update control 1001e can add the current term to the search expression of the view, the remove control 1001f can remove a current existing term from the search expression of the view, and the cancel control 1001g can finish the editing process with no changes to the search expression of the view. The save control 1001j can save the view in its current state, the run control 1001k can run the search expression and display the result, which may help to test and fine-tune the search, the upload control 1001l can upload the view to the marketplace 101, the delete control 1001m can completely remove the view from the business automation system, and the cancel control 1001n can return to the previous user interface in the business automation system without making any changes to the view.

Figure 10B:
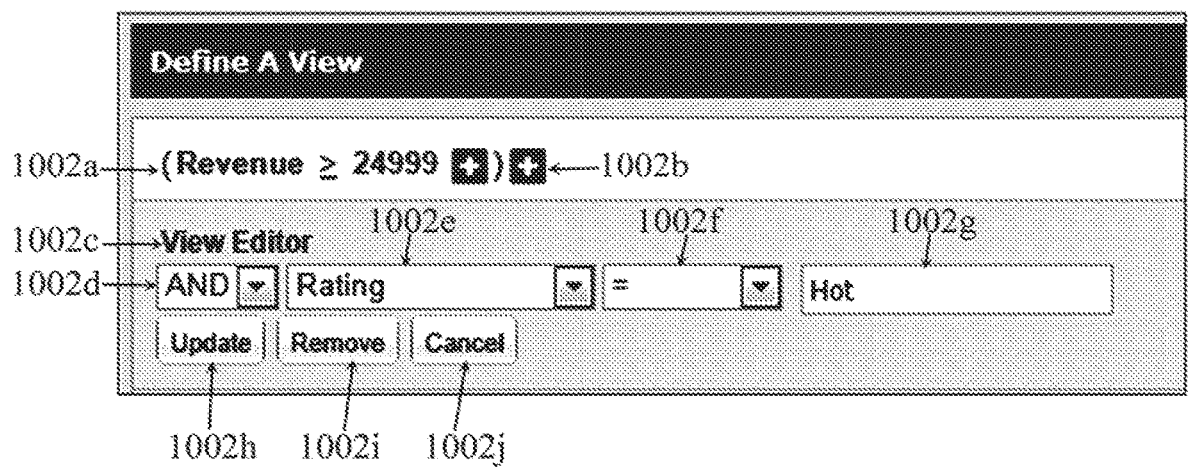
FIG. 10B is an illustrative example of an embodiment of a user interface for managing terms in a view.

FIG. 10B is an illustrative example of an embodiment of a user interface for managing terms in a view. The display 1002a can show the current search expression for the view. The add control 1002b can add a new term to the search expression. The view editor 1002c can be used to define the new term. The four controls 1002d, 1002e, 1002f, and 1002g can be used to specify the new term, with 1002d specifying the boolean operator for combining the term, 1002e specifying the variable, 1002f specifying the comparison operator, and 1002g specifying the constant. The update control 1002h can add the current term to the search expression of the view, the remove control 1002i can remove a current existing term from the search expression of the view, and the cancel control 1002j can finish the editing process with no changes to the search expression of the view.

Figure 11A:
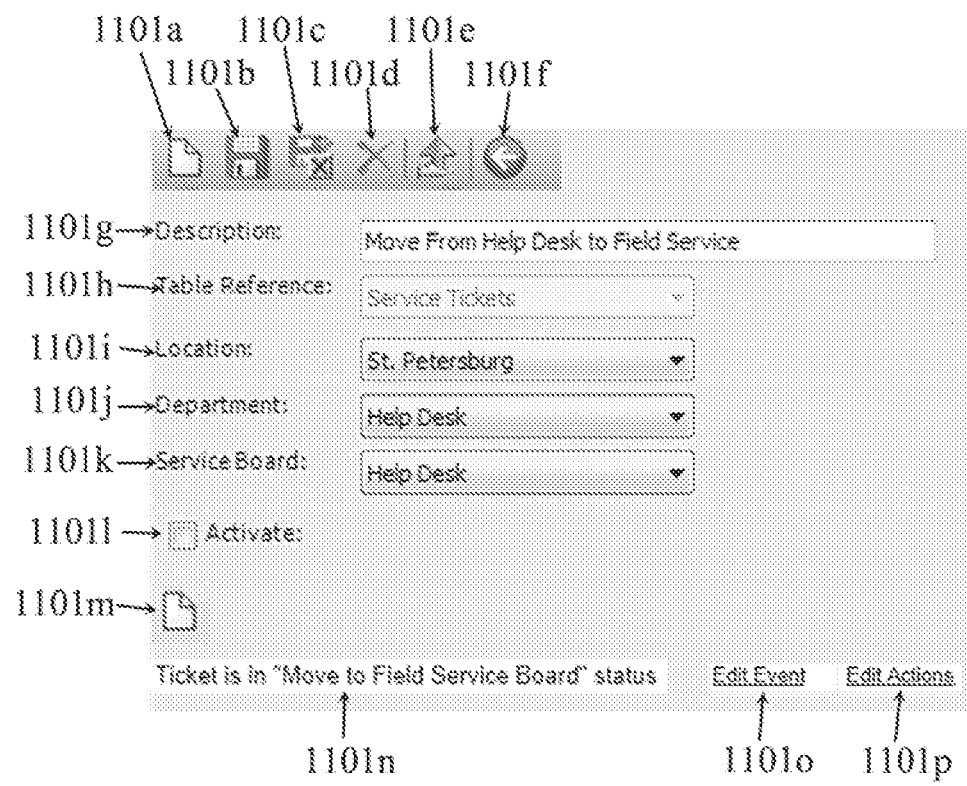
FIG. 11A is an illustrative example of an embodiment of a user interface for managing a workflow rule.

FIG. 11A is an illustrative example of an embodiment of a user interface for managing a workflow rule. As seen with respect to FIG. 1, a workflow rule 104j can be an accessory 103.

Workflow rules can help to save time by automating tasks based on the occurrence of specific events. By way of example, a workflow rule can help to cash in on upcoming revenue by providing a notification of what is coming up for renewal. In another example, a workflow rule can provide better customer service by keeping customers in the loop. In still another example, a workflow rule can help to provide a smoother hand-off between departments. Specifically, workflow rules may facilitate the accountability, consistency and efficiency of a business. By way of example, workflow rules can facilitate accountability by notifying the service manager when a scheduled resource has neglected a service ticket, and by facilitating the enforcement of Service Level Agreement (SLA) goals. Continuing the example, workflow rules can facilitate consistency by automatically assigning resources to tickets based on certain criteria, and by notifying end users of scheduled maintenance. Continuing the example further, workflow rules can facilitate efficiency by automatically closing tickets with no response from a client, and by automatically dispatching after-hours or emergency personnel.

A workflow rule can have an event, which may specify the conditions under which the workflow rule applies, and actions, which may specify the result of applying the workflow rule. By way of example, a workflow rule may have an event to check that a ticket status is New and the ticket is one day old, and an action that assigns the dispatcher or a resource to the ticket. In another example, a workflow rule may have an event to check that a ticket priority is Emergency, the ticket status is New, and the ticket is one hour old, and an action that sends an email to the dispatcher and the service manager. In still another example, a workflow rule may have an event to check that a managed service agreement is 30 days from its end date, and an action that creates an activity for the sales rep to review the agreement with the customer.

Turning to FIG. 11A, the new control 1101a can create a new workflow rule. The save control 1101b can save the current workflow rule and remain within the same user interface. The save and close control 1101c can save the current workflow rule and close the user interface, returning to the previous display. The delete control 1101d can delete the entire workflow rule. The upload control 1101e can upload the workflow rule to the marketplace 101. The back control 1101f can navigate to the previous user interface display without saving any changes to the workflow rule. The description 1101g can specify a descriptive title for the workflow rule. The table reference 1101h can specify the type of workflow rule, such as Service Tickets, Service Surveys, Project Tickets, Opportunities, Configurations and Agreements. The location 1101i can restrict the workflow rule to only be run on records with a specified location. The department 1101j can restrict the workflow rule to only be run on records with a specified department. The service board 1101k can restrict the workflow rule to only be run on records within a certain service board, when the table reference 1101h is set to Service Tickets or Project Tickets. Selecting the activate control 1101l can activate the workflow rule to be run. The Run Every parameter can specify how often to run the workflow rule. The During parameter can specify when to run the workflow rule, with a setting of 24 Hours specifying to run the workflow rule continuously, a setting of Office Hours to run the workflow rule during the office hours of the company, and a setting of SLA Hours to run the workflow rule during the hours for the Service Level Agreements (SLAs) of the tickets to which the workflow rule applies. The new event control 1101m can add a new event and action pair to the workflow rule. The lower section of the user interface can show a list of the events and actions associated with the workflow rule. The description 1101n can be the event text based on how the event is set up. The edit event link 1101o can navigate to a user interface to edit the event. The edit actions link 1101p can navigate to a user interface to edit the action.

Figure 11B:
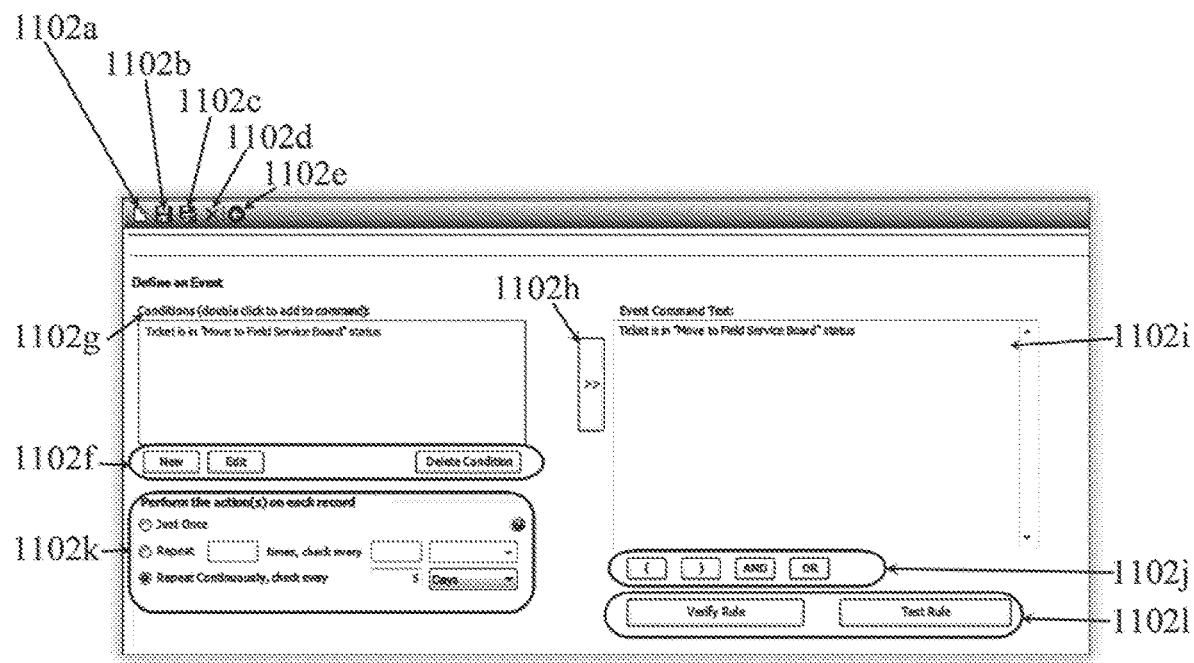
FIG. 11B is an illustrative example of an embodiment of a user interface for managing events in a workflow rule.

FIG. 11B is an illustrative example of an embodiment of a user interface for managing events in a workflow rule. The new control 1102a can create a new event. The save control 1102b can save the current event and remain within the same user interface. The save and close control 1102c can save the current event and close the user interface, returning to the previous display. The delete control 1102d can delete the entire event. The back control 1102e can navigate to the previous user interface display without saving. The conditions 1102g can list the conditions that have been defined. The editing controls 1102f can operate on the conditions 1102g. The New control can create a new condition by selecting a trigger and defining any parameters for the trigger. The Edit control can modify an existing condition selected in the conditions 1102g. The Delete Condition control can delete an existing condition selected in the conditions 1102g. The move control 1102h can move a condition selected in the conditions 1102g to the event commands 1102i. The event commands 1102i can be used to define an event using the event command controls 1102j. The event command controls 1102j can be used to define an event. The AND control can combine the commands displayed in the event commands 1102i with a logical AND. The OR control can combine the commands displayed in the event commands 1102i with a logical OR. The left parenthesis control can be used to start a sub-command. The right parenthesis control can be used to finish a sub-command. The execution controls 1102k can be used to specify when the workflow rule is run. The Just Once setting can indicate that the workflow rule will only be run one time. The Repeat setting can indicate that the workflow rule will run a fixed number of times, and will run at the specified interval. The Repeat Continuously setting can indicate that the workflow rule will run endlessly at the specified interval. The testing controls 1102l can facilitate building and testing the workflow rule. The Verify Rule control will check the syntax of the workflow rule and report any errors. The Test Rule control will select the records that the workflow rule would run on and allow the list to be inspected to check its correctness.

FIGS. 11C-F are illustrative tables of an embodiment of the values for workflow rule triggers in an event in a service ticket. In each table, column 1103 is the name of an event type that can be used to define an event for a workflow rule that can run on a service ticket, and column 1104 is a description of that event type. The text "{value}" appearing in a description in column 1104 can indicate a parameter that can be specified for the event type.

FIG. 11G is an illustrative table of an embodiment of the values for workflow rule triggers in an event in a project. In the table, column 1105 is the name of an event type that can be used to define an event for a workflow rule that can run on a project, and column 1106 is a description of that event type. The text "{value}" appearing in a description in column 1106 can indicate a parameter that can be specified for the event type.

FIG. 11H is an illustrative table of an embodiment of the values for workflow rule triggers in an event in a CRM survey. In the table, column 1107 is the name of an event type that can be used to define an event for a workflow rule that can run on a CRM survey, and column 1108 is a description of that event type. The text "{value}" appearing in a description in column 1108 can indicate a parameter that can be specified for the event type.

FIG. 11I is an illustrative table of an embodiment of the values for workflow rule triggers in an event in an agreement. In the table, column 1109 is the name of an event type that can be used to define an event for a workflow rule that can run on an agreement, and column 1110 is a description of that event type. The text "{value}" appearing in a description in column 1110 can indicate a parameter that can be specified for the event type.

FIG. 11J is an illustrative table of an embodiment of the values for workflow rule triggers in an event in a product configuration. In the table, column 1111 is the name of an event type that can be used to define an event for a workflow rule that can run on a product configuration, and column 1112 is a description of that event type. The text "{value}" appearing in a description in column 1112 can indicate a parameter that can be specified for the event type.

FIG. 11K is an illustrative table of an embodiment of the values for workflow rule triggers in an event in an invoice. In the table, column 1113 is the name of an event type that can be used to define an event for a workflow rule that can run on an invoice, and column 1114 is a description of that event type. The text "{value}" appearing in a description in column 1114 can indicate a parameter that can be specified for the event type.

FIGS. 11L-M are illustrative tables of an embodiment of the values for workflow rule actions in an event. In each table, column 1115 can indicate the name of the action type, column 1116 can indicate the types of items that the action can be applied to, column 1117 can list the parameters that are required in order to define the action, and column 1118 can list the parameters that may be used to define the action but are not required.

Figure 11N:
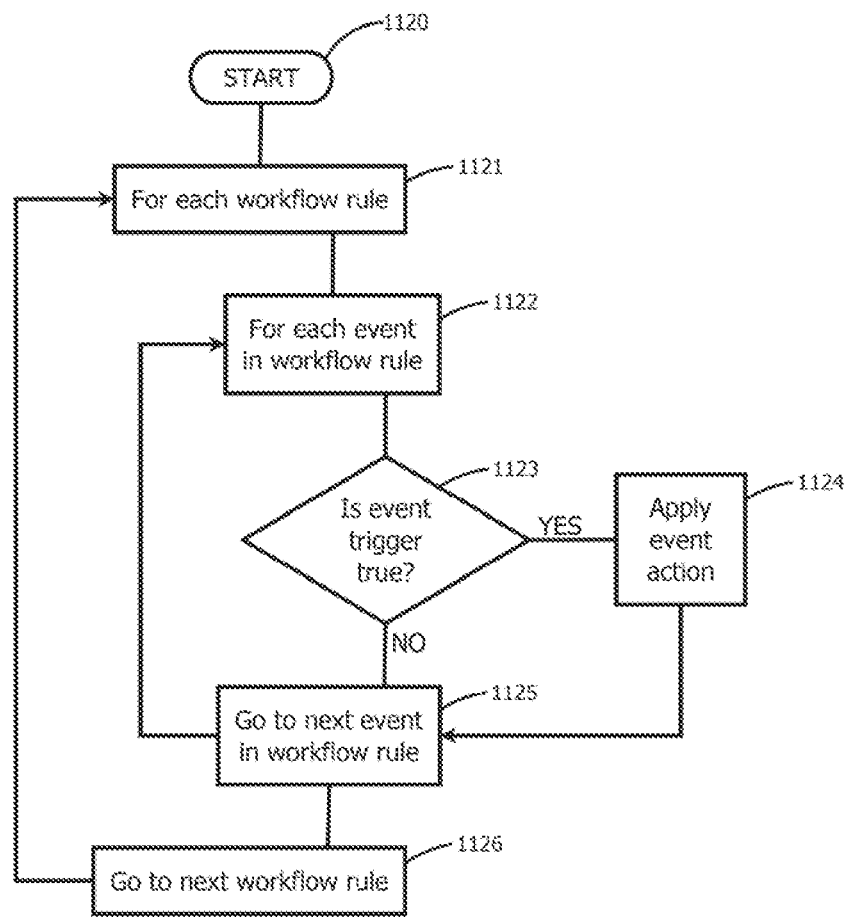
FIG. 11N is an illustrative flowchart depicting one embodiment of a method to apply workflow rules.

FIG. 11N is an illustrative flowchart depicting one embodiment of a method to apply workflow rules. The method 1120 can include repeating for each workflow rule (1121). The method 1120 can include moving to the next workflow rule to continue the repetition (1126). The method 1120 can include repeating for each event in a workflow rule (1122). The method 1120 can include moving to the next event in a workflow rule to continue the repetition (1125). The method 1120 can include checking to see whether the event trigger in a workflow rule is true (1123). In some embodiments, the method 1120 can include applying the event action of a workflow rule (1124).

Figure 12A:
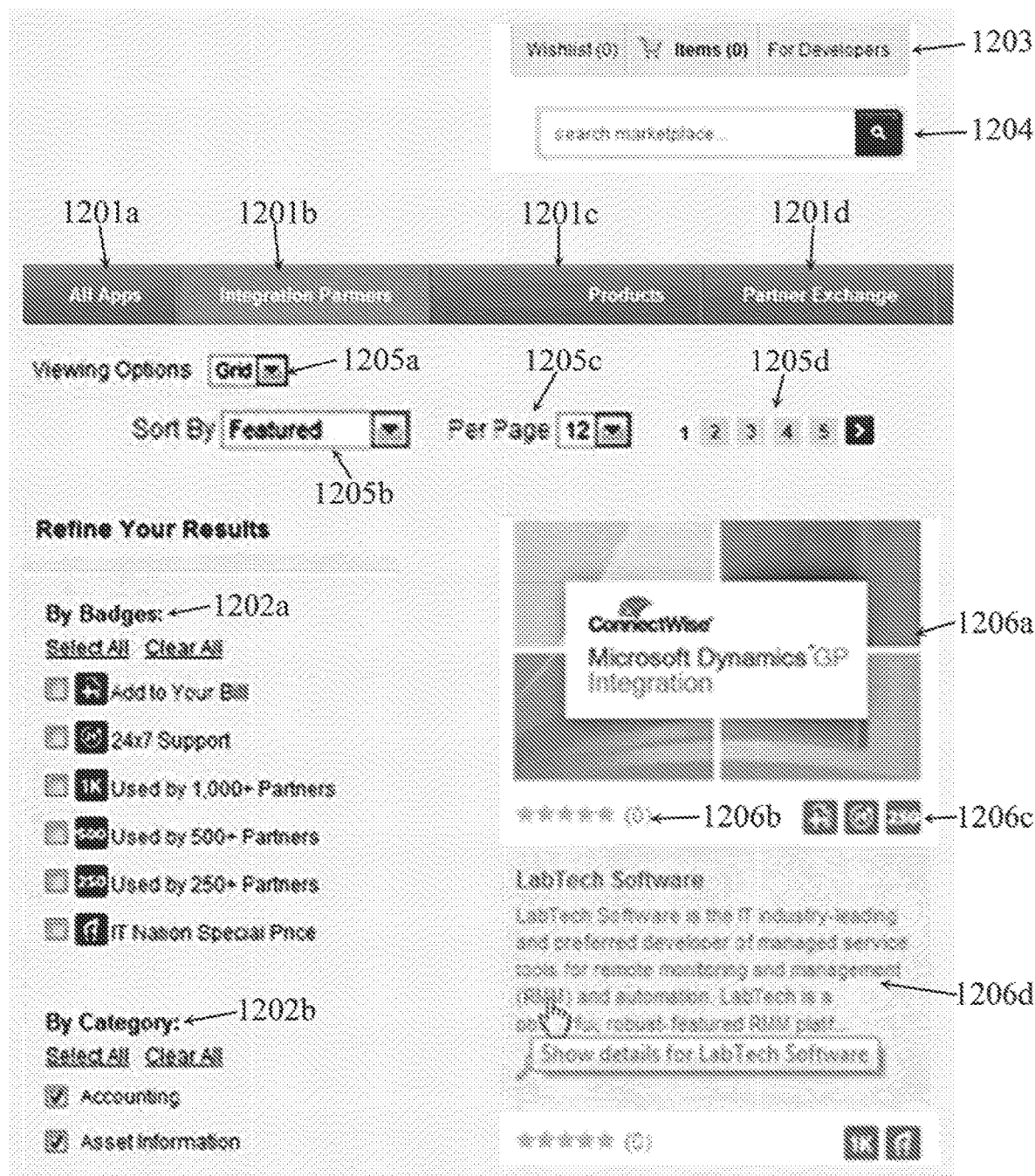
FIG. 12A is an illustrative example of an embodiment of a user interface for managing apps in a marketplace.

FIG. 12A is an illustrative example of an embodiment of a user interface for managing apps in a marketplace. As seen with respect to FIG. 1, an app 104k can be an accessory 103. An app can be an add-on to the business automation system that works with the business automation system to provide additional functionality that may be useful to the end users of the business automation system. The marketplace can provide a selection of apps that may give the end users a convenient "one-stop shopping" mechanism for easily and quickly purchasing and setting up everything that is needed to run a business. By way of example, the marketplace can provide all the apps necessary to run a Managed Service Provider (MSP) business, as well as optional apps that can help with additional needs that an MSP might have. The marketplace can also provide ratings and reviews of the apps that may be contributed by other users that are running MSP businesses. These ratings and reviews may be helpful to a prospective customer to decide which apps to obtain from the marketplace.

Turning to FIG. 12A, the marketplace can offer several sections. These sections may include All Apps 1201a, which can show everything that is available, Integration Partners 1201b, which can show apps that have been approved by a testing process to verify that the apps work with the business automation system. The testing process may include installing the app on a number of configurations of the business automation system, running test suites to ensure that the app does not fail in error conditions, manually checking that the app provides the correct results for its advertised functions, stress testing the app to ensure that it fails gracefully in low-resource situations, and so on. The sections may also include Products 1201c, which can show apps that are offered by the same company that provides the business automation system, and Partner Exchange 1201d, which can show accessories other than apps. The apps can be further selected by criteria to narrow the display such as badges 1202a and categories 1202b. The apps can be shown in an attractive display that may include a graphic 1206a for the app, a summary of the ratings 1206b, icons summarizing properties of the app 1206c, and a text summary of the app 1206d that can be activated by rolling over the graphic 1206a. The app display can be navigated by using a display format control 1205a, a display sorting control 1205b, a display size control 1205c, and a display page control 1205d. A search control 1204 can facilitate finding apps by providing text searches on text associated with the apps. Shopping controls 1203 can provide a shopping cart interface, along with a link to information for developers who would like to develop apps for the marketplace 101.

Figure 12B:
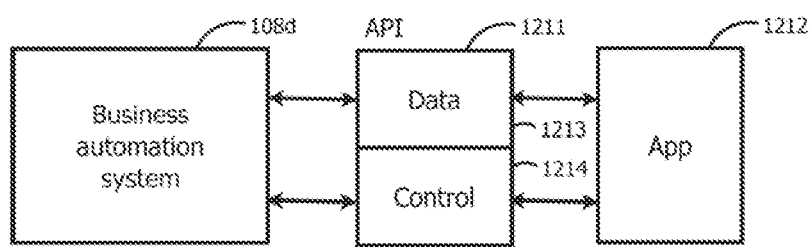
FIG. 12B is an illustrative block diagram of an embodiment of an application programming interface (API) for an app.

FIG. 12B is an illustrative block diagram of an embodiment of an application programming interface (API) for an app. An app 1212 can interact very closely with the business automation system 108d through an API 1211, which may allow the app 1212 to access and update data in the business automation system 108d, and may also allow the app 1212 to initiate actions within the business automation system 108d and receive notifications from the business automation system 108d. The API 1211 may be partitioned into a data section 1213 and a control section 1214. One advantage of using an API 1211 may be that if the architecture of the business automation system 108d changes, the API 1211 may be updated to match the changes to the business automation system, but can still present the same interface to an app 1212. In this way, the app 1212 can continue to work with the business automation system 108d without any changes.

Figure 13A:
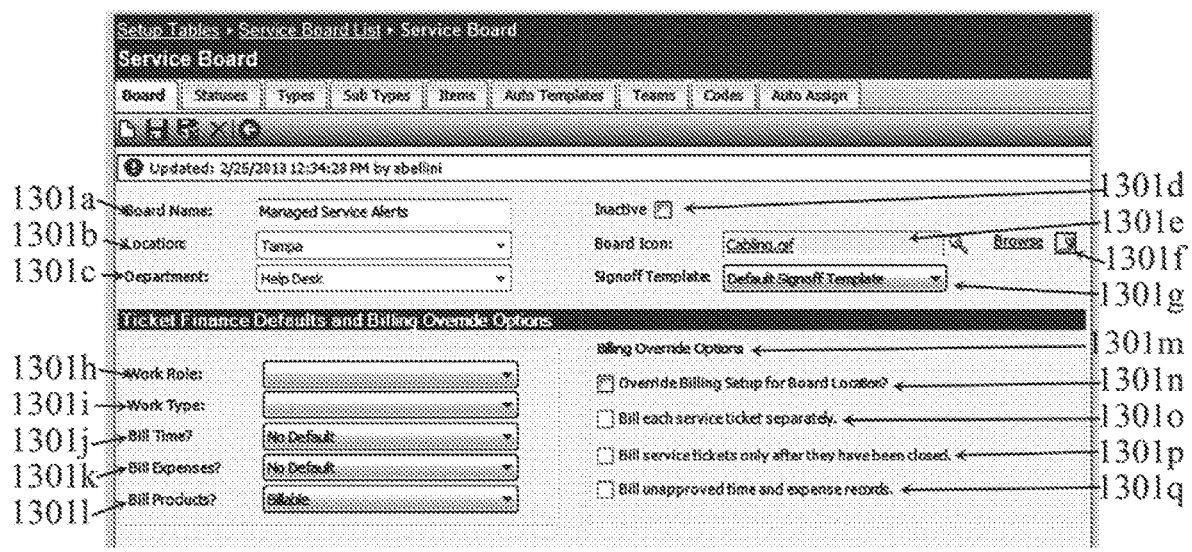
Figure 13C:
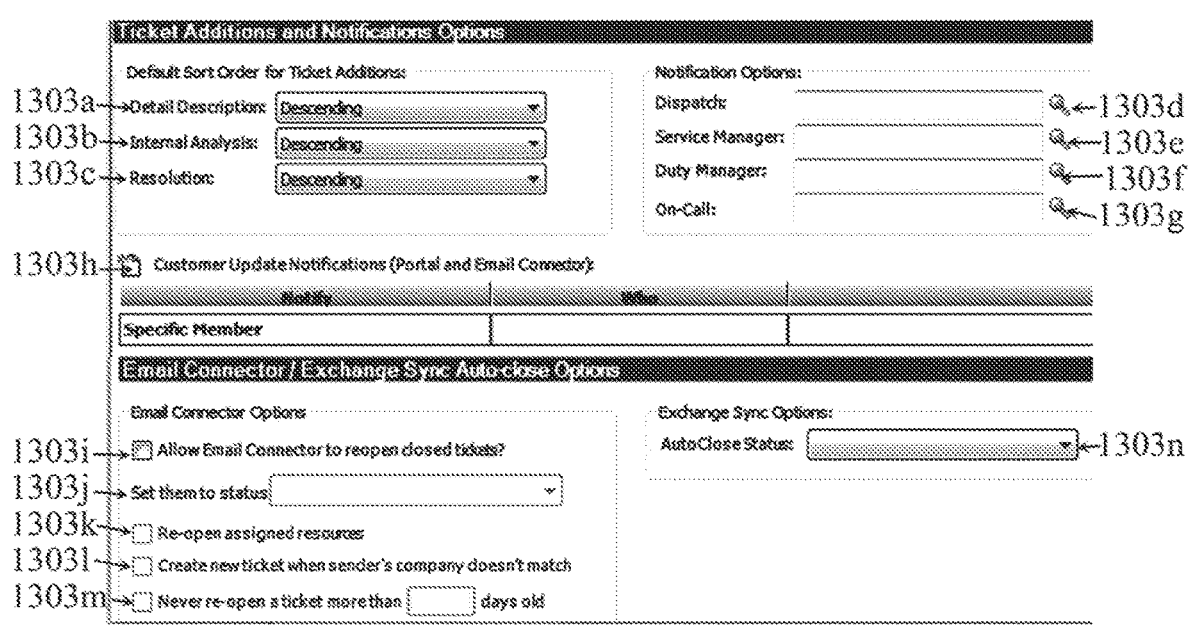

FIGS. 13A-C are illustrative examples of an embodiment of a user interface for managing a service board. As seen with respect to FIG. 1, a service board 104l can be an accessory 103. Service boards can be user interface tools that may make it easier to access groups of service tickets. Service boards can be created to select specific locations and business units, and may be organized to show different categories of service tickets representing internal and external needs. By way of example, separate service boards can be created to meet the needs of operations, sales, renewals, help desk, and so on. The service boards in the marketplace can be generalizations of the service boards in the business automation system, allowing parameter substitutions so that the marketplace service boards can be used to set up the specific service boards that may be needed in a business automation system. Using service boards from the marketplace may save a significant amount of time, since configuring the detailed settings for a service board may take time, and it may be desirable to have a number of different service boards to run some classes of businesses.

Turning to FIG. 13A, the board name 1301a can specify the name of the service board. The location 1301b can specify the location assigned to this service board. The department 1301c can specify the business department assigned to this service board. Selecting inactive 1301d can indicate that this service board is removed from use, so that this service board will not show up in the service user interface. The board icon 1301e can assign an icon to this service board. The browse control 1301f can select a local file to upload for the board icon 1301e. The signoff template 1301g can select a template containing the information and format to display in the client signature section of service tickets on this service board. The work role 1301*h* can select the work role that is assigned by default to service tickets on this service board. The work role 1301*h* can override the work role defined for the individual assigned to the service ticket. The work type 1301*i* can select the work type that is assigned by default to service tickets on this service board. The work type 1301*i* can override the work type defined for the individual assigned to the service ticket. The bill time 1301*j* can set the default billing option for labor costs on service tickets on this service board. The billing options can include Billable, which may indicate that time accrued is billable to the customer, Do Not Bill, which may indicate that time accrued is not billable to the customer and will not appear on invoices, No Charge, which may indicate that time accrued is not billable to the customer but a zero-dollar amount will appear on invoices, and No Default, which may indicate that the billing option is determined by other settings elsewhere in the business automation system. The bill expenses 1301*k* can set the default billing option for external costs on service tickets on this service board. The billing options can include Billable, which may indicate that expenses are billable to the customer, Do Not Bill, which may indicate that expenses are not billable to the customer and will not appear on invoices, No Charge, which may indicate that expenses are not billable to the customer but a zero-dollar amount will appear on invoices, and No Default, which may indicate that the billing option is determined by other settings elsewhere in the business automation system. The bill products 1301*l* can set the default billing option for parts costs on service tickets on this service board. The billing options can include Billable, which may indicate that products are billable to the customer, Do Not Bill, which may indicate that products are not billable to the customer and will not appear on invoices, No Charge, which may indicate that products are not billable to the customer but a zero-dollar amount will appear on invoices, and No Default, which may indicate that the billing option is determined by other settings elsewhere in the business automation system. The billing override options 1301*m* can provide the ability to override billing options that are defined elsewhere in the business automation system for service tickets on this service board. Selecting override billing setup for board location 1301*n* can enable the override options 1301*o*, 1301*p*, and 1301*q* to allow the override options to be selectively enabled or disabled. Selecting bill each service ticket separately 1301*o* can generate a separate invoice for each service ticket on this service board. Selecting bill service tickets only after they have been closed 1301*p* can prevent open service tickets on this service board from being invoiced. Selecting bill unapproved time and expense records 1301*q* can include unapproved time and expense records related to service tickets on invoices for this service board.

Turning to FIG. 13B, the time entry options 1302*a* can control which notes are updated when a new time entry is added to service tickets on this service board. The options can independently enable or disable adding notes to the detail description, internal analysis, and resolution of service tickets on this service board. The sent from 1302*b* can specify the default sender email address to be used for service tickets on this service board. The display name 1302*c* can specify the default sender email display name to be used for service tickets on this service board. Selecting use member as display name 1302*d* can indicate that the sender email display name for service tickets on this service board can be the name of the individual using the service board to send the email. Selecting contact 1302*e* can indicate that the contact on the service ticket will receive an email by default when the ticket is updated. Selecting a template next to the contact 1302*e* can select that template for formatting the email to be sent to the contact. Selecting resource 1302*f* can indicate that the assigned resources on the service ticket will receive an email by default when the ticket is updated. Selecting a template next to the resource 1302*f* can select that template for formatting the email to be sent to the resources. Selecting time entry option cannot be changed 1302*g* can indicate that a time record will always be created for service tickets on this service board. Selecting detail description cannot be updated directly 1302*h* can indicate that the detailed description for service tickets cannot be updated using the user interface for managing service tickets, but may be updated using the closed loop user interface. Selecting updates to detail description 1302*i* can indicate that selecting the time stamp for the detailed description in the user interface for managing service tickets may navigate to the closed loop user interface used to update the detail description. Selecting updates to internal analysis 1302*j* can indicate that selecting the time stamp for the internal analysis in the user interface for managing service tickets may navigate to the closed loop user interface used to update the internal analysis. Selecting updates to resolution 1302*k* can indicate that selecting the time stamp for the resolution in the user interface for managing service tickets may navigate to the closed loop user interface used to update the resolution.

Turning to FIG. 13C, the detail description 1303*a* can select whether detail descriptions for service tickets on this service board will default to being displayed in ascending or descending order by service ticket. The internal analysis 1303*b* can select whether internal analysis for service tickets on this service board will default to being displayed in ascending or descending order by service ticket. The resolution 1303*c* can select whether resolutions for service tickets on this service board will default to being displayed in ascending or descending order by service ticket. The dispatch 1303*d* can specify the individual that is designated as the service dispatcher and may be used for workflow notifications for this service board. The service manager 1303*e* can specify the individual that is designated as the service manager and may be used for workflow notifications for this service board. The duty manager 1303*f* can specify the individual that is designated as the duty manager and may be used for workflow notifications for this service board. The duty manager 1303*f* may serve as a backup to the on-call manager 1303*g* and may be notified if the on-call manager 1303*g* does not respond to a service ticket within a specified period of time. The on-call 1303*g* can specify the individual that is designated as the on-call manager and may be used for workflow notifications for this service board. The customer update notifications 1303*h* can specify the individuals who may be notified for updates in the portal and email connector. Selecting allow email connector to reopen closed tickets 1303*i* can allow the email connector to reopen a service ticket on this service board when a customer responds to a service ticket that is in a closed status. The set them to status 1303*j* can specify the status to set for service tickets on this service board when the service tickets are reopened by the email connector. Selecting re-open assigned resources 1303*k* can reassign the resources to a service ticket on this service board when the service ticket is reopened by the email connector. Selecting create new ticket when sender's company doesn't match 1303*l* can create a new service ticket on this service board, rather than reopening an existing service ticket, when the email connector receives a response for a service ticket but the domain name of the email sender does not match the domain name of the original service ticket. Selecting never re-open a ticket more than 1303*m* can prevent the email connector from reopening service tickets on this service board that are older than the specified number of days. The auto-close status 1303*n* can specify the status assigned to a service ticket on this service board when all users on a service ticket have used a mobile device interface to indicate that the users are finished with the service ticket.

Figure 13D:
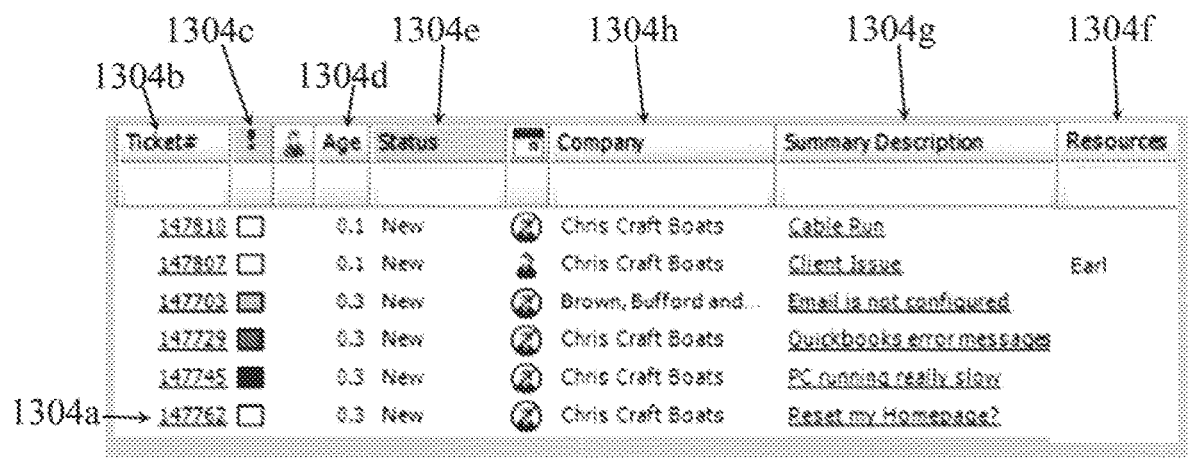

FIG. 13D is an illustrative example of an embodiment of a user interface for using a service board. After a service board is set up, the service board can be used to display, organize, and update service tickets. The service tickets can appear one per line in a display table 1304*a*. Information about the service tickets can appear in columns 1304*b*-1304*h* of the table. The ticket number 1304*b* can be a unique reference identifier for the service ticket. The priority 1304*c* can be an indication of how important or time-critical the service ticket is. The age 1304*d* can indicate how long it has been since the service ticket was created. The status 1304*e* can indicate what state the service ticket is in as the service ticket goes through its life cycle; for example, the status 1304*e* may be one of New, Scheduled, Closed, or Completed. The company 1304*h* can indicate the company to which the service ticket applies. The summary description 1304*g* can be a short description of the issue described by the service ticket, which may serve as a reminder of the content of the service ticket. The resources 1304*f* can be a list of the individuals who are assigned to work on the service ticket.

Figure 13E:
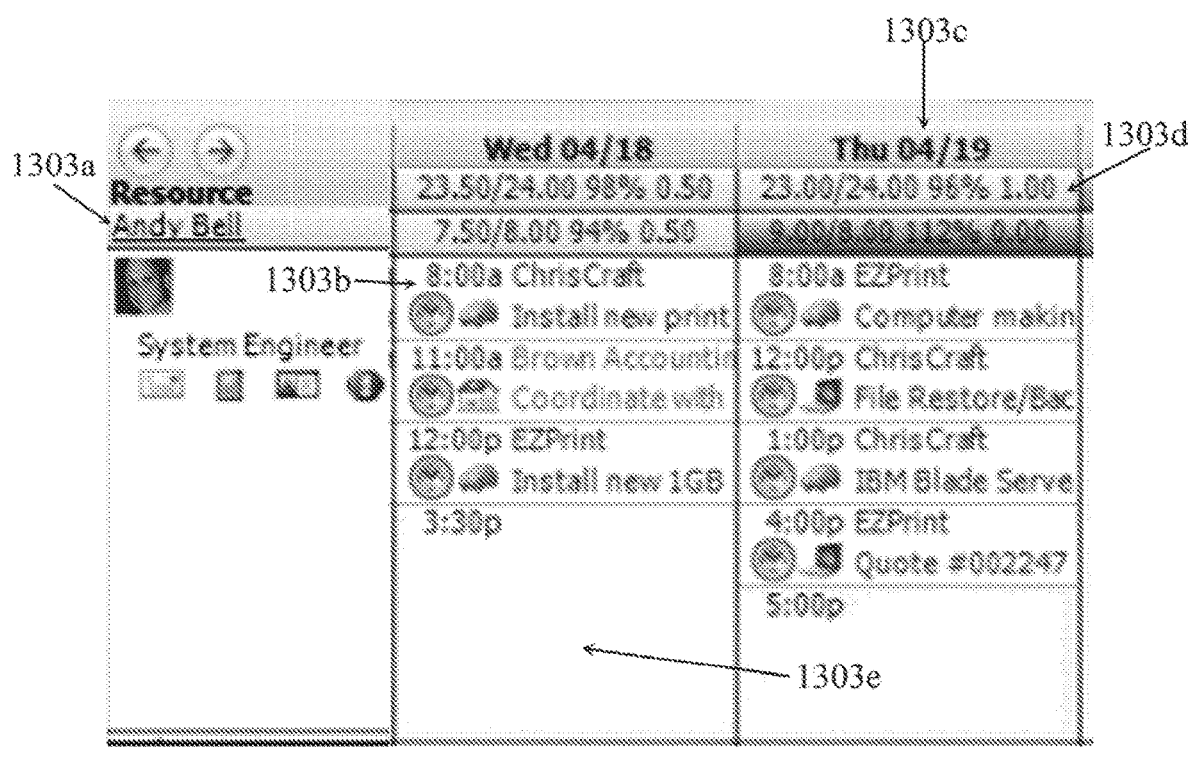

FIG. 13E is an illustrative example of an embodiment of a user interface for using a dispatch portal in a service board. Service boards can also provide a dispatch portal, which may facilitate the process of assigning service tickets to resources efficiently. The dispatch portal can display a calendar view for an individual resource 1303*a*. The calendar view can show the time assignments of service tickets already assigned to the resource, such as 1303*b* as an example. A service manager can drag a service ticket from the service board display as shown with respect to FIG. 13D and drop the service ticket into a blank area, such as 1303*e* as an example. The business automation system can then assign the service ticket to the resource 1303*a* at the next available time for that day and update the display to include the service ticket as an assignment similar to 1303*b*. The resource 1303*a* can use the schedule for a day 1303*c* to plan activities for the day. Management can see the utilization 1303*d* for the resource by day to make sure that the time of staff is being used efficiently.

FIG. 14A is an illustrative example of an embodiment of a user interface for managing a project board. As seen with respect to FIG. 1, a project board 104*m* can be an accessory 103. Project boards can display summary information from a collection of selected projects. Project boards may facilitate the review of projects to help identify status, budget issues and billing status by providing a single view, and can therefore facilitate the management of scheduling, time budgets, expenses and financials of each project. Each row 1401 in a project board can represent a single project, and the columns 1402 can display summary information about the project.

FIG. 14B is an illustrative table of an embodiment of the fields in the user interface for managing a project board. The field names 1402 are the column headers that can be selected for the display in FIG. 14A, and the descriptions 1403 describe the information that corresponds to those field names 1402.

FIGS. 14C-E are illustrative tables of an embodiment of the information pertaining to a project board. In each table, the data column 1404 is a descriptive name for a type of information that is stored with a project board, and the description column 1405 is a detailed description of the type of data named in column 1404.

Figure 15A:
FIG. 15A is an illustrative table of an embodiment of the information in a solution set.

FIG. 15A is an illustrative table of an embodiment of the information in a solution set. As seen with respect to FIG. 1, a solution set 104*n* can be an accessory 103. The list 1501 enumerates the item types that can be part of a solution set. A solution set can contain any number of any other kind of accessory, which may include agreements, product configurations, CRM surveys, custom reports, HTML email templates, project templates, service templates, tracks, views, workflow rules, apps, service boards, and project boards. A solution set can also contain instructional videos and checklists, which can help end users to learn how to use the other accessories in the solution set.

A solution set can be more valuable than simply a collection of accessories, because the accessories can be designed to work with each other to help facilitate the delivery of a complete business solution. The value of a solution set can best be shown by way of example, so FIGS. 15B-15L describe a human resources solution set. This human resources solution set provides a collection of accessories that can configure a business automation system to provide human resources functions that can facilitate the selection and hiring of a new employee to fill a position. This may be a somewhat unusual use of the business automation system, but the solution set can make the business automation solution work well for human resources functions with little or no configuration and setup on the part of the end user.

Figure 15B:
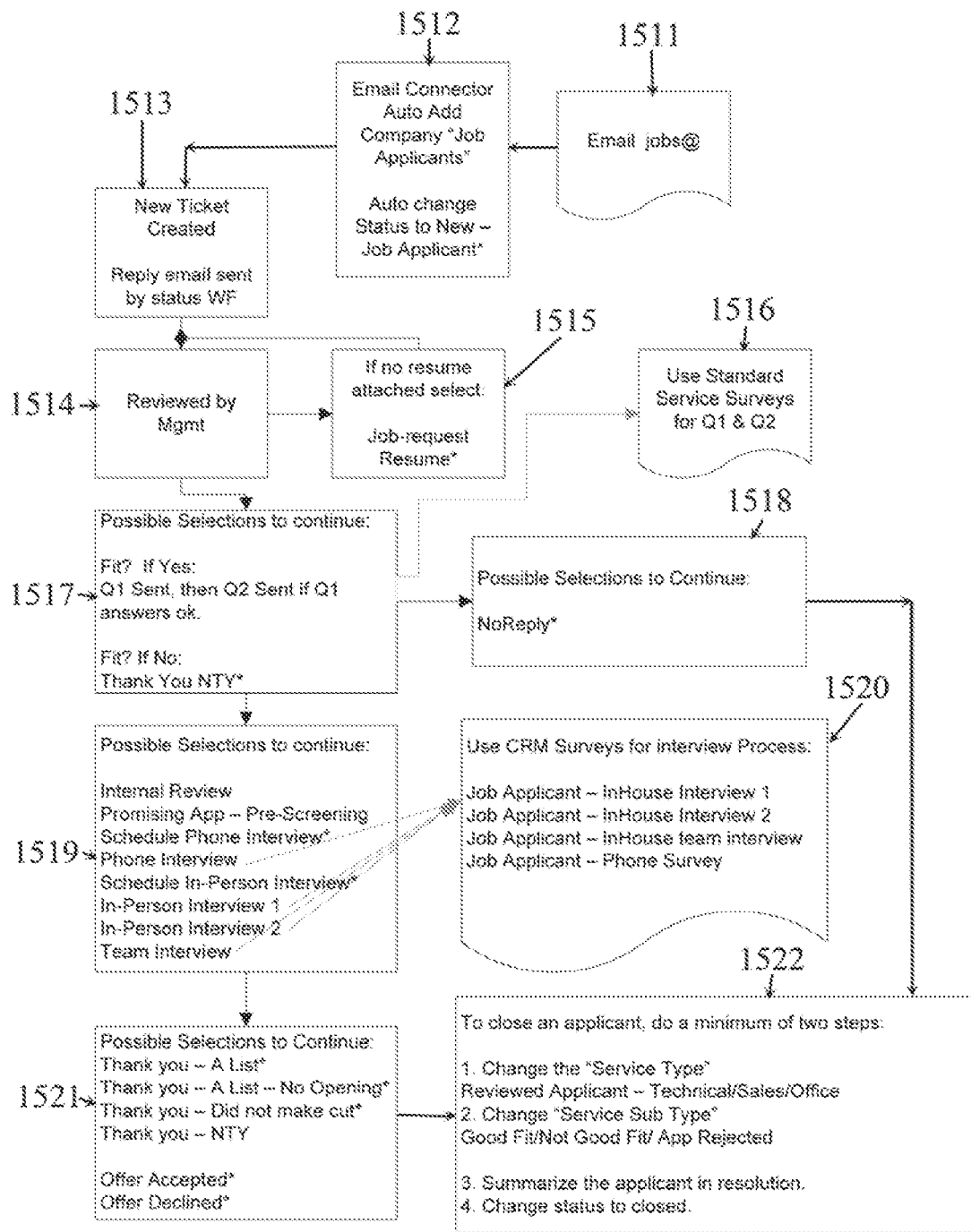
FIG. 15B is an illustrative flowchart depicting one embodiment of a human resources solution set method.

FIG. 15B is an illustrative flowchart depicting one embodiment of a human resources solution set method. The method can include receiving an email addressed to the job application email address of the company (1511). The method can include using the email connector to enter the received job application as a service ticket in the company "Job Applicants" and setting the service ticket status to "New—Job Applicant" (1512). The method can include automatically sending an email reply to the applicant using a workflow rule based on the status (1513). The method can include notification of a manager to review the application (1514). In one embodiment, the method can include assigning the status "Job—request resume" to the service ticket, which can send an email to the applicant through a workflow rule (1515). The method can include using two CRM surveys to provide an initial assessment of the applicant (1516). The method can include deciding whether there is not a fit between the applicant and the position (1517). In one embodiment, the method can include rejecting the applicant after the initial assessment (1518). In one embodiment, the method can include continuing with the applicant after the initial assessment (1519). In one embodiment, the method can include using a series of additional CRM surveys for the interview process (1520). In one embodiment, the method can include reviewing the interview results, deciding on the action to take, and updating the status of the service ticket accordingly (1521). The method can include closing the service ticket while updating the service sub type to indicate the outcome and summarizing the interview notes in the resolution (1522).

FIG. 15C is an illustrative example of an embodiment of a user interface for the service board in a human resources solution set. The human resources solution set can contain a service board that defines service status values for use with the solution set. The user interface shows the list of status values that can be applied to service tickets, with each row 1531*d* representing a status value. The sort order column 1531*a* represents the order in which the rows are displayed, and roughly indicates the order that a service ticket can be likely to follow through the system. The service status column 1531*b* represents the name of the status value. The service board column 1531*c* represents the service board where the status values can be use, and in this case can indicate that the HR-JOBS service board is used to manage the service tickets associated with the human resources solution set.

Figure 15D:
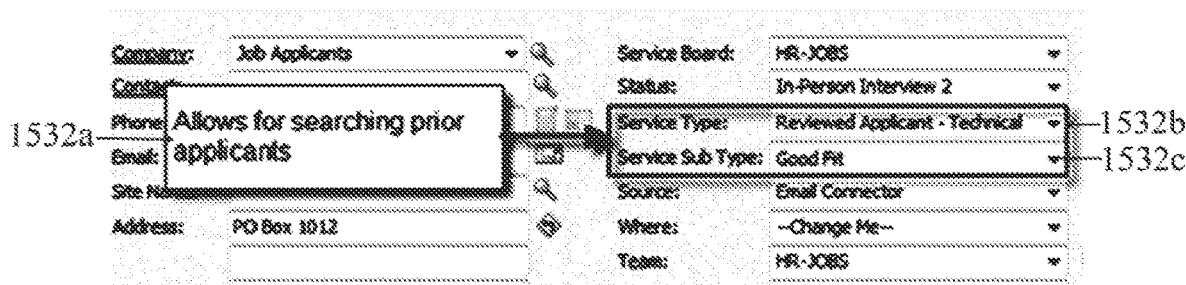

FIG. 15D is an illustrative example of an embodiment of a user interface for managing a service ticket in a human resources solution set. The human resources solution set can contain a service board that defines service types and service sub-types for use with the solution set. The human resources solution set can also contain an instructional video that demonstrates the use of the service types and service sub-types. The comment 1532*a* can indicate that the service types and service sub-types can facilitate searching for previous applicants for the position, and the service type 1532*b* and service sub-type 1532*c* can facilitate the demonstration of an example of the search.

Figure 15E:
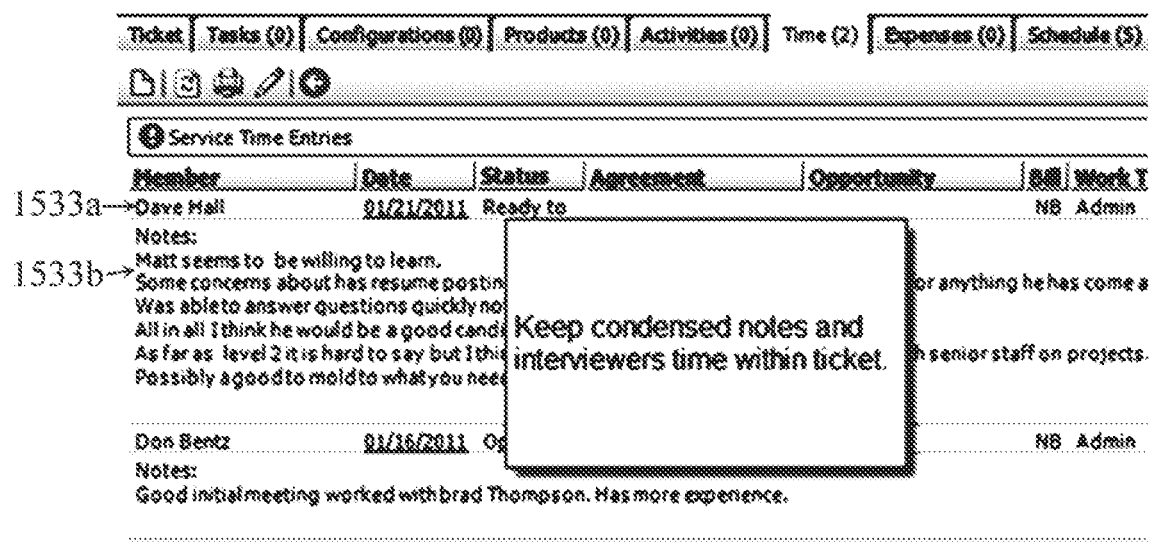

FIG. 15E is an illustrative example of an embodiment of a user interface for managing resources in a human resources solution set. The user interface for tracking time usage in service tickets can work well for recording the results of interviews, and can track both the individual 1533*a* conducting the interview and the notes 1533*b* from the interview. The instructional video in the solution set can make the operation clear.

Figure 15F:
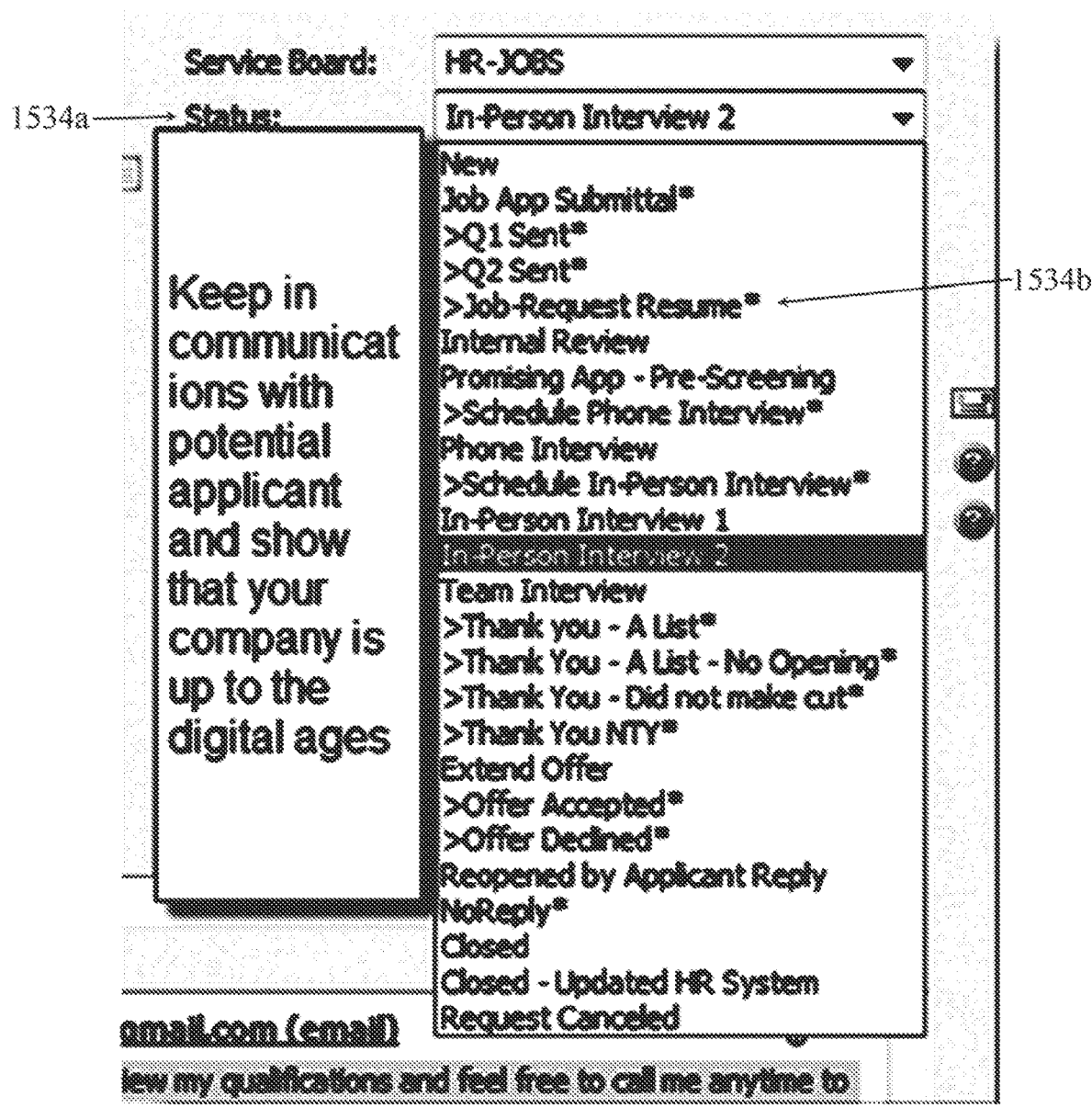

FIG. 15F is an illustrative example of an embodiment of a user interface for managing a service ticket in a human resources solution set. The human resources solution set can contain workflow rules, and a workflow rule can trigger based on the service ticket status 1534*a* being set to specific values 1534*b*, with an action to send an email response to the applicant to keep the applicant posted on the current status of the employment application. The instructional video in the solution set can make the operation clear.

FIG. 15G is an illustrative example of an embodiment of a user interface for scheduling resources in a human resources solution set. The user interface for scheduling and notifying service tickets can work well for scheduling interviews and notifying the participants. The user interface showing scheduled resources then shows each interview as a row 1535 in the table. The instructional video in the solution set can make the operation clear.

Figure 15H:
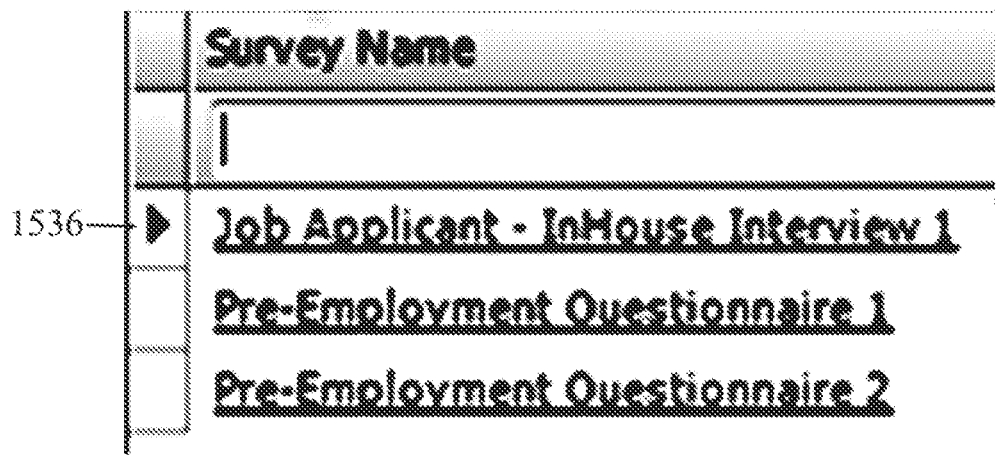

FIG. 15H is an illustrative example of an embodiment of a user interface for managing CRM surveys in a human resources solution set. The human resources solution set can contain CRM surveys that may help to guide the interview and may help keep the interview process more uniform. The user interface listing the CRM surveys can show each survey as a row 1536 in the table, and can make it easier to find and use the CRM surveys.

FIGS. 15I-J are illustrative tables of an embodiment of CRM surveys in a human resources solution set. FIG. 15I is the CRM survey for the first screening interview and can have a set of simple questions 1537*a* with scored answers 1537*b* having point scores to rate the applicants on fit. The applicant may be accepted only if the total score meets a specific threshold. FIG. 15J is the CRM survey for the second screening interview and can have a set of simple questions 1537*a* with scored answers 1537*b* having point scores to rate the applicants on fit. The applicant may be accepted only if the total score meets a specific threshold.

Figures 15K, 15L:
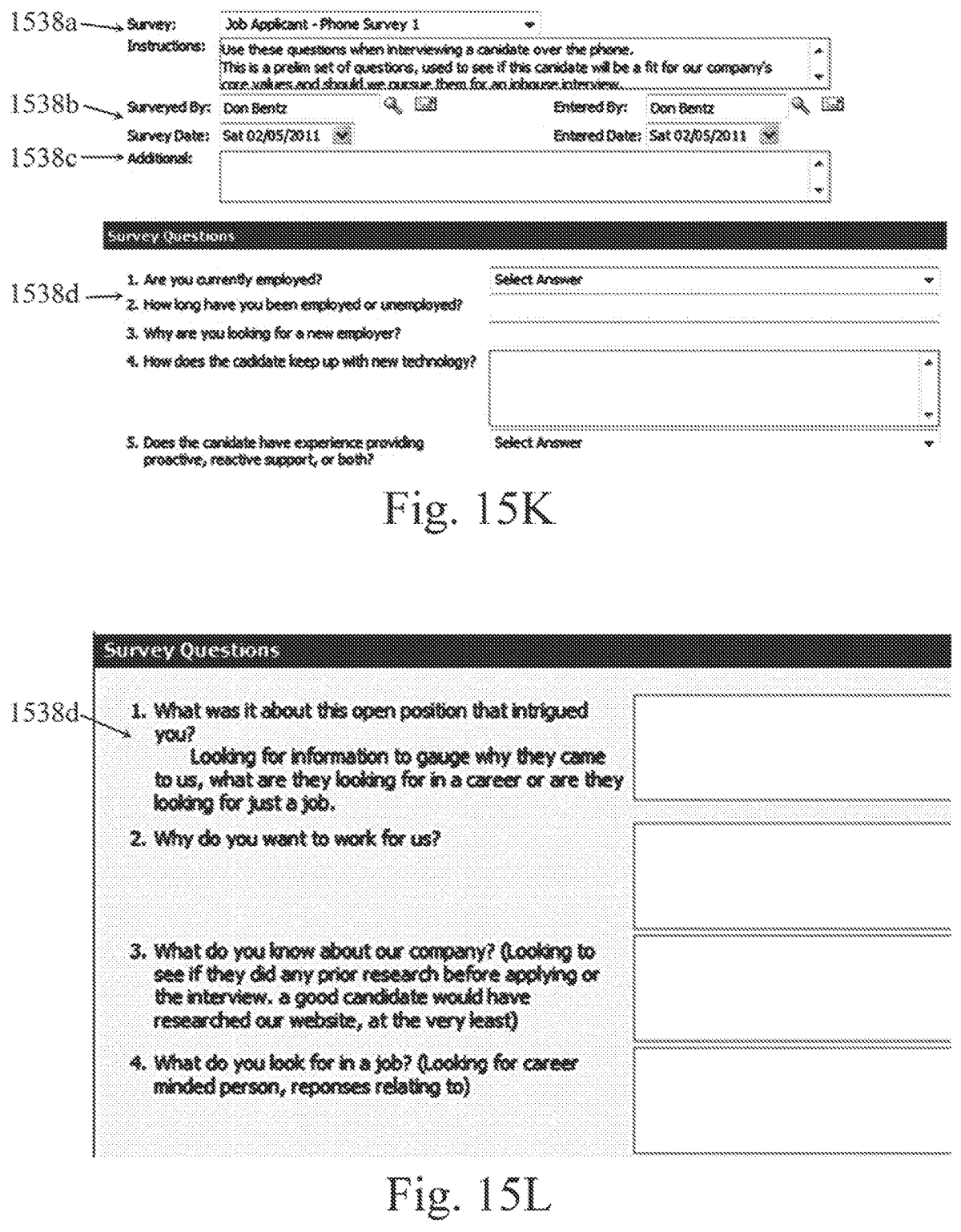

FIGS. 15K-L are illustrative examples of an embodiment of a user interface for using CRM surveys in a human resources solution set. FIG. 15K illustrates a user interface that can provide an interviewer with a facility to conduct a more in-depth interview. The interviewer can select the interview 1538*a* and see some specific instructions by the interview designer, and can track specific information 1538*b* about the interview logistics, as well as adding arbitrary comments 1538*c* relative to the interview. The interviewer can then use the questions 1538*d* as a guide to conducting the interview in a relatively standard way. FIG. 15L illustrates a set of questions 1538*d* that can guide the interviewer to conduct a more open-ended interview to explore the capabilities of the candidate more thoroughly.

Figure 16:
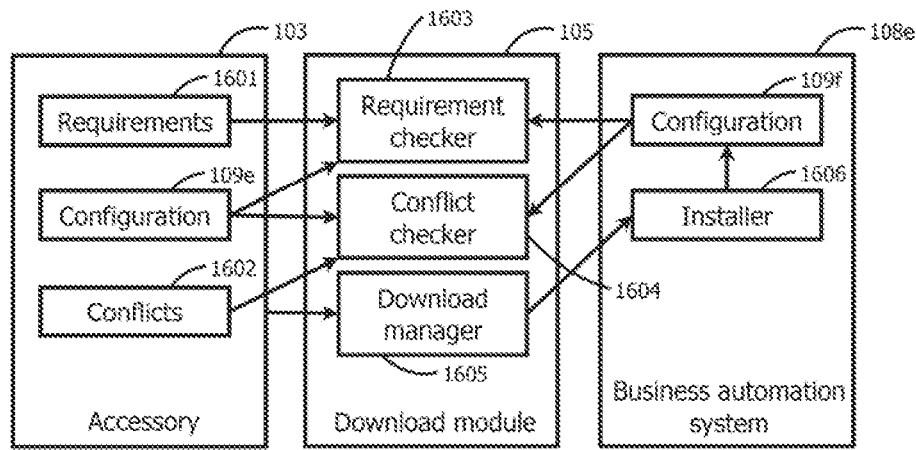
FIG. 16 is an illustrative block diagram of an embodiment of a download module.

FIG. 16 is an illustrative block diagram of an embodiment of a download module. The download module 105 can retrieve the configuration 109*f* of a target business automation system 108*e* and check the configuration 109*f* against the requirements 1601 and configuration 109*e* of a candidate accessory 103 using a requirement checker 1603, to determine if the business automation system 108*e* can properly support the accessory 103. For example, the accessory 103 may require a specific minimum version of the business automation system 108*e*, or the accessory 103 might require that another accessory already be present on the business automation system 108*e*, and so on. The download module can retrieve the configuration 109*f* of the target business automation system 108*e* and verify the configuration 109*f* against the configuration 109*e* of the candidate accessory 103 using a conflict checker 1604, to determine if there are any conflicts that would prevent the business automation system 108*e* from properly supporting the accessory 103. For example, the accessory 103 might require a configuration setting 109*e* that would be incompatible with an existing configuration setting 109*f* in the business automation system, or the accessory 103 might be known to be incompatible with another accessory that is already present on the business automation system 108*e*, and so on. If the download module 105 verifies that the requirements are met and no conflicts are found, then a download manager 1605 can transfer the accessory 103 to an installer 1606 on the business automation system 108*e*. The installer 1606 can update the configuration 109*f* of the business automation system 108*e*, which can make the accessory 103 available to the end users of the business automation system 108*e*.

Figure 17:
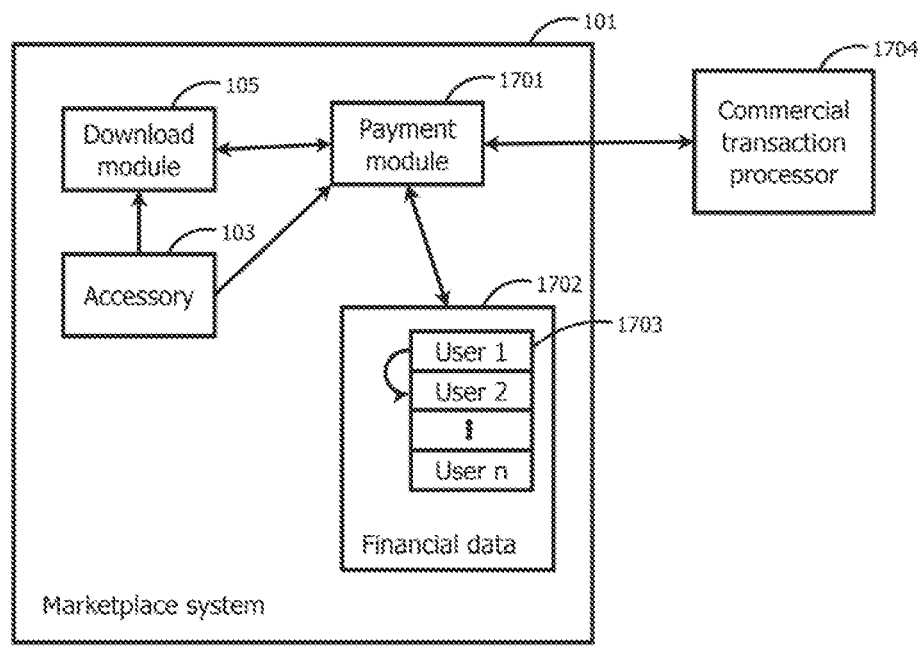
FIG. 17 is an illustrative block diagram of an embodiment of a payment module.

FIG. 17 is an illustrative block diagram of an embodiment of a payment module. In the marketplace system 101, a download module 105 can access an accessory 103 for transfer to a business automation system as previously described with respect to FIG. 16. The download module can notify a payment module 1701 that the transfer is requested. The payment module 1701 can retrieve pricing information from the accessory 103, and can access the user information 1703 within the financial data 1702 of the marketplace system 101. If the financial data represents references to external financial instruments such as credit cards or bank accounts, the payment module 1701 can access an external commercial transaction processor 1704 as needed in order to complete the transaction. If the buying user does not have the resources to complete the transaction, the payment module 1701 can report a failure to the download module 105 and prevent the transfer. Otherwise, the payment module 1701 can cause the financial transaction from the buying user to the selling user, and report a success to the download module 105, allowing the transfer to proceed.

Figure 18:
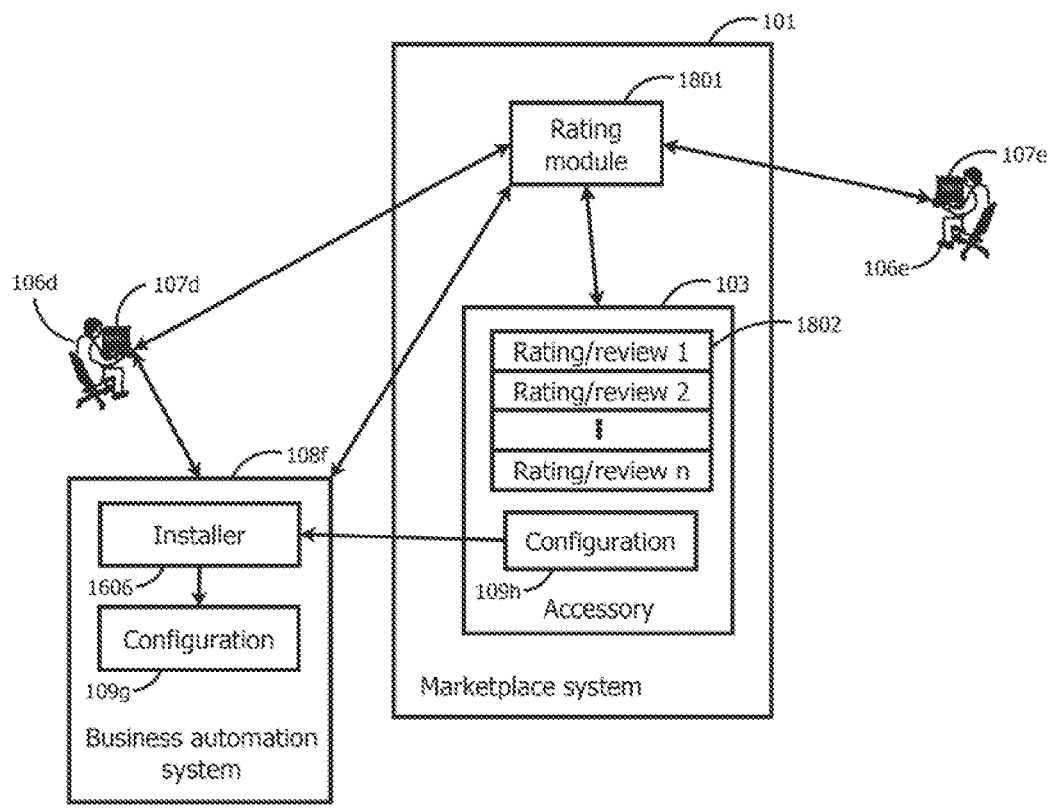
FIG. 18 is an illustrative block diagram of an embodiment of a rating module.

FIG. 18 is an illustrative block diagram of an embodiment of a rating module. A user 106*d* can use a device 107*d* to interact with a business automation system 108f and use an installer 1606 to add an accessory 103 to the business automation system 108f by updating the configuration 109g of the business automation system 108f to include the configuration 109h of the accessory 103. The user 106d can use a device 107d to interact with a rating module 1801 in the marketplace system 101 to provide opinions about the accessory 103, including aspects of the accessory 103 such as usefulness, stability, ease of use, and so on. The rating module 1801 can communicate with the business automation system 108f to verify that the user has installed the accessory 103, and can therefore legitimately comment on the accessory 103. The rating module 1801 can receive ratings from the user 106d that can take the form of a numerical rating, a text commentary, and so on. The rating module 1801 can store these ratings in a collection of ratings 1802 about the accessory 103. Another user 106e can use a device 107e to access the rating module 1801 and request ratings for the accessory 103. The rating module 1801 can display the individual ratings 1802 to the user 106e, as well as calculating and displaying summary ratings such as an average of the numerical ratings. The rating module 1801 can provide facilities for searching and sorting the ratings 1802 in order to make the ratings easier for the user 106e to use.

Figure 19A:
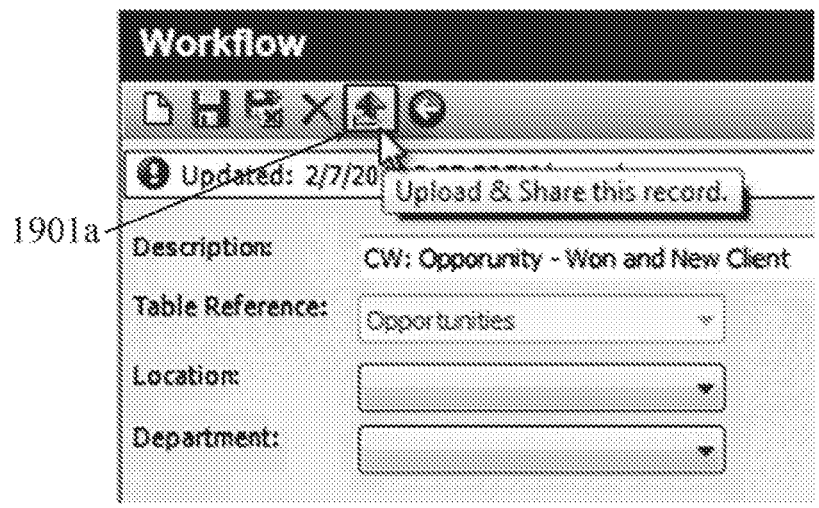
FIGS. 19A-B are illustrative examples of an embodiment of a user interface for an upload module.

FIG. 19A is an illustrative example of an embodiment of a user interface for an upload module. By way of example, FIG. 19A shows the user interface for a workflow rule. Selecting the upload control 1901a can initiate the upload module.

Figure 19B:
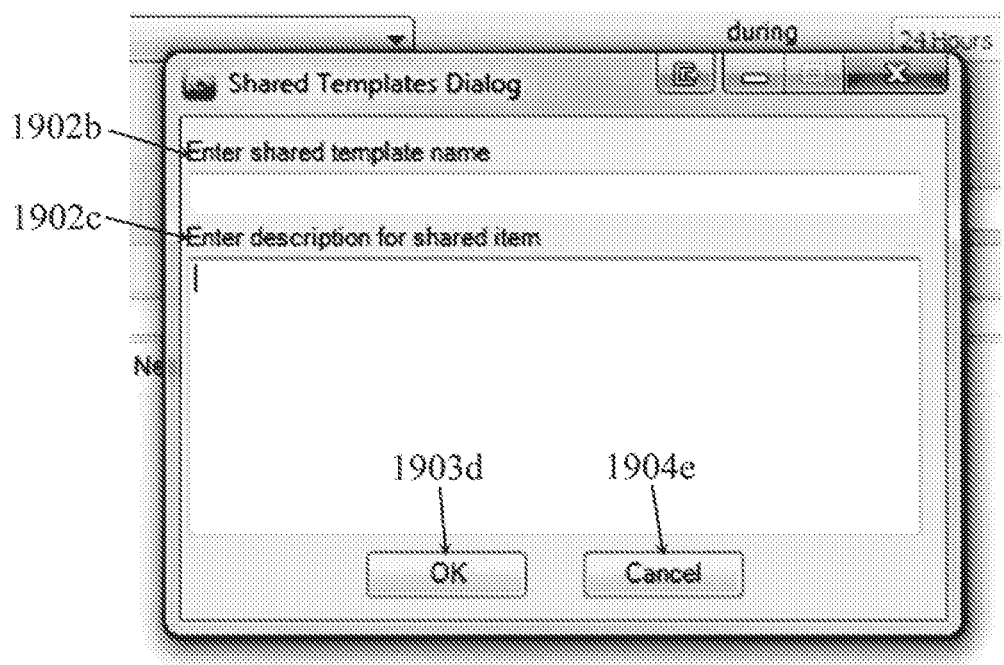

FIG. 19B is an illustrative example of an embodiment of a user interface for an upload module. Continuing the example of FIG. 19A, FIG. 19B shows the user interface for a workflow rule. The user interface for the upload module can pop up over the interface for the workflow rule, and can ask for the name 1902b of the uploaded item and a descriptive comment 1902c that can be used to identify the uploaded item in the marketplace. The upload can be completed with a confirmation control 1903d, or cancelled with a cancel control 1904e.

Figure 20A:
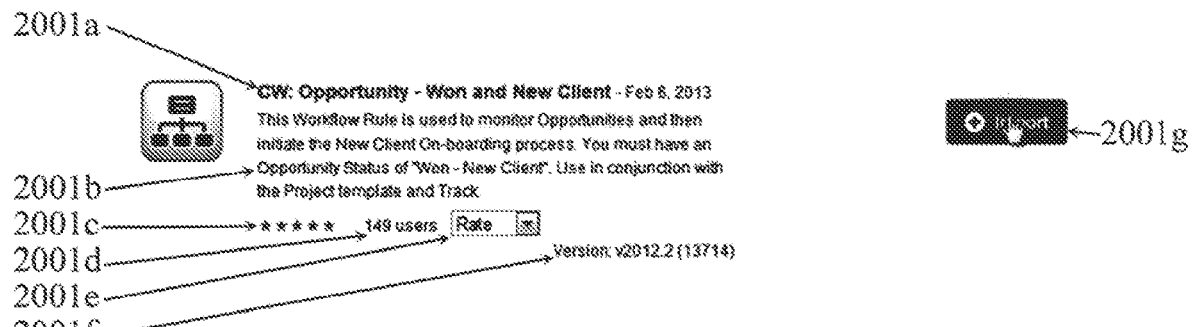
FIGS. 20A-D are illustrative examples of an embodiment of a user interface for a download module.

FIG. 20A is an illustrative example of an embodiment of a user interface for a download module. The marketplace can provide information about an accessory including a title 2001a, a description 2001b, an aggregate numeric rating 2001c, an installation count 2001d, a rating interface for current users 2001e, and a version number 2001f. An end user who would like to download the accessory can select the download control 2001g.

Figure 20B:
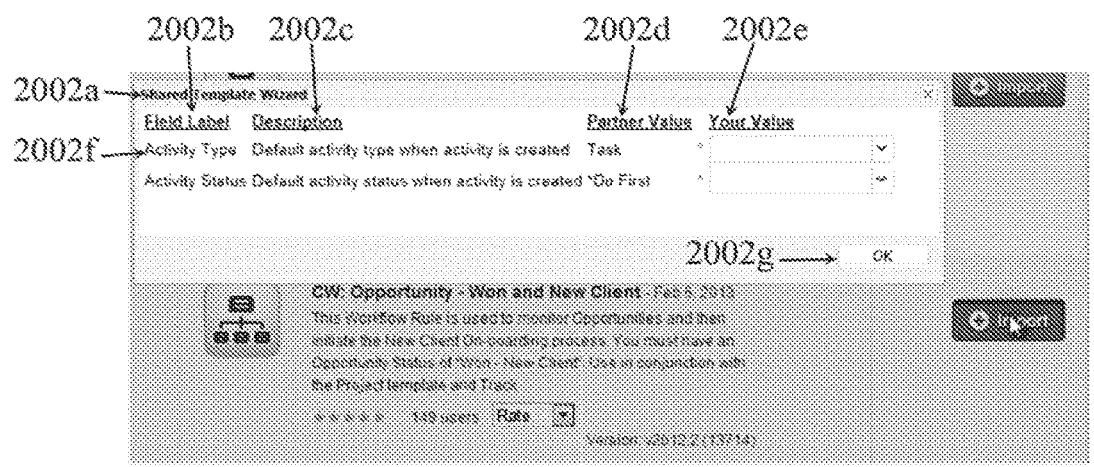

FIG. 20B is an illustrative example of an embodiment of a user interface for a download module. Continuing the example of FIG. 20A, FIG. 20B shows that the download user interface can pop up over the marketplace accessory user interface as a wizard 2002a. Prior to downloading, the accessory may need to complete some parameter substitutions, so the user interface may present a table in which each row 2002f can be a parameter, and each column can display the parameter name 2002b, the parameter description 2002c, the template parameter value 2002d as an example, and a control to fill in the actual value 2002e. Once the actual parameter values 2002e are completed, the accessory download can be completed by selecting the confirmation control 2002g.

Figure 20C:
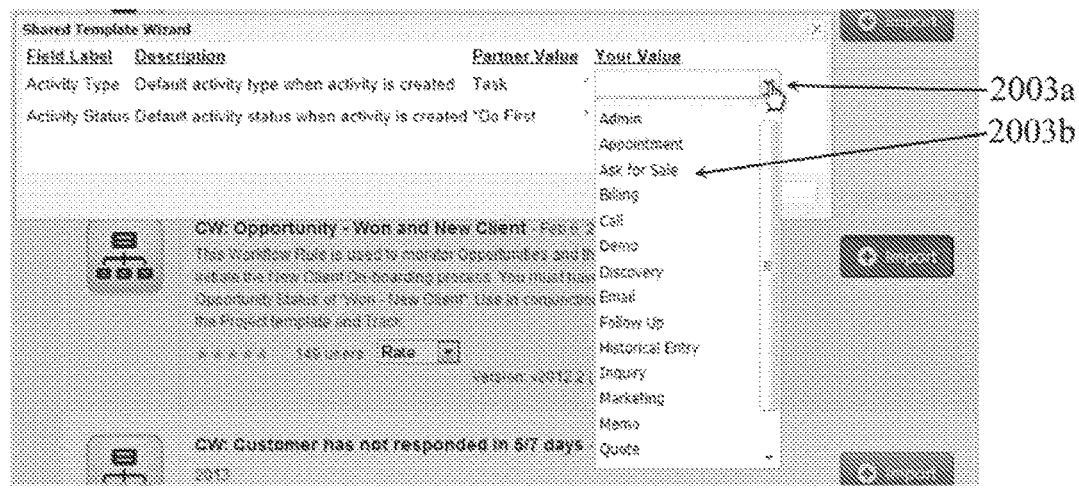

FIG. 20C is an illustrative example of an embodiment of a user interface for a download module. Continuing the example of FIG. 20A and FIG. 20B, FIG. 20C shows that when filling in a parameter value 2002e, as shown with respect to FIG. 20B, it may be desirable to constrain the value to a list of known responses rather than providing free-form text input. The parameter value 2003a can be a control with a pulldown 2003b that may allow the user of the marketplace to select from a list rather than entering text.

Figure 20D:
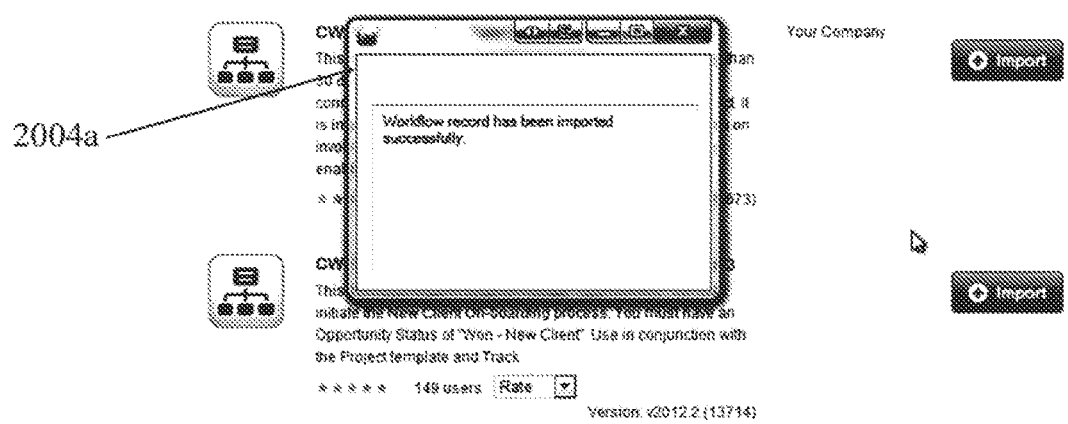

FIG. 20D is an illustrative example of an embodiment of a user interface for a download module. Once the download is confirmed, the business automation system can install the accessory and confirm 2004a a successful completion.

Figure 21A:
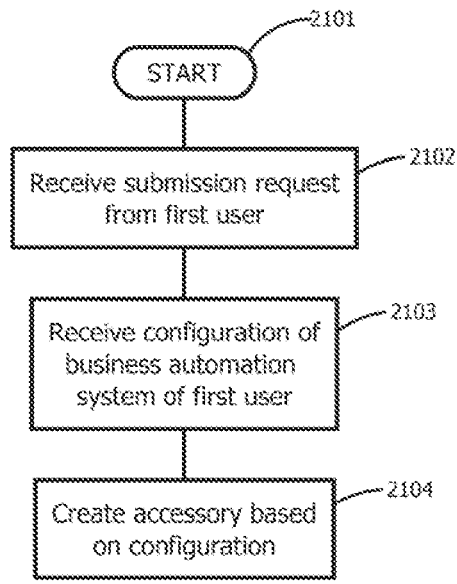
FIGS. 21A-B are illustrative flowcharts depicting one embodiment of a method of providing a marketplace for a business automation system.

FIG. 21A is an illustrative flowchart depicting one embodiment of a method of providing a marketplace for a business automation system. The method 2101 can include receiving a submission request from a first user (2012). The method 2101 can include receiving the configuration of the business automation system of the first user (2103). The method 2101 can include creating an accessory based on the configuration (2104).

Figure 21B:
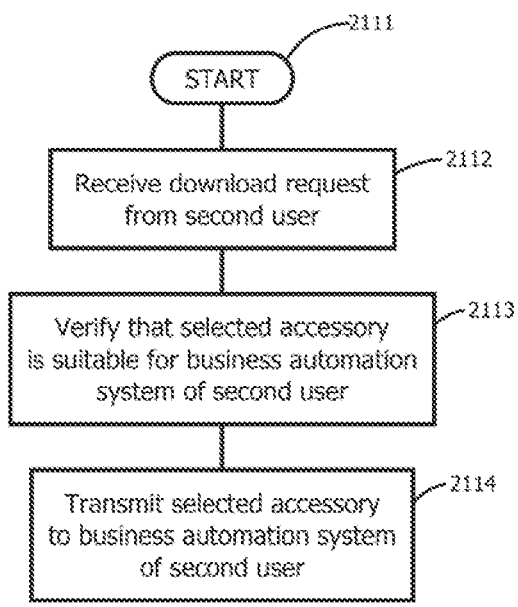

FIG. 21B is an illustrative flowchart depicting one embodiment of a method of providing a marketplace for a business automation system. The method 2111 can include receiving a download request from a second user (2112). The method 2111 can include verifying that the selected accessory is suitable for the business automation system of the second user (2113). For example, the method may verify that the business automation system has a minimum version that the selected accessory requires, or the method may verify that the business automation system has an additional accessory already installed that the selected accessory requires, or the method may verify that the business automation does not have any configuration settings that are incompatible with configuration settings that the selected accessory uses, or the method may verify that the business automation system has no additional accessories installed that are known to cause compatibility problems with the selected accessory, and so on. The method 2111 can include transmitting the selected accessory to the business automation system of the second user (2114).

Figure 22:
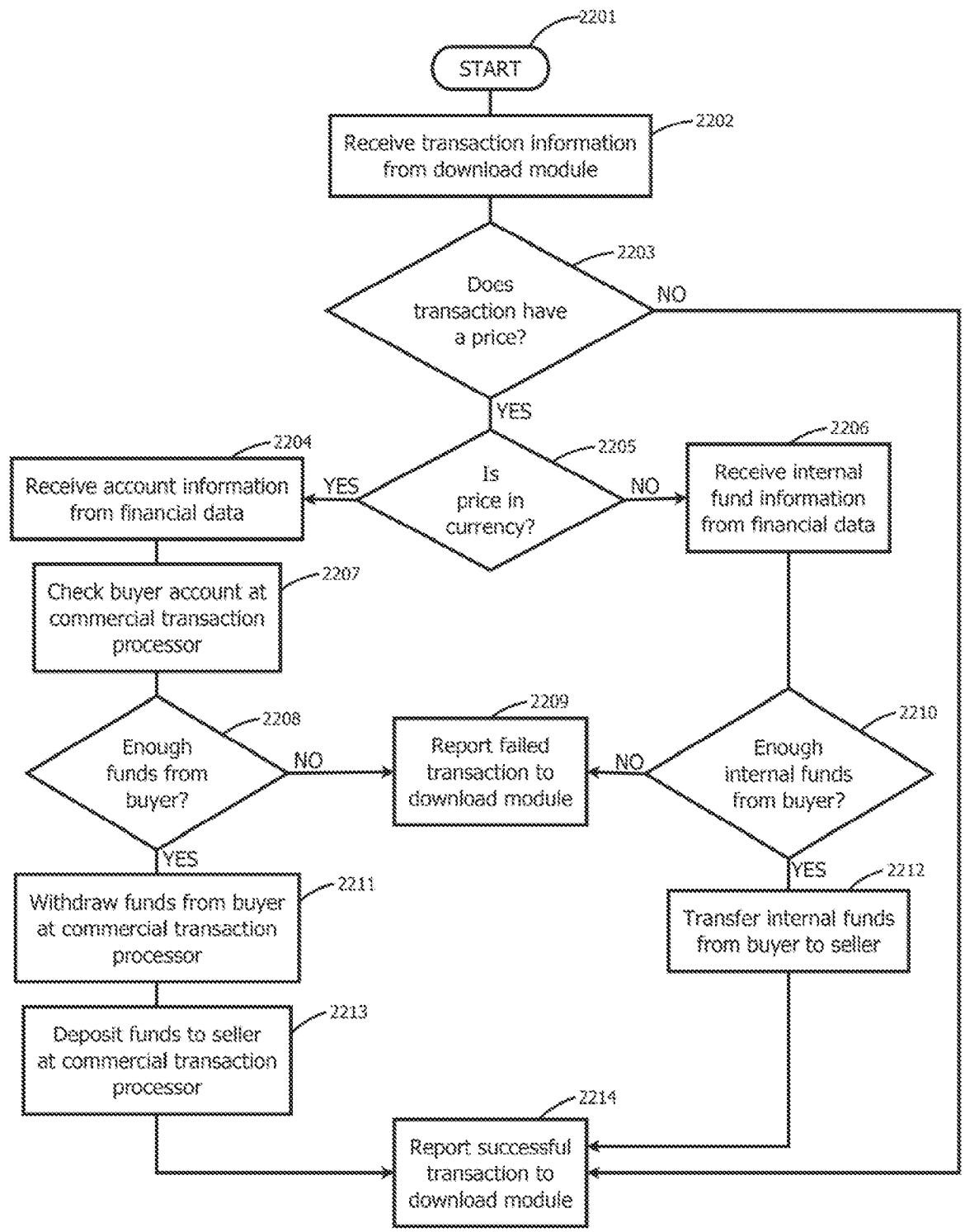
FIG. 22 is an illustrative flowchart depicting one embodiment of a method transacting payments in a marketplace for a business automation system.

FIG. 22 is an illustrative flowchart depicting one embodiment of a method transacting payments in a marketplace for a business automation system. The method 2201 can include receiving transaction information from a download module (2202). The method 2201 can include checking to see whether the transaction has a price (2203). In one embodiment, the method 2201 can include receiving account information from financial data (2204). In one embodiment, the method 2201 can include checking to see whether the price is denoted in currency (2205). In one embodiment, the method 2201 can include receiving internal fund information from financial data (2206). In one embodiment, the method 2201 can include checking the buyer account at a commercial transaction processor (2207). In one embodiment, the method 2201 can include checking to see whether there are enough funds from the buyer (2208). In one embodiment, the method 2201 can include reporting a failed transaction to the download module (2209). In one embodiment, the method 2201 can include checking to see whether there are enough internal funds from the buyer (2210). In one embodiment, the method 2201 can include withdrawing the funds from the buyer at a commercial transaction processor (2211). In one embodiment, the method 2201 can include transferring the internal funds from the buyer to the seller (2212). In one embodiment, the method 2201 can include depositing the funds to the seller at a commercial transaction processor (2213). In one embodiment, the method 2201 can include reporting a successful transaction to the download module (2214).

Figure 23A:
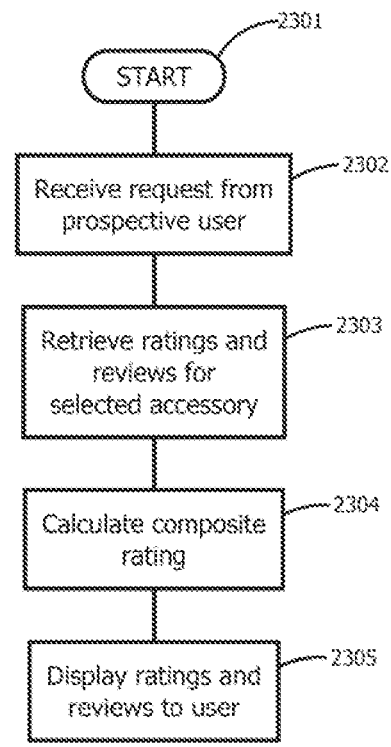
FIGS. 23A-B are illustrative flowcharts depicting one embodiment of a method of providing ratings and reviews in a marketplace for a business automation system.

FIG. 23A is an illustrative flowchart depicting one embodiment of a method of providing ratings and reviews in a marketplace for a business automation system. The method 2301 can include receiving a request from a prospective user (2302). The method 2301 can include retrieving ratings and reviews for the selected accessory (2303). The method 2301 can include calculating a composite rating (2304). The method 2301 can include displaying the ratings and reviews to the user (2305).

Figure 23B:
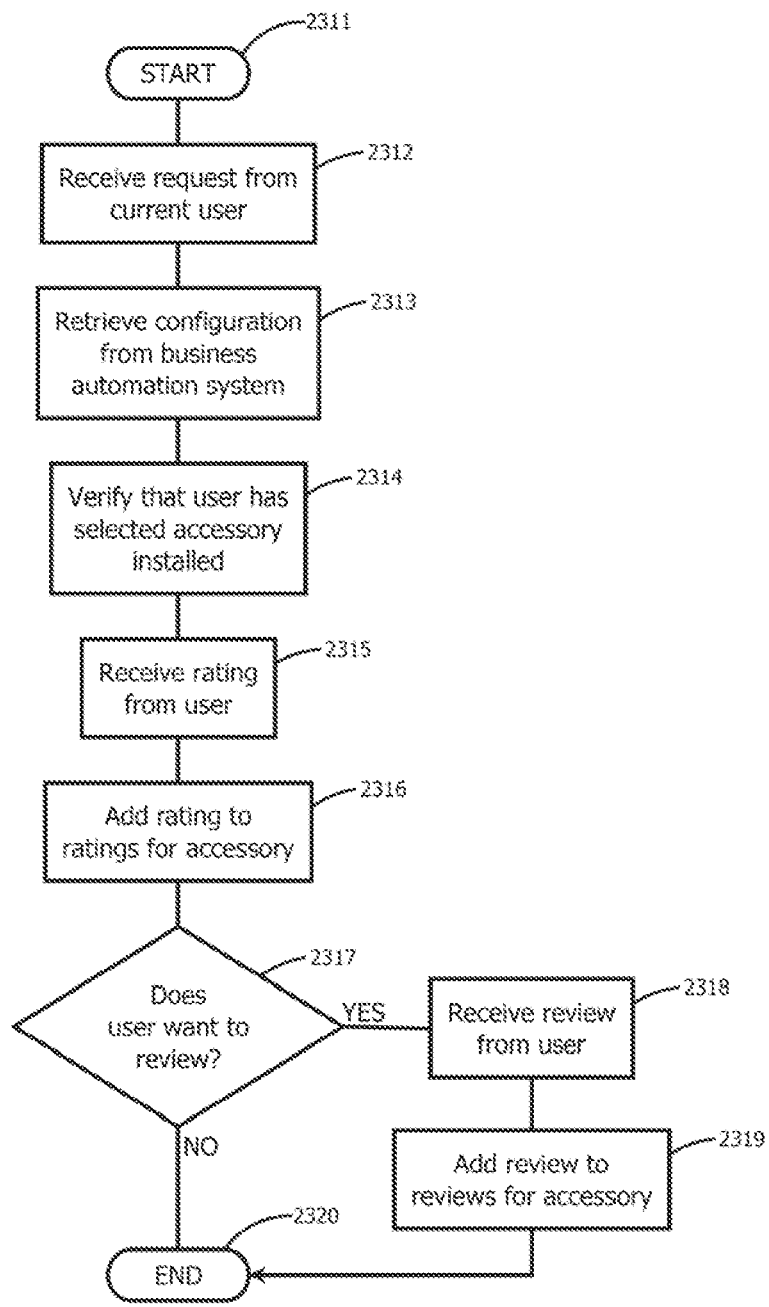

FIG. 23B is an illustrative flowchart depicting one embodiment of a method of providing ratings and reviews in a marketplace for a business automation system. The method 2311 can include receiving a request from a current user of an accessory (2312). The method 2311 can include retrieving the configuration information from the business automation system of the user (2313). The method 2311 can include using the configuration information to verify that the user actually has the accessory installed on the business automation system (2314). The method 2311 can include receiving a rating from the user (2315). The method 2311 can include adding the rating to the ratings for the accessory (2316). The method 2311 can include checking to see whether the user wants to contribute a review (2317). In one embodiment, the method 2311 can include receiving a review from the user (2318). In one embodiment, the method 2311 can include adding the review to the reviews for the accessory (2319). The method 2311 can include joining a plurality of control flows (2320).

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of improving performance of business automation systems executing on a computing device having at least one processor, the method comprising:
receiving, at an upload module of a network marketplace system executing on the computing device, a first request from a first device corresponding to a first business automation system;

receiving, responsive to the request and at the upload module, a first configuration of the business automation system, the first configuration based on a template, the first configuration automatically populated with device configuration data by a remote monitoring and management application executing on the computing device;

creating, via an accessory creation module, an accessory based on the first configuration of the business automation system, the accessory comprising a solution set having at least one of a service board, a project board, an instructional video, and a checklist;

storing the accessory in a memory of the network marketplace system;

receiving a second request from a second device corresponding to a second business automation system;

responsive to receiving the second request, receiving, at a download module executing on the computing device, a second configuration of the second device, the second configuration based on the template, the second configuration automatically populated with device configuration data by the remote monitoring and management;

verifying, via the download module, the suitability of the accessory for the second business automation system based on the second configuration, the verifying comprising at least one of:
  (i) a version of the second business automation system is compatible with the accessory,
  (ii) the second business automation system is configured with one or more accessories on which the accessory depends for execution,
  (iii) the accessory does not require a configuration that is incompatible with the second business automation system, and
  (iv) the accessory is compatible with each of the accessories previously installed on the second business automation system; and transmitting, via the download module, the accessory to a workstation of the second business automation system; and installing the accessory on the workstation.

2. The method of claim 1, wherein
the solution set further comprises an instructional video, and a checklist, an agreement, a product configuration, a CRM survey, a custom report, an HTML email template, a project template, a service template, a track, a view, and a workflow rule.

3. The method of claim 2, further comprising:
receiving, via a rating module executing on the computing device, responsive to receiving a third request from a third device, an evaluation of at least one of the solution set, the service board, the project board, the instructional video, the checklist, the agreement, the product configuration, the CRM survey, the custom report, the HTML email template, the project template, the service template, the track, the view, and the workflow rule; and displaying, responsive to receiving a fourth request from a fourth device, the evaluation;

wherein the evaluation represents an opinion about at least one of the solution set, the service board, the project board, the instructional video, the checklist, the agreement, the product configuration, the CRM survey, the custom report, the HTML email template, the project template, the service template, the track, the view, and the workflow rule.

4. The method of claim 1, further comprising paying, via a payment module executing on the computing device, a first fee to a first user associated with the first device.

5. The method of claim 4, wherein paying further comprises paying, via a payment module executing on the computing device, a first fee denoted in currency to the first user.

6. The method of claim 4, wherein paying further comprises paying, via a payment module executing on the computing device, a first fee denoted using non-currency units to the first user.

7. The method of claim 1, further comprising collecting, via a collection module executing on the computing device, a second fee from a second user associated with the second device.

8. The method of claim 7, wherein collecting further comprises collecting, via a collection module executing on the computing device, a second fee denoted in currency from the second user.

9. The method of claim 7, wherein collecting further comprises collecting, via a collection module executing on the computing device, a second fee denoted using non-currency units from the second user.

10. The method of claim 1, further comprising:
receiving, via a rating module executing on the computing device, responsive to receiving a third request from a third device, an evaluation of at least one of the solution set, the service board, the project board, the instructional video, and the checklist; and displaying, responsive to receiving a fourth request from a fourth device, the evaluation; wherein the evaluation represents an opinion about at least one of the solution set, the service board, the project board, the instructional video, and the checklist.

11. The method of claim 1, further comprising:
receiving, via the upload module, responsive to receiving a third request from a third device, an application configured to communicate with the business automation system using an application programming interface;

verifying, via the download module, responsive to receiving a fourth request from a fourth device, the suitability of the application for the business automation system of the fourth device; and transmitting the application to the fourth device.

12. The method of claim 11, further comprising:
receiving, via a rating module executing on the computing device, responsive to receiving a third request from a third device, an evaluation of at least one of the solution set, the service board, the project board, the instructional video, the checklist, and the application; and displaying, responsive to receiving a fourth request from a fourth device, the evaluation; wherein the evaluation represents an opinion about at least one of the solution set, the service board, the project board, the instructional video, the checklist, and the application.

13. A marketplace system for business automation systems executing on a computing device having at least one processor, the system comprising:
an upload module of a network marketplace system executing on the computing device,
receiving a first request from a first device corresponding to a first business automation system;
receiving, responsive to the request and at the upload module, a first configuration of the business automation system, the first configuration based on a template, the first configuration automatically populated using a remote monitoring and management application executing on the computing device;

an accessory creation module executing on the computing device,
creating, based on the first configuration, an accessory comprising a solution set having at least one of a service board, and a project board;
store the accessory in a memory of the network marketplace system; and a download module of the network marketplace system executing on the computing device to:
receive a second request from a second device corresponding to a second business automation system;
responsive to receiving the second request, receive, at a download module executing on the computing device, a second configuration of the second device, the second configuration based on the template, the second configuration automatically populated with device configuration data by the remote monitoring and management;
verify the suitability of the accessory for the second business automation system of the second user based on at least one of:
(i) a version of the second business automation system is compatible with the accessory,
(ii) the second business automation system is configured with one or more accessories on which the accessory depends for execution,
(iii) the accessory does not require a configuration that is incompatible with the second business automation system, and
(iv) the accessory is compatible with each of the accessories previously installed on the second business automation system; and
transmit the accessory to a workstation of the second business automation system; and
install the accessory on the workstation.

14. The system of claim 13, wherein:
the solution set further comprises at least one of an instructional video, a checklist, an agreement, a product configuration, a CRM survey, a custom report, an HTML email template, a project template, a service template, a track, a view, and a workflow rule.

15. The system of claim 14, further comprising a rating module executing on the computing device to:
receive, responsive to receiving a third request from a third device, an evaluation of at least one of the solution set, the service board, the project board, the instructional video, the checklist, the agreement, the product configuration, the CRM survey, the custom report, the HTML email template, the project template, the service template, the track, the view, and the workflow rule; and
display, responsive to receiving a fourth request from a fourth device, the evaluation;
wherein the evaluation represents an opinion of the third device about at least one of the solution set, the service board, the project board, the instructional video, the checklist, the agreement, the product configuration, the CRM survey, the custom report, the HTML email template, the project template, the service template, the track, the view, and the workflow rule.

16. The system of claim 13, further comprising a payment module executing on the computing device to pay a first fee to a first user corresponding to the first device.

17. The system of claim 16, wherein the first fee is denoted in currency.

18. The system of claim 16, wherein the first fee is denoted using non-currency units.

19. The system of claim 13, further comprising a collection module executing on the computing device, configured to collect a second fee from a second user corresponding to the second device.

20. The system of claim 19, wherein the second fee is denoted in currency.

21. The system of claim 19, wherein the second fee is denoted using non-currency units.

22. The system of claim 13, further comprising a rating module executing on the computing device to:
receive, responsive to receiving a third request from a third device, an evaluation of at least one of the solution set, the service board, the project board, the instructional video, and the checklist; and
display, responsive to receiving a fourth request from a fourth device, the evaluation;
wherein the evaluation represents an opinion of the third device about at least one of the solution set, the service board, the project board, the instructional video, and the checklist.

23. The system of claim 13, wherein:
the upload module is configured to receive, responsive to receiving a third request from a third device, an application configured to communicate with the business automation system using an application programming interface; and
the download module is configured to:
verify, responsive to receiving a fourth request from a fourth device, the suitability of the application for the business automation system of the fourth device; and
transmit the application to the fourth device.

24. The system of claim 23, further comprising a rating module executing on the computing device configured to:
receive, responsive to receiving a third request from a third device, an evaluation of at least one of the solution set, the service board, the project board, the instructional video, the checklist, and the application; and
display, responsive to receiving a fourth request from a fourth device, the evaluation;
wherein the evaluation represents an opinion of the third device about at least one of the solution set, the service board, the project board, the instructional video, the checklist, and the application.

* * * * *